(12) United States Patent
Lablans

(10) Patent No.: US 8,209,370 B2
(45) Date of Patent: *Jun. 26, 2012

(54) MULTI-VALUE DIGITAL CALCULATING CIRCUITS, INCLUDING MULTIPLIERS

(75) Inventor: Peter Lablans, Morris Township, NJ (US)

(73) Assignee: Ternarylogic LLC, Morristown, NC (US)

( * ) Notice: Subject to any disclaimer, the term of this patent is extended or adjusted under 35 U.S.C. 154(b) by 507 days.

This patent is subject to a terminal disclaimer.

(21) Appl. No.: 12/472,731

(22) Filed: May 27, 2009

(65) Prior Publication Data

US 2009/0234900 A1    Sep. 17, 2009

Related U.S. Application Data

(63) Continuation of application No. 11/018,956, filed on Dec. 20, 2004, now Pat. No. 7,562,106.

(51) Int. Cl.
*G06F 15/00* (2006.01)
*G06F 7/52* (2006.01)

(52) U.S. Cl. .................................. 708/493; 708/620

(58) Field of Classification Search .................. 708/483, 708/620, 623, 624
See application file for complete search history.

(56) References Cited

U.S. PATENT DOCUMENTS

| | | | |
|---|---|---|---|
| 4,566,075 A | 1/1986 | Guttag | |
| 4,620,188 A | 10/1986 | Sengchanh | |
| 4,628,472 A | 12/1986 | Fensch | |
| 4,814,644 A | 3/1989 | Yamakawa | |
| 4,969,118 A | 11/1990 | Montoye et al. | |
| 4,982,356 A | 1/1991 | Ando | |
| 5,222,035 A | 6/1993 | Nakase et al. | |
| 5,227,993 A | 7/1993 | Yamakawa | |
| 5,280,440 A | 1/1994 | Sugimura | |
| 5,289,399 A | 2/1994 | Yoshida | |
| 5,379,245 A * | 1/1995 | Ueda | 708/624 |
| 5,438,533 A | 8/1995 | Yoshida | |
| 5,644,253 A | 7/1997 | Takatsu | |
| 6,535,902 B2 | 3/2003 | Goto | |
| 6,567,835 B1 | 5/2003 | Blomgren et al. | |
| 6,816,877 B2 * | 11/2004 | Park et al. | 708/628 |
| 7,562,106 B2 * | 7/2009 | Lablans | 708/493 |
| 2001/0016864 A1 | 8/2001 | Noeske | |

OTHER PUBLICATIONS

Non-Final Office Action in U.S. Appl. No. 12/267,900, mailed Sep. 26, 2011, 6 pgs.
O. Sentieys et al. 'Conception d'un processeur ternaire a faible (e)nergie. (text in English)', Colloque Faible Tension Faible Consommation (FTFC '03), 2003, 7 pages, Rennes, France.
C.S. Wallace; 'A suggestion for a Fast Multiplier' IEEE Trans. Electron. Comput. EC-13:14-17 (1964).
R. Brent, H. Kung; 'A regular lay-out for parallel adders.' IEEE Transactions on Computers C-31 (1982).
Gary W. Bewick; 'Fast multiplication: algorithms and implementation.' Ph.D. Thesis Stanford University. Feb. 1994. 170pg.

(Continued)

*Primary Examiner* — Chuong D Ngo
(74) *Attorney, Agent, or Firm* — Diehl Servilla LLC

(57) ABSTRACT

Apparatus and method for performing multi-value arithmetic operations are disclosed. Multi-value signals can be added, subtracted and multiplied using a first truth table to generate a residue and a second truth table to generate a carry. Additionally, method and apparatus to efficiently perform the function a0b1+a1b0 on multi-value signals are disclosed. Also an efficient method of processing large binary signals is disclosed.

20 Claims, 34 Drawing Sheets

OTHER PUBLICATIONS

Kai Hwang. 'Computer Arithmetic. Principles, Architecture, and Design.' John Wiley & Sons 1979. pp. 84-91.

Abraham Peled, Bede Liu. 'Digital Signal Processing. Theory, Design and Implementation.' Abraham Wiley and Sons 1976, p. 18.

J. Sklansky. 'Conditional-Sum Addition Logic.' IRE Transactions on Electronic Computers (1960).

O.J. Bedrij. 'Carry-Select Adder', IRE Trans. Electr. Comp. Jun. 1962, 340-346.

* cited by examiner

Not usable latch configuration $$d1 = c1 \oplus b1$$
$$c1 = d1 \oplus a1$$

$$d2 = c1 \oplus b2$$
$$c2 = d1 \oplus a2$$

$$d3 = c2 \oplus b2$$
$$c3 = d2 \oplus a2$$

$$d4 = c3 \oplus b2$$
$$c4 = d3 \oplus a2$$

| inputs<br>top device | output<br>top device 1 | output<br>bottom device | output<br>top device | status<br>of latch |
|---|---|---|---|---|
| 1 and 0 | (1,0)→3 | (2,3)→3 | (1,3)→0 | stable |
| 1 and 2 | (1,2)→2 | (2,2)→1 | (1,1)→0 | stable |
| 1 and 3 | (1,3)→0 | (2,0)→1 | (1,1)→0 | stable |
|  |  |  |  |  |
| 2 and 0 | (2,0)→1 | (3,1)→2 | (2,2)→1 | stable |
| 2 and 1 | (2,1)→3 | (3,3)→2 | (2,2)→1 | stable |
| 2 and 3 | (2,3)→3 | (3,3)→2 | (2,2)→1 | stable |
|  |  |  |  |  |
| 3 and 0 | (3,0)→0 | (0,0)→3 | (3,3)→2 | stable |
| 3 and 1 | (3,1)→2 | (0,2)→3 | (3,3)→2 | stable |
| 3 and 2 | (3,2)→3 | (0,3)→3 | (3,3)→2 | stable |
|  |  |  |  |  |
| 0 and 1 | (0,1)→1 | (1,1)→0 | (0,0)→3 | stable |
| 0 and 2 | (0,2)→3 | (1,3)→0 | (0,0)→3 | stable |
| 0 and 3 | (0,3)→3 | (1,3)→0 | (0,0)→3 | stable |

| mem_n | 0 | 1 | 2 | 3 | .. | . | . | . | n-2 | n-1 |
|---|---|---|---|---|---|---|---|---|---|---|
| 0 | 1 | 1 | 3 | 4 | . | . | . | . | n-1 | 0 |
| 1 | 1 | 2 | 2 | 4 | . | . | . | . | n-1 | 0 |
| 2 | 1 | 2 | 3 | 3 | . | . | . | . | n-1 | 0 |
| 3 | 1 | 2 | 3 | 4 | . | . | . | . | n-1 | 0 |
| . | . | . | . | . | . | . | . | . | . | . |
| . | . | . | . | . | . | . | . | . | . | . |
| . | . | . | . | . | . | . | . | . | . | n-1 | 0 |
| . | . | . | . | . | . | . | . | . | n-2 | 0 |
| n-2 | 1 | 2 | 3 | 4 | . | . | . | . | n-1 | n-1 |
| n-1 | 0 | 2 | 3 | 4 | . | . | . | . | n-1 | 0 |
Figure 48
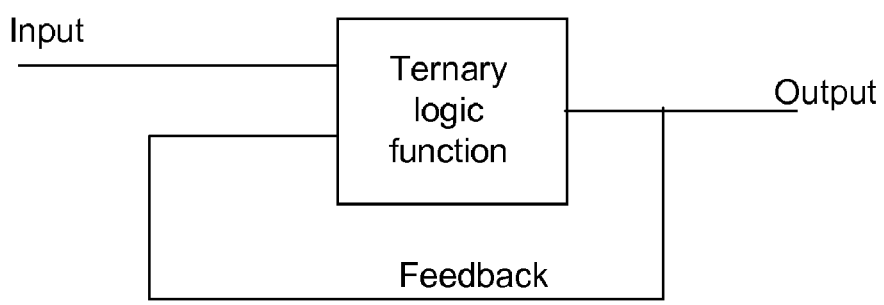
Figure 49
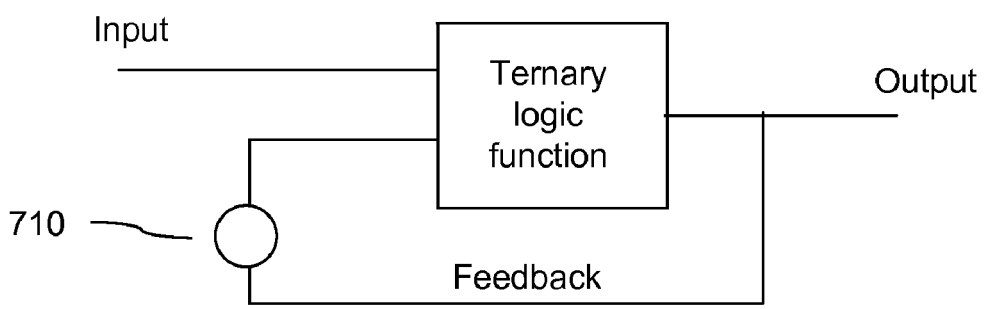
Figure 50

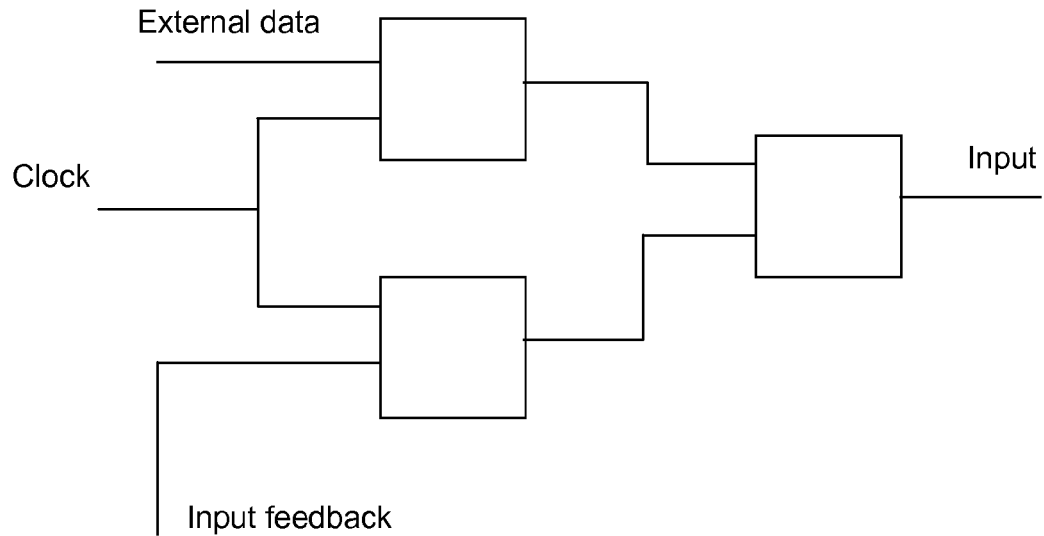
Figure 59
| L1 | 0 | 1 | 2 |
|----|---|---|---|
| 0  | 0 | 2 | 0 |
| 1  | 2 | 1 | 1 |
| 2  | 0 | 1 | 0 |
| L2 | 0 | 1 | 2 |
|----|---|---|---|
| 0  | 0 | 2 | 0 |
| 1  | 2 | 1 | 1 |
| 2  | 0 | 1 | 1 |
| L3 | 0 | 1 | 2 |
|----|---|---|---|
| 0  | 0 | 2 | 0 |
| 1  | 2 | 1 | 1 |
| 2  | 0 | 1 | 2 |
Figure 60
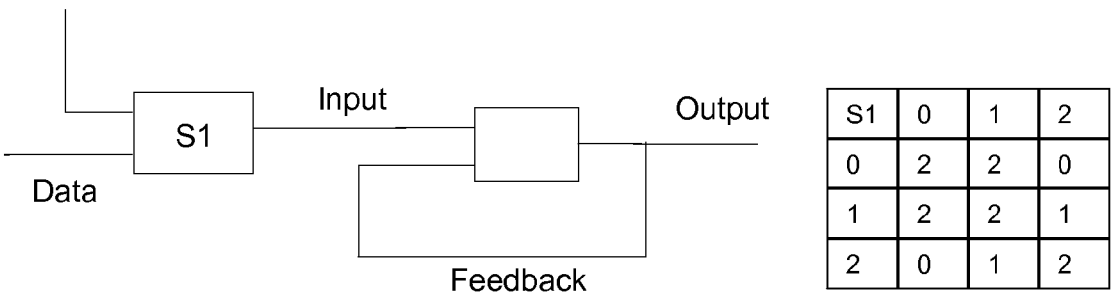
| S1 | 0 | 1 | 2 |
|----|---|---|---|
| 0  | 2 | 2 | 0 |
| 1  | 2 | 2 | 1 |
| 2  | 0 | 1 | 2 |
Figure 61

| Q1 | 0 | 1 | 2 | 3 |
|---|---|---|---|---|
| 0 | 0 | 2 | 3 | 0 |
| 1 | 2 | 1 | 3 | 1 |
| 2 | 3 | 3 | 2 | 2 |
| 3 | 0 | 1 | 2 | 3 |

| Q2 | 0 | 1 | 2 | 3 |
|---|---|---|---|---|
| 0 | 0 | 3 | 1 | 0 |
| 1 | 3 | 1 | 3 | 1 |
| 2 | 1 | 3 | 2 | 2 |
| 3 | 0 | 1 | 2 | 3 |

| Q3 | 0 | 1 | 2 | 3 |
|---|---|---|---|---|
| 0 | 0 | 3 | 3 | 0 |
| 1 | 3 | 1 | 0 | 1 |
| 2 | 3 | 0 | 2 | 2 |
| 3 | 0 | 1 | 2 | 3 |

| Q4 | 0 | 1 | 2 | 3 |
|---|---|---|---|---|
| 0 | 0 | 3 | 3 | 0 |
| 1 | 3 | 1 | 3 | 1 |
| 2 | 3 | 3 | 2 | 2 |
| 3 | 0 | 1 | 2 | 3 |

Figure 62

| gen4 | 0 | 1 | 2 | 3 |
|---|---|---|---|---|
| 0 | 0 | a | b | 0 |
| 1 | a | 1 | c | 1 |
| 2 | b | c | 2 | 2 |
| 3 | 0 | 1 | 2 | 3 |

Figure 63

| F1 | 0 | 1 | 2 | 3 | 4 |
|---|---|---|---|---|---|
| 0 | 0 | 2 | 3 | 4 | 0 |
| 1 | 2 | 1 | 4 | 4 | 1 |
| 2 | 3 | 4 | 2 | 1 | 2 |
| 3 | 4 | 4 | 1 | 3 | 3 |
| 4 | 0 | 1 | 2 | 3 | 4 |

| F2 | 0 | 1 | 2 | 3 | 4 |
|---|---|---|---|---|---|
| 0 | 0 | 4 | 4 | 4 | 0 |
| 1 | 4 | 1 | 4 | 4 | 1 |
| 2 | 4 | 4 | 2 | 4 | 2 |
| 3 | 4 | 4 | 4 | 3 | 3 |
| 4 | 0 | 1 | 2 | 3 | 4 |

Figure 64

| gen5 | 0 | 1 | 2 | 3 | 4 |
|---|---|---|---|---|---|
| 0 | 0 | a | b | c | 0 |
| 1 | a | 1 | d | e | 1 |
| 2 | b | d | 2 | f | 2 |
| 3 | c | e | f | 3 | 3 |
| 4 | 0 | 1 | 2 | 3 | 4 |

Figure 65A

|   | 0 | 1 | 2 | 3 | 4 | 5 |
|---|---|---|---|---|---|---|
| 0 | 0 | 5 | 5 | 5 | 5 | 0 |
| 1 | 5 | 1 | 0 | 0 | 0 | 1 |
| 2 | 5 | 0 | 2 | 5 | 5 | 2 |
| 3 | 5 | 0 | 5 | 3 | 5 | 3 |
| 4 | 5 | 0 | 5 | 5 | 4 | 4 |
| 5 | 0 | 1 | 2 | 3 | 4 | 5 |

Figure 65B

|   | 0 | 1 | 2 | 3 | 4 | 5 | 6 |
|---|---|---|---|---|---|---|---|
| 0 | 6 | 6 | 6 | 6 | 6 | 6 | 0 |
| 1 | 6 | 1 | 0 | 0 | 0 | 0 | 1 |
| 2 | 6 | 0 | 2 | 0 | 0 | 6 | 2 |
| 3 | 6 | 0 | 0 | 3 | 6 | 0 | 3 |
| 4 | 6 | 0 | 0 | 6 | 4 | 6 | 4 |
| 5 | 6 | 0 | 6 | 0 | 6 | 5 | 5 |
| 6 | 0 | 1 | 2 | 3 | 4 | 5 | 6 |

Figure 66

Diagram of scrambled signal achieved by applying scrambling function sc1 on a ternary signal and a pre-determined ternary sequence.

| sc1 | 0 | 1 | 2 |
|-----|---|---|---|
| 0   | 0 | 2 | 1 |
| 1   | 2 | 1 | 0 |
| 2   | 1 | 0 | 2 |

Signal    a = 2 2 2 2 2 2 2 2 0 0 0 0 0 0 0 0 1 1 1 1 1 1 1 1 0 0 0 0 0 0 0 0

Sequence  n = 2 0 0 1 0 2 2 1 2 0 0 1 0 2 2 1 2 0 0 1 0 2 2 1 2 0 0 1 0 2 2 1

Sequence  Res = 2 1 1 0 1 2 2 0 1 0 0 2 0 1 1 2 0 2 2 1 2 0 0 1 1 0 0 2 0 1 1 2

MULTI-VALUE DIGITAL CALCULATING CIRCUITS, INCLUDING MULTIPLIERS

STATEMENT OF RELATED CASES

This application is a continuation of U.S. patent application Ser. No. 11/018,956, filed on Dec. 20, 2004, now U.S. Pat. No. 7,562,106, which is incorporated herein by reference in its entirety.

BACKGROUND OF THE INVENTION

This invention relates to the realization of non-binary or multi-valued digital logic devices that are able to execute arithmetic operations. More specifically it relates to ternary and multi-valued digital multipliers.

Digital computers and computer circuits currently work pre-dominantly on the principles of binary logic. Basic calculations, such as addition and multiplication are core to many useful applications. In many cases the ability to execute these basic calculations is implemented in dedicated binary logic adders and multipliers.

Many practical and theoretical computing applications are under time constraints to execute these calculations in the shortest time possible. One constraint may be that trillions of additions or multiplications have to be executed to arrive at some desired result within a reasonable time-frame. Another constraint may be the allowed time to process a digital signal sample to achieve real-time signal processing.

There are several ways to speed up calculations. There is the physical way wherein circuits are realized that enables individual instructions to execute faster. Another way to speed up calculations is to rearrange the individual logic instructions, for instance by trying to execute as many instructions at the same time (or in parallel) rather than consecutively.

The major constraint in all digital calculations is the occurrence of carry digits in addition and multiplication and the borrow digits in subtractions and division. Avoidance or limitation of occurrence of carry digits in additions and multiplications is at the core of many approaches to speed up theses calculations.

Another approach is to avoid serial calculations. In these serial calculations, a new calculation has to wait for the result of a previous one, creating a potential bottleneck.

The subject is known to those skilled in the art as computer arithmetic.

It is known that applying certain binary digital operations may speed up total execution. An example is the shift-and-add process in multi-binary digit multiplication.

SUMMARY OF THE INVENTION

A method and apparatus to combine two important operations, multiplication of two digits and the addition of the result of two multiplications into a single non-binary logic function has been developed. This forms the basis to limit the overall switching delay in executing single digit and multi-digit multiplications and additions. Other carry avoiding and carry calculation speed-up methods can also be employed within the present invention. Also, the use of gates and inverters can create an immediate datapath without having to wait for intermediate results.

The above, as well as additional objects, features, and advantages of the present invention will become apparent in the following detailed written description.

In view of the more limited possibilities of the prior art in use of binary adders and multipliers, there is a need for faster adders and multipliers.

The general purpose of the present invention, which will be described subsequently in greater detail, is to provide methods of creating devices which will have functions described by binary and multi-valued truth tables which will execute multi-digit calculations such as addition and multiplications.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Multi-value and n-value in the context of this application mean a number n, with n being a positive integer greater than two.

A primary object of the present invention is to provide a new method for creating devices that will execute binary and multi-valued logic based arithmetical functions described by binary and multi-valued truth tables.

An object of the present invention is to provide a method to speed up binary addition of at least two multi-digit numbers by applying a multi-value logic adder.

Another object of the present invention is to provide a method to speed up binary multiplication of at least two multi-digit numbers by applying a multi-value logic multiplier.

Another object is to determine the residue of a radix-n addition of a single multi-valued constant to a single digit multi-value digit by way of a multi-value inverter.

Another object is to determine the carry digit of a radix-n addition of a single multi-valued constant to a single multi-value digit by way of a multi-value inverter.

Another object is to determine the residue of a radix-n addition of a single multi-valued variable to another single multi-value variable digit by way of multi-value inverters and gates.

Another object is to determine the carry of a radix-n addition of a single multi-valued variable to another single variable multi-value digit by way of multi-value inverters and gates.

Another object is to determine the residue of a radix-n multiplication of a single multi-valued constant with a single multi-value digit by way of a multi-value inverter.

Another object is to determine the carry of a radix-n multiplication of a single multi-valued constant with a single multi-value digit by way of a multi-value inverter.

Another object is to determine the residue of a radix-n multiplication of a single multi-value variable with another single multi-value variable digit by way of multi-value inverters and gates.

Another object is to determine the carry of a radix-n multiplication of a single multi-value variable with another single multi-value variable digit by way of multi-value inverters and gates.

Another object of the invention is to provide a novel method to create the complete multi-digit partial product of a multiplication of two multi-digit numbers in multi-value logic in which one of the numbers has fixed coefficients and can be considered a multi-digit constant.

Another object of the invention is to provide a novel method to create the complete multi-digit partial product of a multiplication of two multi-digit numbers in multi-value logic in which both numbers are variables, but one of the numbers will be treated as having fixed coefficients and can thus be considered a multi-digit constant.

BRIEF DESCRIPTION OF THE DRAWINGS

Various other objects, features and attendant advantages of the present invention will become fully appreciated as the same becomes better understood when considered in conjunction with the accompanying drawings, and wherein:

FIGS. 32 to 66 illustrate multi-value latches and memory devices;

DETAILED DESCRIPTION OF THE INVENTION

Addition as a Logic Expression

Figure 1:
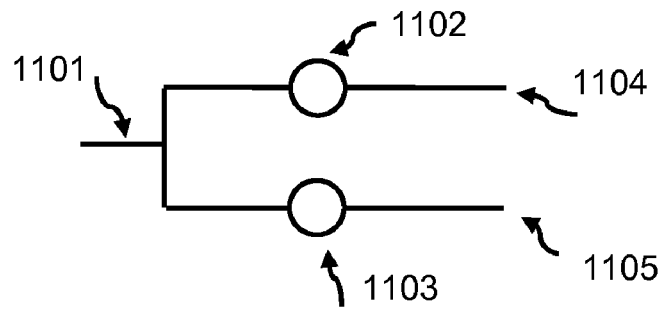
FIG. 1 is a diagram of an adder.

The purpose of computer arithmetic is to have logic devices execute logic functions based on a certain input in such a way that the result is similar to calculating an arithmetical operation.

Radix-n operations relate to operations performed on n-value signals. For example, a radix-3 operation performs an operation on ternary or 3-value signals. For addition radix-n, the basic two logic operations that have to be executed are: (1) determination of the radix-n residue and (2) determination of the radix-n carry.

For illustrative purposes, two single digit numbers will be added in the following table in accordance with one aspect of the present invention.

|  |  | digit |
|---|---|---|
| number 1 |  | a0 |
| number 2 |  | b0 |
| mod-n |  | a0 r b0 |
| Carry | a0 c b0 |  |

There are two steps that are illustrated in the table. First, the digits to be added are inputted to a function r. The result is a modulo-n residue of a modulo-n addition. In binary logic, the modulo-2 addition function is the XOR function.

The next step comprises determining the carry digit generated by the addition. In this step, the digits to be added are input to a function c. In binary logic, that function is performed by the binary logic AND. To correctly perform the addition, the carry number is in the column to the left of the residue number, as is well known when performing addition.

For addition of multi-digit numbers, the above operations are repeated in succeeding columns to the left. The operation needs to be repeated until no more carry digits are generated. An adder has to work for any valid inputs, so it has to be designed for the worst case scenario. Because of the way the process is defined, the carry issue appears to be resolved moving from right to left. In the worst case it appears as if a carry digit moves one position to the left in every process step.

In the radix-3 or ternary case, the truth table that calculates the residue of the modulo-3 addition is given in the following table:

| mod-3+ | 0 | 1 | 2 |
|---|---|---|---|
| 0 | 0 | 1 | 2 |
| 1 | 1 | 2 | 0 |
| 2 | 2 | 0 | 1 |

The ternary logic addition carry function has the following truth table:

| carry-3 | 0 | 1 | 2 |
|---------|---|---|---|
| 0 | 0 | 0 | 0 |
| 1 | 0 | 0 | 1 |
| 2 | 0 | 1 | 1 |

Thus, in accordance with one aspect of the present invention, the ternary addition problem a0+b0 can be preformed by applying a0 and b0 to the truth tables above to generate a residue and a carry, respectively.

The modulo-4 addition residue logic function has the following truth table:

| mod-4+ | 0 | 1 | 2 | 3 |
|--------|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

The 4-value (or radix-4) logic addition carry function has the following truth table:

| Carry-4 | 0 | 1 | 2 | 3 |
|---------|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |

Thus, in accordance with one aspect of the present invention, the 4-value addition problem a0+b0 can be preformed by applying a0 and b0 to the truth tables above to generate a residue and a carry, respectively.

While higher radix numbers have per definition a higher threshold for generating a carry, assuming that all digits have statistically an equal appearance, percentage-wise the occurrence of a carry digit will rise with higher radix.

Ternary Carry-Save Addition.

The carry-save adder (CSA) is a known approach in binary addition to speed-up execution. In CSA execution of the full addition is delayed by collecting as much data without incurring a carry propagation execution. It is based on the fact that one can add three binary is without creating an additional shift in carry digits. This means that one can add three binary numbers and create its collective residue as well as carry and then add the residue and the carry in a normal (ripple adder) or accelerated (like carry look ahead) fashion.

In accordance with one aspect of the present invention, a carry-save approach is taken in ternary logic. A ternary digit has (in 0, 1, 2 notation) 2 as its highest value. Addition of four 2s has a result 8. This is [2 2] in radix-3 notation (carry=2 and residue=2). Consequently, one can add 4 ternary numbers to create one ternary multi-digit number consisting of ternary digits from the residues and one multi-digit ternary number from the carry additions, without actually generating new carry digits. Final execution of course should take place as a normal addition.

For illustrative purposes, the following example is provided. Four 4 digits ternary numbers will be added in CSA fashion to demonstrate the principle.

| Decimal | | a3 | a2 | a1 | a0 |
|---------|---|----|----|----|----|
| 37 | A | 1 | 1 | 0 | 1 |
| 23 | B | 0 | 2 | 1 | 2 |
| 58 | C | 2 | 0 | 1 | 1 |
| 47 | D | 1 | 2 | 0 | 2 |
| result_dec | | 4 | 5 | 2 | 6 |
| residue_ter | | r3 | r2 | r1 | r0 |
| | | 1 | 2 | 2 | 0 |
| carry_ter | c3 | c2 | c1 | c0 | |
| | 1 | 1 | 0 | 2 | |

The row 'result_dec' in the table shows the sum of each column in decimal form. Addition of numbers A, B, C and D provides the decimal vector: result_dec [4 5 3 6]. Each element in that vector can be represented in a ternary residue and a ternary carry element. The ternary residue residue_ter is [0 1 2 2 0] and the ternary carry representation carry_ter is [1 1 0 2 0].

The final result of the sum of A, B, C and D can be obtained by the addition of residue_ter and carry_ter. This results in [2 0 0 1 0].

The ternary functions have two inputs and one output. Adding the 4 numbers in a CSA fashion will take 3 cycles (first A+B; then its result with C; and then its result with D). Because of the principle of no carry-propagation as previously described it is also possible to combine two numbers (say A and B) and two other numbers (say C and D) and calculate the residue and carry parallel. One can then create in one additional cycle the combination of these results.

Multiplication by Inverters

It has previously been shown that multiplying a single n-valued digit by a multiplier b1 in modulo-n is identical to inverting the n-value digit with an n-value inverter. See U.S. patent application Ser. No. 10/935,960, filed on Sep. 8, 2004, entitled TERNARY AND MULTI-VALUE DIGITAL SIGNAL SCRAMBLERS AND DESCRAMBLERS AND SEQUENCE GENERATORS.

The inversion tables for the ternary, the 4-value and 5-value cases are shown in the following tables.

| input | b | | inverter | in | B | inv | in | b | inv |
|-------|---|---|----------|----|---|-----|----|---|-----|
| 0 | | | | 0 | 0 | | 0 | 0 | | 0 |
| 1 | × | 0 | = | 0 | 1 | × 1 | = 1 | 1 | × 2 | = 2 |
| 2 | | | | 0 | 2 | | 2 | 2 | | 1 |

In the above table, the ternary case is described. In accordance with this aspect of the present invention, multiplying a ternary signal by 0 can be implemented by inverting the signal with the inverter [0 0 0]. Multiplying a ternary signal by 1 can be implemented by inverting with the identity inverter [0 1 2]. Multiplying a ternary signal by 2 can be implemented by inverting with the identity inverter [0 2 1].

Thus, applying an original number to an inverter means replacing the original number with a corresponding number from the inverter. The corresponding number from the inverter is determined by the original number.

For example, if multiplying by 2 is considered, then when multiplying 0×2, 0 is applied to the [0 2 1] inverter and the first number from the inverter (in bold) is taken, yielding 0. When multiplying 1×2, 1 is applied to the [0 2 1] so that the second number from the inverter (in bold) is taken, yielding 2. When multiplying 2×2 to the [0 2 1] inverter, the third number from the inverter (in bold) is taken, yielding 1. As can be seen, this process yields the residue for the operation of multiplying by 2.

| in | b | inv | in | b | inv | in | b | inv |
|----|---|-----|----|---|-----|----|---|-----|
| 0  |   |     | 0  | 0 |     | 0  | 0 |     |
| 1  | × 1 = | 1 | 1 | × 2 = | 2 | 1 | × 3 = | 3 |
| 2  |   |     | 2  | 2 |     | 0  | 2 |     | 2 |
| 3  |   |     | 3  | 3 |     | 2  | 3 |     | 1 |

The 4-value case to generate the residue is illustrated in the table above. In accordance with this aspect of the present invention, multiplying a 4-value number (multiplicand) with a multiplier b=0 can be implemented by inverting the number with the inverter [0 0 0 0]. Multiplying a 4-value number (multiplicand) with a multiplier b=1 can be implemented by inverting the number with the inverter [0 1 2 3]. Multiplying a 4-value number by 2 can be implemented by inverting the number with the non-reversible inverter [0 2 0 2]. Multiplying a 4-value number by 3 can be implemented by inverting the number with the inverter [0 3 2 1]. The operation of applying the number to the inverter is the same as described in the previous paragraph.

| in | b | inv | in | b | inv | in | b | Inv | in | b | inv |
|----|---|-----|----|---|-----|----|---|-----|----|---|-----|
| 0 |   |   | 0 | 0 |   | 0 | 0 |   | 0 | 0 |   | 0 |
| 1 |   |   | 1 | 1 |   | 2 | 1 |   | 3 | 1 |   | 4 |
| 2 | × 1 = | 2 | 2 | × 2 = | 4 | 2 | × 3 = | 1 | 2 | × 4 = | 3 |
| 3 |   |   | 3 | 3 |   | 1 | 3 |   | 4 | 3 |   | 2 |
| 4 |   |   | 4 | 4 |   | 3 | 4 |   | 2 | 4 |   | 1 |

The 5-value case for the residue is illustrated in the table above. In accordance with this aspect of the present invention, multiplying in the 5-value case is again (as in the ternary case) identical with inverting with reversible inverters. Multiplying a 5-value number (multiplicand) by an multiplier b=0 can be implemented by inverting the number with the inverter [0 0 0 0 0]. Multiplying a 5-value number by 1 can be implemented by inverting the number with the inverter [0 1 2 3 4]. Multiplying a 5-value number by 2 can be implemented by inverting the number with the non-reversible inverter [0 2 4 1 3]. Multiplying a 4-value number by 3 can be implemented by inverting the number with the inverter [0 3 1 4 2]. Multiplying a 4-value number by 4 can be implemented by inverting the number with the inverter [0 4 3 2 1].

It should be clear that this method can be applied to any n-value multiplications. The above process yields correct results for modulo-n multiplication. That is, there is no carry result, only a residue result. Of course, many applications will have full multiplication and not just modulo-n multiplication. This means that a multiplication carry must be generated.

As previously mentioned with respect to the situation with binary numbers, the carry result can be generated in the same manner as the residue result. That is, the numbers to be multiplied can be applied to a truth table to generate the carry result. The truth table of the inverters for generating the carry for ternary multiplying with either a factor 0, 1 or 2, in accordance with one aspect of the present invention, is shown in the following table:

| input | b | carry-invert | in | b | car-inv | in | b | car-inv |
|-------|---|--------------|----|---|---------|----|---|---------|
| 0 |   |   | 0 | 0 |   | 0 | 0 |   | 0 |
| 1 | × 0 = | 0 | 1 | × 1 = | 0 | 1 | × 2 = | 0 |
| 2 |   |   | 0 | 2 |   | 0 | 2 |   | 1 |

Thus, to generate a carry result in the ternary case, the above inverters can be applied to the input signal. When multiplying by 0 or 1, the [0 0 0] inverter is applied in the manner described above to generate the carry result. When multiplying by 1, the [0 0 1] inverter is applied to generate the carry result.

The truth table of the inverters for generating the carry for 4-value multiplying with either a factor 0, 1, 2 or 3 is shown in the following table.

| in | B | car-inv | in | B | inv | in | b | inv |
|----|---|---------|----|---|-----|----|---|-----|
| 0 |   |   | 0 | 0 |   | 0 | 0 |   | 0 |
| 1 | × 1 = | 0 | 1 | × 2 = | 0 | 1 | × 3 = | 0 |
| 2 |   |   | 0 | 2 |   | 1 | 2 |   | 1 |
| 3 |   |   | 0 | 3 |   | 1 | 3 |   | 2 |

Thus, to generate a carry result in the 4-value case, the inverters specified above can be applied to the input signal. When multiplying by 0 or 1, the [0 0 0 0] inverter is applied in the manner described above to generate the carry result. When multiplying by 2, the [0 0 1 1] inverter is applied to generate the carry result. When multiplying by 3, the [0 0 1 2] inverter is applied to generate the carry result.

The truth table of the inverters for generating the carry for 5-value multiplying with either a factor 0, 1, 2, 3 or 4 is shown in the following table:

| in | B | | inv | in | b | | inv | in | b | | inv | In | in | b | | inv |
|----|---|---|-----|----|----|----|-----|----|----|----|-----|----|----|----|----|-----|
| 0  |   |   | 0   | 0  |    |    | 0   | 0  |    |    | 0   | 0  | 0  |    |    | 0   |
| 1  |   |   | 0   | 1  |    |    | 0   | 1  |    |    | 0   | 1  | 0  |    |    | 0   |
| 2  | × | 1 | = 0 | 2  | ×  | 2  | = 0 | 2  | ×  | 3  | = 1 | 1  | 2  | ×  | 4  | = 1 |
| 3  |   |   | 0   | 3  |    |    | 1   | 3  |    |    | 1   | 1  | 3  |    |    | 2   |
| 4  |   |   | 0   | 4  |    |    | 1   | 4  |    |    | 2   | 2  | 4  |    |    | 3   |

Thus, to generate a carry result in the 5-value case, the inverters specified above can be applied to the input signal. When multiplying by 0 or 1, the [0 0 0 0 0] inverter is applied in the manner described above to generate the carry result. When multiplying by 2, the [0 0 0 1 1] inverter is applied to generate the carry result. When multiplying by 3, the [0 0 1 1 2] inverter is applied in the manner described above to generate the carry result. When multiplying by 4, the [0 0 1 2 3] inverter is applied to generate the carry result.

As before, the generation of carry results can be extended to the n-value case.

It is known that binary multi-digit multiplication is the same as shift-and-add. This is not the case in higher radix number systems. The reason for that is of course that in radix-n multiplication the multiplicand can be multiplied with (n−2) possible multipliers not equal to 0 or 1. This requires that a radix-n multiplication has to generate a residue as well as a carry. In a radix-2 number system, the highest single digit multiplication is 1×1, which is 1 and does not generate a carry. A ternary (or radix-3) multiplier has as its highest multiplication 2×2 (if the ternary numbers are assumed to be 0, 1 and 2). In radix-3 the decimal 4 is [1 1], and contains a carry digit. The notation in the brackets is [carry residue].

The residue and carry truth tables for radix-3 (or ternary) and radix-4 (or 4-value) multiplication are shown in the following truth tables. Res_m3 is the truth table for the radix-3 residue and Car_m3 is the truth table for the radix-3 carry. Similarly, Res_m4 and Car_m4 are the truth tables for the radix-4 situation.

| res_m3 | 0 | 1 | 2 |
|--------|---|---|---|
| 0      | 0 | 0 | 0 |
| 1      | 0 | 1 | 2 |
| 2      | 0 | 2 | 1 |

| car_m3 | 0 | 1 | 2 |
|--------|---|---|---|
| 0      | 0 | 0 | 0 |
| 1      | 0 | 0 | 0 |
| 2      | 0 | 0 | 1 |

| res_m4 | 0 | 1 | 2 | 3 |
|--------|---|---|---|---|
| 0      | 0 | 0 | 0 | 0 |
| 1      | 0 | 1 | 2 | 3 |
| 2      | 0 | 2 | 0 | 2 |
| 3      | 0 | 3 | 2 | 1 |

| car_m4 | 0 | 1 | 2 | 3 |
|--------|---|---|---|---|
| 0      | 0 | 0 | 0 | 0 |
| 1      | 0 | 0 | 0 | 0 |
| 2      | 0 | 0 | 1 | 1 |
| 3      | 0 | 0 | 1 | 2 |

The columns in the truth tables are simply the inverters from the tables presented above.

There are several striking characteristics in multiplication. First of all, assuming that each function takes at least one clock cycle to be executed, it appears to be somewhat of a waste that at least half of the results of a function will be the state 0.

Addition by Inverters

Addition of radix-n numbers can also be executed by inverters, either with or without the use of gates. Gates are explained in U.S. patent application Ser. Nos. 10/935,960 and 11/000,218, filed on Sep. 8, 2004 and Nov. 30, 2004, respectively. Both of these patent applications are hereby incorporated herein in their entirety.

In the ternary case, the modulo-3 addition of a constant to a radix-3 number can be executed by a ternary inverter. Adding a 0 to a radix-3 number represented by a ternary signal is equal to passing the signal through a ternary identity inverter [0 1 2].

Say a ternary number is represented by a ternary signal A which can have one of three states [0 1 2]. Passing this signal through ternary inverter i30=[0 1 2] generates an unchanged signal, or a 0 was added. In case of full addition, the carry has to be determined, which in this case would be 0. In case of 0 is 'absence of signal' no action needs to be taken.

Adding a ternary signal with states [0 1 2] with a constant 1 is identical to passing the ternary signal through an inverter i31=[1 2 0], which will generate the modulo-3 sum or radix-3 residue. The appropriate carry can be generated by passing the signal through an inverter ic1=[0 0 1].

Adding a ternary signal with states [0 1 2] with a constant 2 is identical to passing the ternary signal through an inverter i31=[2 0 1], which will generate the modulo-3 sum or radix-3 residue. The appropriate carry can be generated by passing the signal through an inverter ic2=[0 1 1].

A diagram of adding a constant to a single digit number by way of inverters is shown in FIG. 1. An incoming ternary signal is inputted on line 1101 and is split to inverter 1102 to generate the radix-3 residue and to inverter 1103 to generate the carry. The residue is available on output 1104. The carry is available on output 1105. The inverters 1102 and 1103 implement the above described inverters.

The addition of two variable single digit radix-3 numbers is described by the following truth tables. Truth table r3 describes the generation of the residue and truth table c3 describes the generation of the ternary carry.

|    |   | A |   |   |    |   | A |   |   |
|----|---|---|---|---|----|---|---|---|---|
| r3 |   | 0 | 1 | 2 | c3 |   | 0 | 1 | 2 |
| b  | 0 | 0 | 1 | 2 | b  | 0 | 0 | 0 | 0 |
|    | 1 | 1 | 2 | 0 |    | 1 | 0 | 0 | 1 |
|    | 2 | 2 | 0 | 1 |    | 2 | 0 | 1 | 1 |

Figure 2:
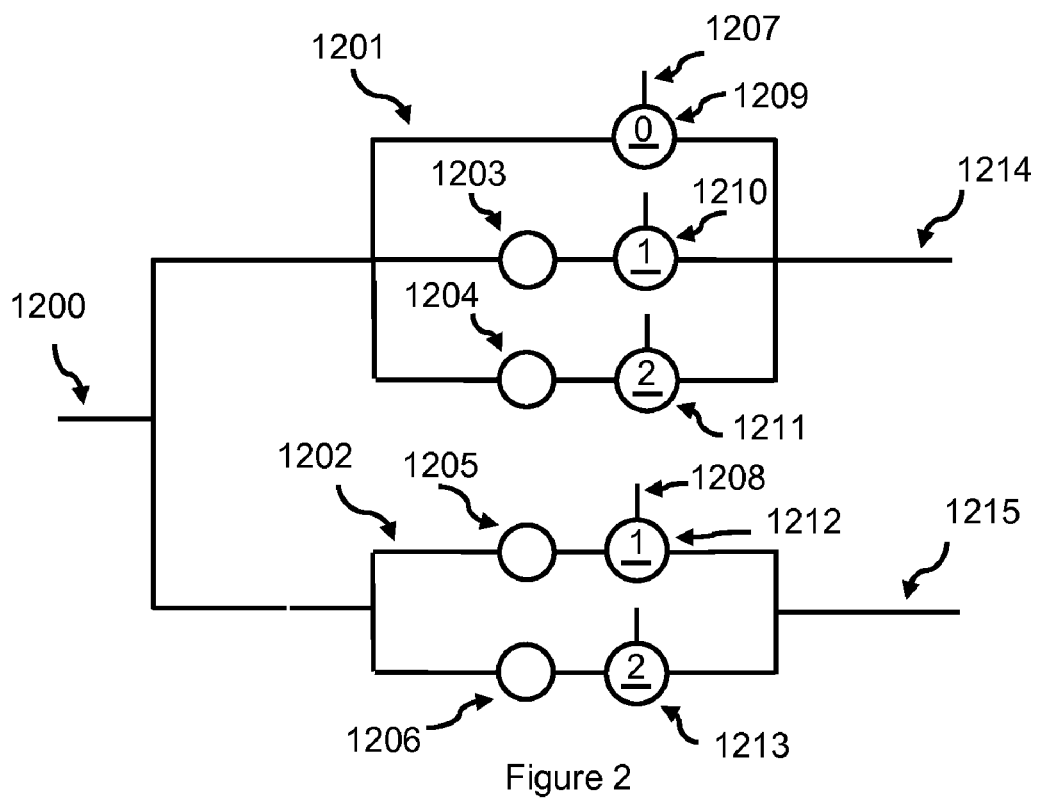
FIG. 2 is a diagram of a full adder.

A diagram of a full single digit ternary adder is shown in FIG. 2. The adder comprises two parts: a first part 1201 for generating the residue and a second part 1202 for the carry. Input 1200 has, what is designated as signal 'b' in the truth table, as its ternary input signal. All gates have as control signal ternary the signal which is designated as signal 'a' in truth table r3 and c3. Consequently all gates in FIG. 12 (1209, 1210, 1211, 1212 and 1213) have signal 'a' as their control input on line 1207. It should be clear that the functions r3 and c3 are commutative and that reversing the order of 'a' and 'b' is possible without changing the result. The gates 1209 to 1213 can be any type of switches, including optical switches, mechanical switches or semi-conductor devices.

Circuit 1201 has three branches, with each branch a gate. Gate 1209 in the first branch is conducting when its control input 1207 is in state 0, as indicated with by the 0 inside the gate 1209. When input a=0 then signal 'b' sees according to ternary function r3 an inverter represented by the column under a=0 in the truth table of r3. This is [0 1 2] and thus the identity. So the branch of gate 1209 has no inverter.

The branch of gate 1210 is conducting when a=1, as indicated by the 1 inside the gate 1210. Signal 'b' then 'sees' the inverter 1203 (as before) derived from the corresponding column in the truth table of r3. The inverter 1203 is [1 2 0].

The branch with gate 1211 is conducting when a=2. The required inverter 1204, from the table r3 above, is [2 0 1].

Circuit 1202 makes use of the fact that state 0 is 'absence of signal'. The output of circuit 1202, according to the truth table of ternary function c3, is either 0 or 1. Looking at the truth table of c3, it is clear that when 'a' is not 1 and not 2 it has to be 0 and all outputs for a=0 are 0, and no inverter and no gate are needed. Alternatively, a gate that is enabled when its control input is 0 can be placed in parallel with gates 1212 and 1213 for the physical embodiment where the state 0 is not equal to absence of signal.

For a=1 the signal 'sees' inverter [0 0 1] which is inverter 1205. The gate 1212 is conducting when a=1. The branch with gate 1213 is conducting when a=2 and signal 'b' sees inverter 1206 which is [0 1 1]. Again, the inverters are derived from the carry tables set forth above.

The gates described above can be generated with normal digital electronics by one of ordinary skill in the art. Alternatively, they can be generated by specially designed circuits. See, for example, the discussion in patent application Ser. No. 11/000,218, filed Nov. 30, 2004.

One aspect of logic switching is that logic states will have to be represented by physical signals. Thus, there must be a physical source for these signals. In accordance with one aspect of the present invention, a constant source of a signal, such as a voltage regulator, is tapped and the constant output is passed through a gate have its signal pass when the gate is conducting. Especially when an inverter is difficult or expensive to realize, it may be cheaper or more efficient to tap directly into the source. Such a source could be a constant voltage rail for instance in case of electronic circuits.

This applies to all n-value logics. As an example, the circuit 1202 of FIG. 2 will be realized with constant sources, assuming that 0 is 'absence of signal'. The result is shown in FIG. 3.

Figure 3:
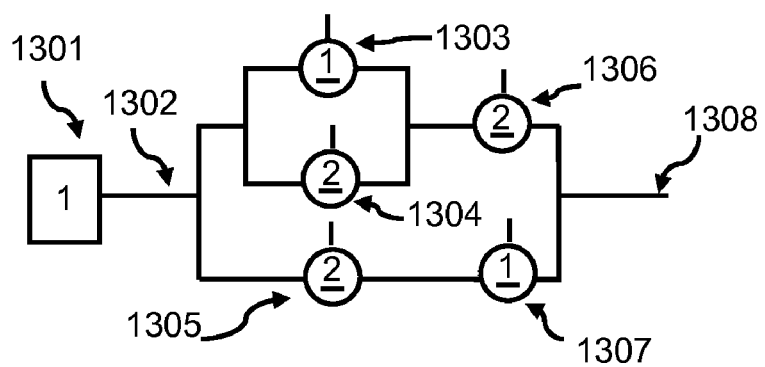
FIG. 3 is a diagram of an adder with a constant source.

Thus, the diagram of FIG. 3 describes the realization of the ternary logic function c3. At its input 1302, it has a constant source 1301 which provides the signal equivalent with signal state 1 to input 1302. This is typically an instant voltage source. The rest of the circuit comprises connections and gates. Its purpose is to conduct state 1 through the circuit under conditions provided by the truth table of function c3 to output 1308. If none of the required conditions are met, the signal on the output 1308 will be not 1 and thus 0. The gates 1303, 1304 and 1305 have as their control signal the ternary signal 'a'. Gate 1303 is conducting when a=1; gate 1304 is conducting when a=2 and gate 1305 is conducting for a=2. Gates 1306 and 1307 have signal 'b' as control input. Gate 1306 is conducting for b=2 and gate 1307 is conducting for b=1. When no gate is enabled, the output at 1308 is pulled down to 0.

For instance, ternary function c3 dictates that for a=2 and b=1 the carry has to be 1. When a=2 the gate 1305 is conducting and when b=1 gate 1307 is conducting, creating a conducting path from source 1301 to output 1308, as required.

Another example is when a=1 and b=1. In that case gate 1303 and 1307 are conducting, but no conducting path from source 1301 to output 1308 is established. There will be no signal on output 1308 which is then in state 0. Essentially, the signal 1 from source 1301 is passed through the gate structure only when ab=[1 2], [2 1] or [2 2].

For completeness the following tables summarize the radix-3, radix-4 and radix-5 additions in residues and carries by way of inverters.

Radix-3 Add Residue Inverters

| input |   | b |   | Invert | in |   | b |   | inv | in |   | b |   | inv |
|-------|---|---|---|--------|----|---|---|---|-----|----|---|---|---|-----|
| 0     |   |   |   | 0      | 0  |   |   |   | 1   | 0  |   |   |   | 2   |
| 1     | + | 0 | = | 1      | 1  | + | 1 | = | 2   | 1  | + | 2 | = | 0   |
| 2     |   |   |   | 2      | 2  |   |   |   | 0   | 2  |   |   |   | 1   |

Radix-3 Add Carry Inverters

| input |   | b |   | Invert | in |   | b |   | inv | in |   | b |   | inv |
|-------|---|---|---|--------|----|---|---|---|-----|----|---|---|---|-----|
| 0     |   |   |   | 0      | 0  |   |   |   | 0   | 0  |   |   |   | 0   |
| 1     | + | 0 | = | 0      | 1  | + | 1 | = | 0   | 1  | + | 2 | = | 1   |
| 2     |   |   |   | 0      | 2  |   |   |   | 1   | 2  |   |   |   | 1   |

Radix-4 Add Residue Inverters

| in |   | B |   | inv | in |   | b |   | inv | in |   | b |   | inv |
|----|---|---|---|-----|----|---|---|---|-----|----|---|---|---|-----|
| 0  |   |   |   | 1   | 0  |   |   |   | 2   | 0  |   |   |   | 3   |
| 1  | + | 1 | = | 2   | 1  | + | 2 | = | 3   | 1  | + | 3 | = | 0   |
| 2  |   |   |   | 3   | 2  |   |   |   | 0   | 2  |   |   |   | 1   |
| 3  |   |   |   | 0   | 3  |   |   |   | 1   | 3  |   |   |   | 2   |

Radix-4 Add Carry Inverters

| in |   | B |   | inv | in |   | b |   | inv | in |   | b |   | inv |
|----|---|---|---|-----|----|---|---|---|-----|----|---|---|---|-----|
| 0  |   |   |   | 0   | 0  |   |   |   | 0   | 0  |   |   |   | 0   |
| 1  | + | 1 | = | 0   | 1  | + | 2 | = | 0   | 1  | + | 3 | = | 1   |

-continued

| in | B | inv | in | b | inv | in | b | inv |
|----|---|-----|----|----|-----|----|----|-----|
| 2  |   | 0   | 2  |    | 1   | 2  |    | 1   |
| 3  |   | 1   | 3  |    | 1   | 3  |    | 1   |

Radix-5 Add Residue Inverters

| in | B | | | inv | in | b | | inv | in | b | | inv | in | b | | inv |
|----|---|---|---|-----|----|---|---|-----|----|---|---|-----|----|---|---|-----|
| 0  |   |   |   | 1   | 0  |   |   | 2   | 0  |   |   | 3   | 0  |   |   | 4   |
| 1  |   |   |   | 2   | 1  |   |   | 3   | 1  |   |   | 4   | 1  |   |   | 0   |
| 2  | + | 1 | = | 3   | 2  | + | 2 | = | 4  | 2 | + | 3 | = | 0  | 2 | + | 4 | = | 1   |
| 3  |   |   |   | 4   | 3  |   |   | 0   | 3  |   |   | 1   | 3  |   |   | 2   |
| 4  |   |   |   | 0   | 4  |   |   | 1   | 4  |   |   | 2   | 4  |   |   | 3   |

Radix-5 Add Carry Inverters

| in | B | | | inv | in | b | | inv | in | b | | inv | in | b | | inv |
|----|---|---|---|-----|----|---|---|-----|----|---|---|-----|----|---|---|-----|
| 0  |   |   |   | 0   | 0  |   |   | 0   | 0  |   |   | 0   | 0  |   |   | 0   |
| 1  |   |   |   | 0   | 1  |   |   | 0   | 1  |   |   | 0   | 1  |   |   | 1   |
| 2  | + | 1 | = | 0   | 2  | + | 2 | = | 0  | 2 | + | 3 | = | 1  | 2 | + | 4 | = | 1   |
| 3  |   |   |   | 0   | 3  |   |   | 1   | 3  |   |   | 1   | 3  |   |   | 1   |
| 4  |   |   |   | 1   | 4  |   |   | 1   | 4  |   |   | 1   | 4  |   |   | 1   |

The above examples are intended as illustrative examples only. It should be clear to those skilled in the art that, for instance, multi-digit additions are also possible. In that case an addition result can be the sum of a residue and an incoming carry. The inverter method here described allows for realizing such and other adder circuits in any n-value logic.

Subtraction by Inverters

Subtraction in radix-n is usually executed as a complement-n addition. However it is possible to execute radix-n subtraction as a direct n-valued logic operation.

The method of radix-n subtraction by use of inverters will be described next. In the expression c=a−b, c is called the difference, a is called the minuend and b is called the subtrahend.

Subtraction is a non-commutative operation and the order of the inputs does make a difference. Subtraction creates a term similar to a carry, however in this case it is called a borrow. It is assumed in the illustrative examples that the minuend is equal to or greater than the subtrahend, so there should be no concerns about the sign of the difference.

In the ternary case the modulo-3 subtraction of a constant from a radix-3 number can be executed by a ternary inverter. Subtracting a 0 from a radix-3 number represented by a ternary signal is equal to passing the signal through a ternary identity inverter.

Say a ternary number is represented by a ternary signal A which can have one of three states [0 1 2]. Passing this signal through ternary inverter i30=[0 1 2] generates an unchanged signal, or a 0 was subtracted. In case of full subtraction, the borrow has to be determined, which in this case would be 0. In case of 0 is 'absence of signal', which is assumed in the rest of subtraction, no action needs to be taken.

Subtracting a constant 1 from a ternary signal with states [0 1 2] is identical to passing the ternary signal through an inverter i32=[2 0 1], which will generate the modulo-3 difference or radix-3 subtraction residue. The appropriate borrow digit can be generated by passing the signal through an inverter ib1=[1 0 0].

Subtracting a constant 2 from a ternary signal with states [0 1 2] is identical to passing the ternary signal through an inverter i31=[1 2 0], which will generate the modulo-3 difference or radix-3 subtraction residue. The appropriate borrow digit can be generated by passing the signal through an inverter ib2=[1 1 0].

A diagram of subtracting a constant from a single digit number by way of inverters is shown in FIG. 1. This is the same circuit used to generate an adder function, with different inverters. An incoming ternary signal is inputted to 1101 and is split to inverter 1102 to generate the radix-3 subtraction residue and to inverter 1103 to generate the borrow digit. The residue is available on output 1104. The borrow digit is available on output 1105. The appropriate inverters are described above.

The subtraction of two single digit radix-3 numbers is described by the following truth tables. Truth table rs3 describes the generation of the residue and truth table b3 that of the ternary borrow. The truth tables describe the result of a−b, which is of course a non-commutative operation.

| | | A | | | | | a | | |
|-----|---|---|---|---|-----|---|---|---|---|
| rs3 |   | 0 | 1 | 2 | b3  |   | 0 | 1 | 2 |
| b   | 0 | 0 | 1 | 2 | b   | 0 | 0 | 0 | 0 |
|     | 1 | 2 | 0 | 1 |     | 1 | 1 | 0 | 0 |
|     | 2 | 1 | 2 | 0 |     | 2 | 1 | 1 | 0 |

Figure 4:
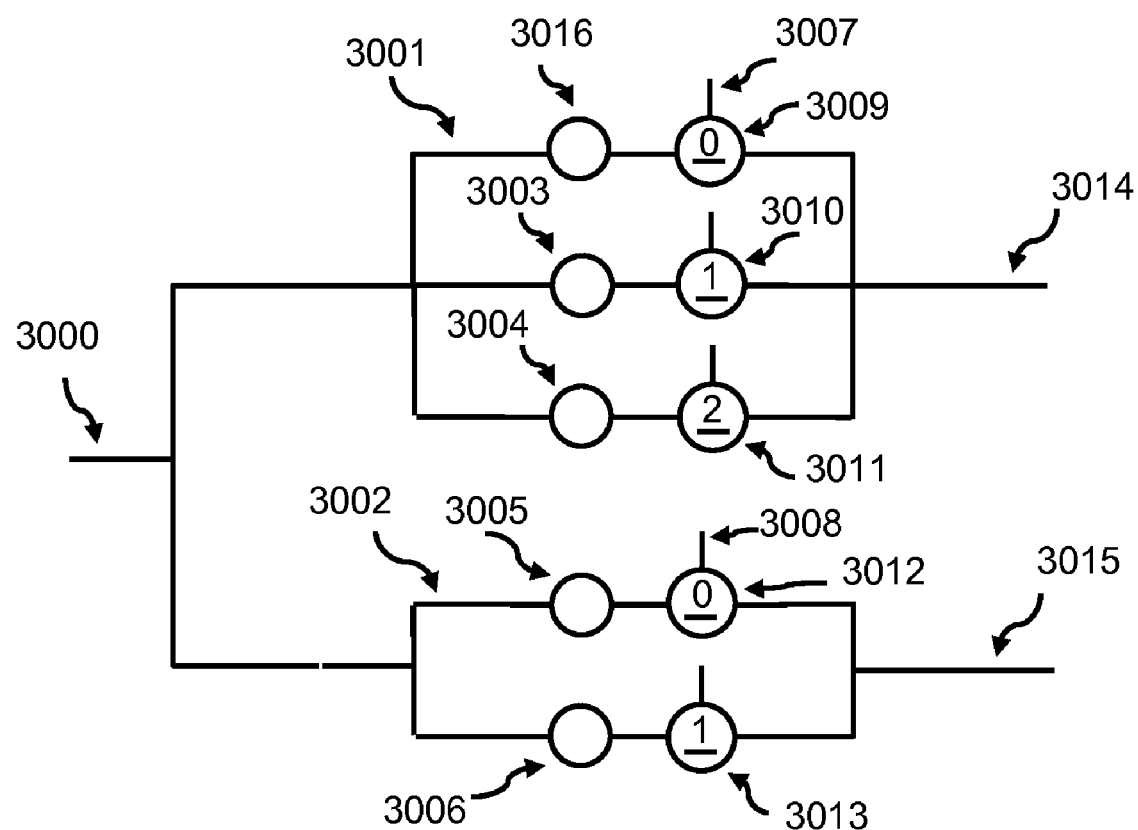
FIG. 4 illustrates a subtraction circuit.

A diagram of a full single digit ternary subtraction is shown in FIG. 4. The subtraction comprises two parts: 3001 for generating the residue and 3002 for the borrow. Input 3000 has, what is designated as signal 'b' in the truth table, as its ternary input signal. All gates have as control signal the ternary signal which is designated as signal 'a' in truth table rs3 and b3. Consequently all gates in FIG. 30 (3009, 3010, 3011, 3012 and 3013) have signal 'a' as their control input. It should be clear that the functions rs3 is non-commutative and that reversing the order of 'a' and 'b' is not possible without changing the result.

Circuit 3001 has three branches, with in each branch a gate. Gate 3009 in the first branch is conducting when its control input 3007 is in state 0. When input a=0 then signal 'b' sees according to ternary function rs3 an inverter represented by the column under a=0 in the truth table of rs3. This is [0 2 1] and so the branch of gate 3009 has inverter 3016 [0 2 1].

The branch of gate 3010 is conducting when a=1. Signal 'b' then 'sees' the inverter derived from the corresponding column in the truth table of rs3 is [1 0 2]. The inverter 3003 is [1 0 2].

The branch with gate 3011 is conducting when a=2. The required inverter 3004 is [2 1 0].

Circuit 3002 makes use of the fact that state 0 is 'absence of signal'. The output of circuit 3002, according to the truth table of ternary function b3, is either 0 or 1. Looking at the truth table of b3 it is clear that when 'a' is not 0 and not 1 it has to be 0 and all outputs for a=2 are 0, and no inverter and no gate are needed.

For a=0 the signal 'sees' inverter [0 1 1] which is inverter 3005. The gate 3012 is conducting when a=0. The branch with gate 3013 is conducting when a=1 and signal 'b' sees inverter 3006 which is [0 0 1]. If desired, another branch with a gate that is enabled when a=2 and with an inverter [0 0 0] can be added in parallel to the circuit 3002 if the physical embodiment of the circuit is such that 'absence of signal' does not necessarily represent state 0.

One aspect of logic switching is that logic states are represented by physical signals. It is obvious that there must be a physical source for these signals. So it is possible to tap into such a source and through a gate have its signal pass when the gate is conducting. Especially when an inverter is difficult or expensive to realize, it may be cheaper or more efficient to tap directly into the source. Such a source could be a constant voltage rail for instance in case of electronic circuits.

This applies to all n-value logics. The reasoning and methods applied to adders and as shown in FIG. 3 also applies to subtraction.

For completeness the following tables summarize the radix-3, radix-4 and radix-5 subtraction in residues and borrow digits by way of inverters.

Radix-3 Subtraction Residue Inverters

| input | b | invert | in | b | inv | in | b | inv |
|---|---|---|---|---|---|---|---|---|
| 0 |   |   | 0 |   | 0 | 2 |   | 1 |
| 1 | − 0 | = | 1 | − 1 | = 1 | 0 | − 2 | = 1 |
| 2 |   |   | 2 |   | 2 | 1 |   | 0 |

Radix-3 Subtraction Borrow Inverters

| input | b | invert | in | b | inv | in | b | inv |
|---|---|---|---|---|---|---|---|---|
| 0 |   |   | 0 |   | 0 | 1 |   | 1 |
| 1 | − 0 | = | 0 | − 1 | = 1 | 0 | − 2 | = 1 |
| 2 |   |   | 0 |   | 2 | 0 |   | 0 |

Radix-4 Subtraction Residue Inverters

| in | B | inv | in | b | inv | in | b | inv |
|---|---|---|---|---|---|---|---|---|
| 0 |   | 3 | 0 |   | 2 | 0 |   | 1 |
| 1 | − 1 | = 0 | 1 | − 2 | = 3 | 1 | − 3 | = 2 |
| 2 |   | 1 | 2 |   | 0 | 2 |   | 3 |
| 3 |   | 2 | 3 |   | 1 | 3 |   | 0 |

Radix-4 Subtraction Borrow Inverters

| in | B | inv | in | b | inv | in | b | inv |
|---|---|---|---|---|---|---|---|---|
| 0 |   | 1 | 0 |   | 1 | 0 |   | 1 |
| 1 | − 1 | = 0 | 1 | − 2 | = 1 | 1 | − 3 | = 1 |
| 2 |   | 0 | 2 |   | 0 | 2 |   | 1 |
| 3 |   | 0 | 3 |   | 0 | 3 |   | 0 |

Radix-5 Subtraction Residue Inverters

| in | B | inv | in | b | inv | in | b | inv | in | b | Inv |
|---|---|---|---|---|---|---|---|---|---|---|---|
| 0 |   | 4 | 0 |   | 3 | 0 |   | 2 | 0 |   | 1 |
| 1 |   | 0 | 1 |   | 4 | 1 |   | 3 | 1 |   | 2 |
| 2 | − 1 | = 1 | 2 | − 2 | = 0 | 2 | − 3 | = 4 | 2 | − 4 | = 3 |
| 3 |   | 2 | 3 |   | 1 | 3 |   | 0 | 3 |   | 4 |
| 4 |   | 3 | 4 |   | 2 | 4 |   | 1 | 4 |   | 0 |

Radix-5 Subtraction Borrow Inverters

| in | B | inv | in | b | inv | in | b | inv | in | b | Inv |
|---|---|---|---|---|---|---|---|---|---|---|---|
| 0 |   | 1 | 0 |   | 1 | 0 |   | 1 | 0 |   | 1 |
| 1 |   | 0 | 1 |   | 1 | 1 |   | 1 | 1 |   | 1 |
| 2 | − 1 | = 0 | 2 | − 2 | = 0 | 2 | − 3 | = 1 | 2 | − 4 | = 1 |
| 3 |   | 0 | 3 |   | 0 | 3 |   | 0 | 3 |   | 1 |
| 4 |   | 0 | 4 |   | 0 | 4 |   | 0 | 4 |   | 0 |

The subtraction examples here provided are for illustrative purposes only. It should be clear to those skilled in the art that in case of subtraction for multi-digit numbers the borrow may propagate through the different digits. When a borrow is generated, it has to be resolved by subtracting it from a more significant digit. These subtractions can also be realized with the inverter solutions here provided.

N−1 Complement Coding for Radix-n Subtraction.

Radix-n subtraction a−b=c is the same as addition of a+b'=c wherein b' (the addend in the summation) is the n-complement of the subtrahend b in the subtraction. There are two ways to work with b'. The true n-value complement is determined by subtracting an n-value number with p digits from a (p+1) number starting with the digit 1 and with p following 0s.

For instance the complement of the ternary number 1 0 1 is calculated in the following table.

|   | 1 | 0 | 0 | 0 |
|---|---|---|---|---|
| − |   | 1 | 0 | 1 |
|   + |   | 1 | 2 | 2 |

For subtraction purposes one can also calculate the (n−1) complement. One can then add the (n−1) complement as the addend to the augend. However it requires adjustment to the result by adding 1 to the sum if the augend is greater than or equal to the augend. Creating the 2-complement of a 3-value number is shown in the following table.

|   | 2 | 2 | 2 |
|---|---|---|---|
| − | 1 | 0 | 1 |
|   | 1 | 2 | 1 |

Creating the 2-complement of a 3-value or ternary digit can be achieved by a ternary inverter: [2 1 0].

Creating the 3-complement of a 4-value digit can be achieved by a 4-value inverter: [3 2 1 0].

Creating the (n−1)-complement of a n-value digit can be achieved by an n-value inverter: [(n−1) (n−2) (n−3) ... 2 1 0].
Gates and switching solutions.

The multi-value switching technology includes two important novel applications, which are described in U.S. patent application Ser. No. 11/000,218, filed by the inventor of this application on Nov. 30, 2004. These are:

1. Predictive switching: in current electronic logic application with multi-level circuits (either binary or multi-value) each logic function has an output which serves as the input to a next function. This means that the next function has to wait for the previous one to be completed with a result before it can start executing. Realization with individually controlled gates allows a solution path to be created where a conducting path from input to output is created at the moment when the input signals are available.

2. Corrective switching: switching solutions (multi-value and binary) allow for the creation of parallel solution paths. A parallel solution path can be a 'repair' to an initial desirable solution that is not complete or incorrect. An example will be provided later. Elements of multi-value multiplications.

An important operation in computer arithmetic is considered to be the addition of two multiplications of two digits.

One way to execute (a0b0+a1b1) in n-value logic is by first executing the individual multiplications followed by the addition of the products.

In ternary logic, the highest number that can be generated by a0×b0 with a0 and b0 single ternary digits is 2×2=4 decimal or [1 1] in radix-3. That means that the highest sum of a0b0+a1b1 can be 8 in decimal or [2 2] in radix-3. A general addition of two 2-digit ternary numbers requires 2 full cycles and 1 half cycle. Because the maximum of the sum is [2 2], the addition part of a0b0+a1b1 requires only 1 full cycle and 1 half cycle.

For 4-value logic, the highest number generated by a0b0 with a0 and b0 4-value single digits is 3×3=9 decimal or [2 1] radix-4. The sum of a0b0+a1b1 with a0, b0, a1 and b1, all single 4-value digits, can have a maximum value of 18 decimal or [1 0 2] in radix-4. The next lower number that can be reached is 9+6=15 or [0 3 3] in radix-4. Consequently, the carry of the sum of a0b0+a1b1 can only propagate 1 position and the sum can be determined in 1 full cycle with 1 half cycle, rather than the required 2 and a half cycle of a full 2 digit radix-4 addition. In this approach, the numbers 16 and 17 will not be generated by the sum. Thus, it is easy to determine when the second carry occurs.

This approach to add partial products saves additional circuitry and execution cycles.

In an earlier patent application filed by the inventor, it was shown that the modulo-n addition of two digits, in which each individual digit is multiplied by a factor modulo-n, is the same as inputting the two original (not factor multiplied) digits into an n-value logic function not equal to the modulo-n addition, (see U.S. patent application Ser. No. 10/935,960 filed Sep. 8, 2004). The n-value logic function has a truth table in which columns and rows are transposed in relation to the modulo-n addition truth table.

In ternary logic, multiplying by 1 is equal to inverting with the identity [0 1 2]. Multiplying by 2 is inverting with [0 2 1]. Assume that the a-input of the device determines the columns of the truth table and the b-input the rows. When a ternary input signal a1 is multiplied modulo-3 with a constant factor b1, it is equal to having ternary signal a1 being inverted with ternary inverter m1. When ternary input a2 is multiplied with a constant factor b2, it is equal to having signal a2 inverted with inverter m2. To add the product a1b1 with a2b2 is then the same as having a1 and a2 being the input to a logic function R. Thus, it is possible to solve the equation a1 b1+a2 b2, where b1 and b2 are constants, by inputting a1 and a2 to a truth table that defines the function R.

The appropriate function R1, R2, R3, or R4 are selected in accordance with b1 and b2 as shown in the following table:

| b1 = 1; b2 = 1 | | a1 | | b1 = 1; b2 = 2 | | a1 | | b1 = 2; b2 = 1 | | a1 | | b1 = 2; b2 = 2 | | a1 | |
|---|---|---|---|---|---|---|---|---|---|---|---|---|---|---|---|
| R1 | | 0 | 1 | 2 | R2 | | 0 | 1 | 2 | R3 | | 0 | 1 | 2 | R4 | | 0 | 1 | 2 |
| a2 | 0 | 0 | 1 | 2 | a2 | 0 | 0 | 1 | 2 | a2 | 0 | 0 | 2 | 1 | a2 | 0 | 0 | 2 | 1 |
|    | 1 | 1 | 2 | 0 |    | 1 | 2 | 0 | 1 |    | 1 | 1 | 0 | 2 |    | 1 | 2 | 1 | 0 |
|    | 2 | 2 | 0 | 1 |    | 2 | 1 | 2 | 0 |    | 2 | 2 | 1 | 0 |    | 2 | 1 | 0 | 2 |

This can be part of multiplication of two multi-digit numbers such as: number1=a1 a2 a3 ... and number2=b1 b2 b3 ....

The core of a multiplication solution may be the operation (a1b1+a2b2). The indices 1 and 2 are illustrative only and may be different in actual operations. The core operations comprise: first calculating a multiplication a1*b1 and a multiplication a2*b2 followed by addition of the two products.

Figure 5:
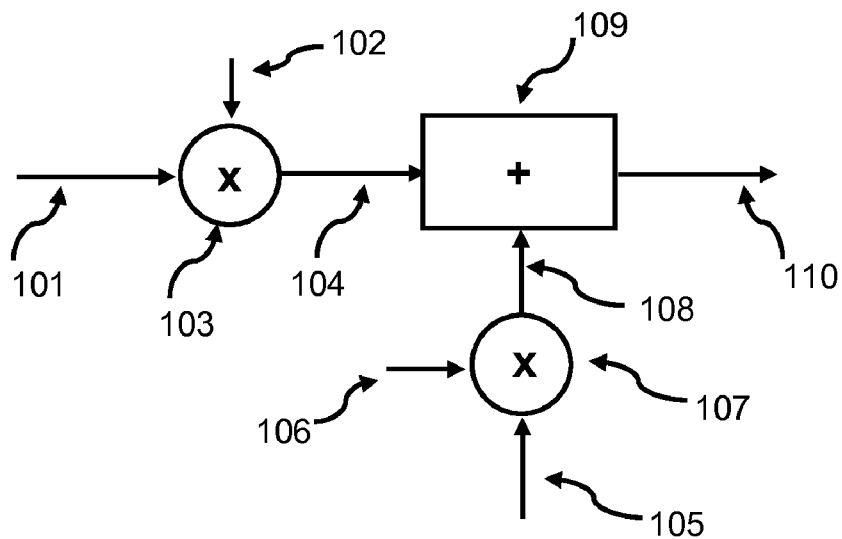
FIG. 5 is a diagram of a circuit that executes a0b0+a1b1 including two multipliers and an adder.
Figure 6:
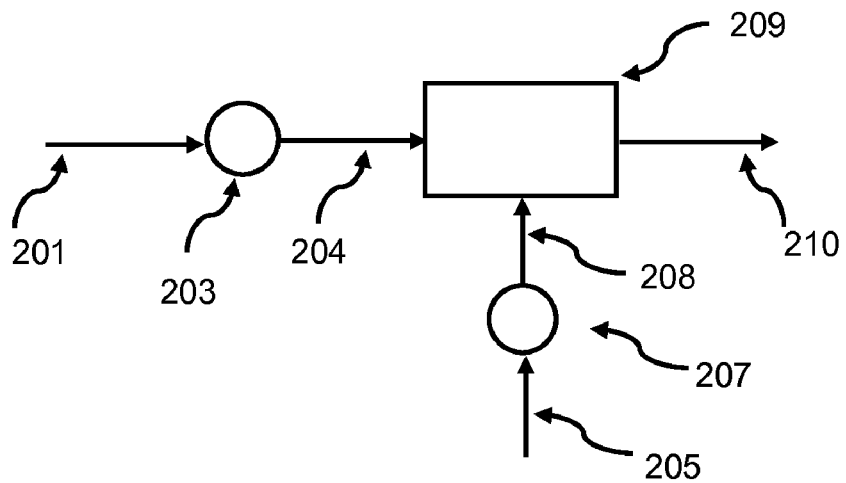
FIG. 6 is a diagram of a circuit with the functionality of the circuit of FIG. 5 wherein the multipliers are substituted by inverters.
Figure 7:
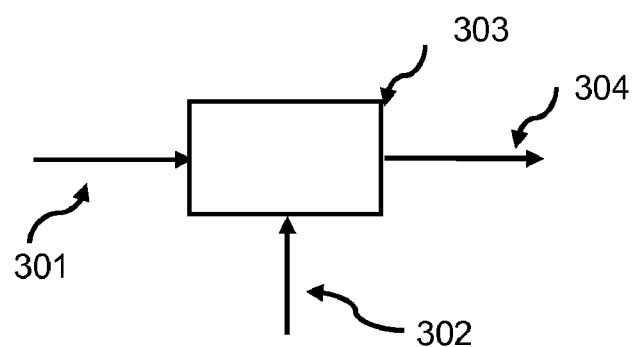
FIG. 7 is a diagram of a circuit with the functionality of the circuit of FIG. 6 wherein the multipliers and inverters are substituted by a single logic function.

By applying these functions, the expression: a1b1+a2b2 can be realized with executing a single ternary function as is shown in the diagram of FIG. 5, FIG. 6 and FIG. 7. FIG. 5 shows the diagram of two individual signals, each being multiplied by a constant and then added together. In FIG. 5 input 101 to multiplier 103 can have signal a1. In that case the signal on input 102 is b1. The output 104 has then the residue of a1×b1. Input 105 to multiplier 107 has signal a2 and input 106 has signal b2. The output 108 has a2×b2. The signals a1b1 and a2b2 are added in adder 109 and the sum is available at output 110. In FIG. 6 the multipliers 103 and 107 of FIG. 5 have been replaced by inverters 203 and 207. In FIG. 7, the inverters 203 and 207 of FIG. 6 and the adder 209 of FIG. 6 have been replaced by a single logic function 303 in FIG. 7. The input 301 has signal a1 and the input 302 has signal a2. The output 304 has output a1b1+a2b2. It should be clear that the function of device 303 is specific to the factors b1 and b2.

The above description generates the resulting residue of a multiplication sum a1b1+a2b2. A similar approach can be taken to create the relevant ternary function Carry for the relevant multiplication factors. For the expression a1b1+a2b2, wherein either b1 or b2 is 0, only the combinations (b1=0, b2=2) and (b1=2, b2=0) will generate a carry. The carry 1 will be generated for a1=2 and b1=2 and for a2=2 and b2=2.

To check the value of the individual Carry results one should execute the expression a1b1+a2b2 in a function Cn with the appropriate values of a1, a2, b1 and b2. For instance, when one uses function C2 and a1=2 and a2=2 with b1=1 and b2=2 then a1b1+a2b2=2+4=6. The value 6 in a radix-3 number system has the digits [2 0]. So the Carry value is 2. The truth tables of the functions C1, C2, C3 and C4 are illustrated above. For both the 'multiply-and-addition' residue as its carry function, the case where either b0 or b1 is 0, the applied ternary functions will become ternary inverters. If b0=0 then of course a0b0=0 and the expression (a0b0+a1b1) becomes just a1b1. In the ternary case, the circuit will be an inverter representing multiplying with b=1 (an identity inverter [012]) or with b=2 (inverter [0 2 1]) with input a1. The reverse is true for b1=0. In that case, the circuit will be an inverter with input a0. The case b0=0 and b 1=0 is a trivial one in case 0 is represented by 'absence of signal'.

The Ternary Logic Multiplier

The multiplication number_a times number_b or: number_a×number_b comprises two numbers. The number number_a is called the multiplicand and number_b is called the multiplier. There are generally accepted rules how to calculate multi-digit numbers. The following table shows the multiplication of two 4 digit numbers. The multiplicand is a=[a3 a2 a1 a0] and the multiplier is b=[b3 b2 b1 b0].

| number 1 | | | | a3 | a2 | a1 | a0 |
|---|---|---|---|---|---|---|---|
| number 2 | | | | b3 | b2 | b1 | b0 |
| pp1 | | | | b0a3 | b0a2 | b0a1 | b0a0 |
| pp2 | | | b1a3 | b1a2 | b1a1 | b1a0 | |
| pp3 | | b2a3 | b2a2 | b2a1 | b2a0 | | |
| pp4 | b3a3 | b3a2 | b3a1 | b3a0 | | | |

The term pp stands for Partial Product. In order to calculate the total product of this multiplication, the partial products have to be added, making sure to distinguish between the positions of the elements of each partial product. The elements of the partial products are shown as terms like b0a3. It should be clear that in a radix-n system, the term b0a3 should be represented by its radix-n digits. For instance if b0a3 is 4 it should be represented in radix-3 as [1 1]. To solve this problem in accordance with one aspect of the present invention, the sum of pp1+pp2 is determined and the sum of pp3+pp4 is also determined. These two sums are then added together to get the result.

The first part of the problem, the sum of the partial products pp1 and pp2 (pp1+pp2) is represented in the following table:

| number 1 | | a3 | a2 | a1 | a0 |
|---|---|---|---|---|---|
| number 2 | | b3 | b2 | b1 | b0 |
| pp1 | | b0a3 | b0a2 | b0a1 | b0a0 |
| pp2 | b1a3 | b1a2 | b1a1 | b1a0 | |
| pp1 + pp2 | b1a3 | b0a3 + b1a2 | b0a2 + b1a1 | b0a1 + b1a0 | b0a0 |

| b1 = 1; b2 = 1 | | a1 | | | b1 = 1; b2 = 2 | | a1 | | | b1 = 2; b2 = 1 | | a1 | | | b1 = 2; b2 = 2 | | a1 | | |
|---|---|---|---|---|---|---|---|---|---|---|---|---|---|---|---|---|---|---|---|
| C1 | | 0 | 1 | 2 | C2 | | 0 | 1 | 2 | C3 | | 0 | 1 | 2 | C4 | | 0 | 1 | 2 |
| a2 | 0 | 0 | 0 | 0 | a2 | 0 | 0 | 0 | 0 | a2 | 0 | 0 | 0 | 1 | a2 | 0 | 0 | 0 | 1 |
| | 1 | 0 | 0 | 1 | | 1 | 0 | 1 | 1 | | 1 | 0 | 1 | 1 | | 1 | 0 | 1 | 2 |
| | 2 | 0 | 1 | 1 | | 2 | 1 | 1 | 2 | | 2 | 0 | 1 | 2 | | 2 | 1 | 2 | 2 |

The sum of the partial products may be considered being the result of an operation on two multi-digit numbers. Note that there are five partial products sums: b1a3, b0a3+b1a2, b0a2+b1a1, b0a1+b1a0 and b0a0.

The creation of the 2 partial products and its summation may be substituted by executing a function R on the two input numbers as previously described. Thus, five residues (R), corresponding to the five partial product sums, must be determined. Additionally, five carrys (C), also corresponding to the five partial product sums, must be determined. Execution has to take place on each set of corresponding digits of the numbers. Assume for illustrative purposes that a 4 digit number A=[a3 a2 a1 a0] has to be multiplied with a constant 2-digit number B=[b1 b0].

To achieve the correct result the number A1=[0 a3 a2 a1 a0] has to be multiplied by b0 and A2=[a3 a2 a1 a0 0] by b1. The correct execution of the complete multiplication requires that the correctly corresponding partial products are added. For illustrative purposes, the partial sum (a0b0+a1b1) will be used. The applied indices in this example do not signify anything else than a0 and a1 and b0 and b1 are different signals. The following discusses different methods and apparatus that can be used to calculate the partial product sums.

A diagram of multiplying and adding is shown in FIG. 5. For example, a0b0+a1b1 can be implemented by the circuit of FIG. 5. A digit 101 (eg. a0) is multiplied with a factor 102 (eg. b0) by a multiplier 103. Its result is 104. Another digit 105 (eg. a1) is multiplied with a factor 106 (eg b1) by multiplier 107. Its result is 108. The results 104 and 108 are summed by an adder 109 and the result is 110.

In a logic form, the diagram of FIG. 5 can be replaced by the diagram of FIG. 6. In the ternary case, two different configurations have to be used. First the modulo-3 multiplication has to be executed. This means that, in FIG. 6 input 201 is a ternary digit. As explained before, the multiplier can be replaced by an inverter 203. The inverter then generates the modulo-3 product at 204. The same applies to the ternary digit at 205, which will be inverted by inverter 207 with resulting modulo-3 product at 208. The results 204 and 208 are the inputs to function 209, which in this case is a modulo-3 adder.

For illustrative purposes, it may be assumed that the multiplier 103 is ternary number 2 and multiplier 107 is a factor 1. The inverter 203 is then an inverter [0 2 1] and inverter 207 is the identity [0 1 2].

The multiplier and add logic realization also need to generate the appropriate carry. This cannot be done by determining the individual carries and adding them. In fact the result depends on the inputs 201 and 205 and not on the individual results 204 and 208. The inverters 203 and 207 are the identity inverter [0 1 2] and function 209 for this example is ternary function C3 as shown in a previous table.

It is possible to circumvent the use of multipliers to realize a 'multiply and add' of two digits in ternary logic altogether by using specific functions for determining the modulo-3 sum residue and the ternary carry.

This is shown in FIG. 7. For determining the modulo-3 sum of two digits being multiplied by a modulo-3 constant two circuits are required, both having the configuration of FIG. 7. For the modulo-3 sum 301 and 302 are the input and 303 is the required ternary logic function. In case input 301 is multiplied with 2 and 302 with a factor 1 the function 303 is identical to ternary function R3 as shown in a previous table. Thus, the residue value of a0b0+a1b1 can also be calculated by the circuits shown in FIGS. 6 and 7. A separate circuit of identical configuration, but with function 303 identical to ternary function C3 will generate the appropriate carry digit. Thus, the partial product sums (residues and carry) can be calculated by the circuit of FIG. 7.

The present invention reduces a ternary multiplication of an n-digit ternary multiplicand with a constant 2 digit ternary multiplier to two parallel single step operations that will generate 2 ternary numbers: the modulo-3 sum residue result and the carry result. For those skilled in the art it should be clear that the outputs can be organized in such a way that one multi-digit number has all the residue digits and the second number has all the carry digits.

Compared to the approach of calculating all individual partial products and adding these, the multiplication of multi-value numbers in accordance with the present invention (e.g. by using the circuit of FIG. 7) requires less circuitry and can be executed faster.

Figure 7A:
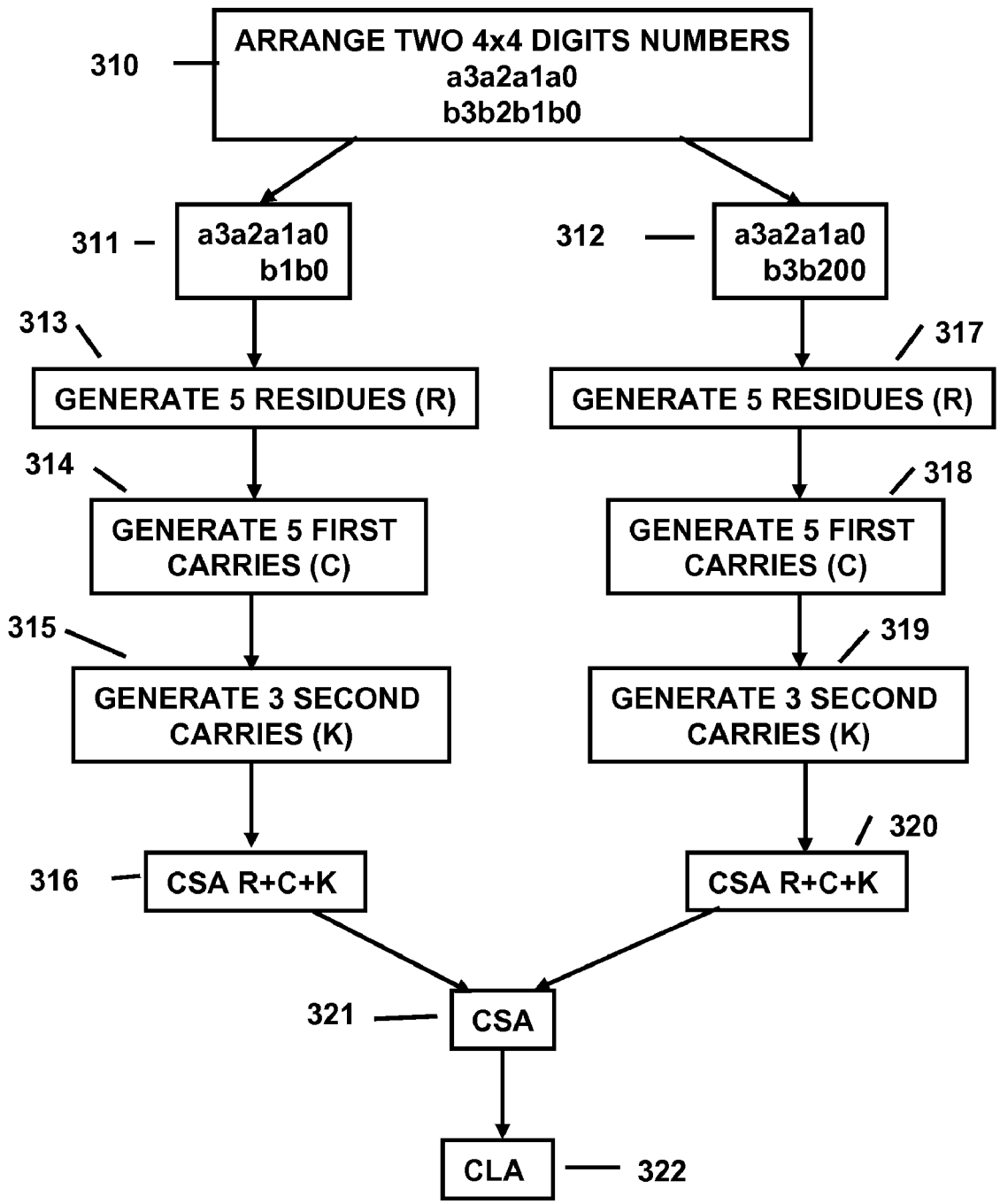
FIG. 7A illustrates the steps in multiplying two 4 digit multi-value numbers.

FIG. 7A illustrates the steps involved with multiplying a 4 digit multi-value number by a 4 digit multi-value number in accordance with one aspect of the present invention. In steps 310 to 312, the numbers are arranged. Essentially, the problem is divided into two, so there are 2 four digit by two digit problems. In step 313, five residues (corresponding to five partial product sums) are determined from the problem [a3 a2 a1 a0]×[b1 b0]. In step 314, five carries (again corresponding to five partial product sums) are determined. In step 315, three second carries are determined. The second carry is only necessary where the multi-value number is radix-4 or higher. Ternary numbers will not generate a second carry. In step 316, the residue (R), the carry (C) and the second carry (K), if any, are added. In accordance with one aspect of the present invention, a carry save add procedure is used that generates two numbers.

In step 317, five residues (corresponding to five partial product sums) are determined from the problem [a3 a2 a1 a0×b3 b2 0 0]. Note that [0 0] appears at the end of [b3 b2] as a place holder to ensure the proper values are multiplied. In step 318, five carries (again corresponding to five partial product sums) are determined. In step 319, three second carries are determined. Again, the second carries are only necessary where the multi-value number is radix-4 or higher. Ternary numbers will not generate a second carry. In step 320, the residue (R), the carry (C) and the second carry (K), if any, are added. In accordance with one aspect of the present invention, a carry save add procedure is used that generates two numbers.

Then in step 321, the result from step 316 is added to the result from step 320. In step 322, a carry look ahead is performed.

The present invention can be implemented to perform higher digit multiplication problems. For example, a 16 digit by 16 digit multiplication of multi-value numbers can be divided into eight 16 digit by 2 digit multiplications in a manner similar to that illustrated in FIG. 7A. The partial product sums can be determined by applying the digits to a truth table as explained herein or by special circuits that provide the appropriate residue, carry and second carry.

The following table shows the dot diagram of the above method for a 16 ternary digit multiplication with a 16 ternary digit constant. Dots indicate in which position a result occurs. The rows with labels rb (such as rb01) show the result of modulo-3 addition after multiplication. The rows with label cb show the relevant carry digit positions.

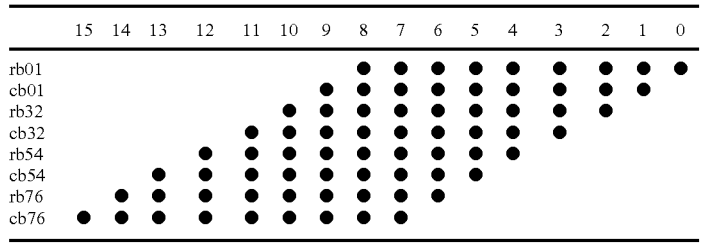

clear that the outputs can be organized in such a way that one multi-digit number has all the residue digits and the second number has all the carry digits.

Referring to the earlier mentioned ternary carry-save add (CSA) method, one can reduce the addition of the 8 multi-digit numbers first to two groups of 4 numbers (which will take 3 cycles). Each group will generate 1 residue and 1 carry number. These two groups of two numbers can be carry-save added (CSA) again in 3 cycles generating one multi-digit residue number and one multi-digit carry number. These final two multi-digit numbers have to be added, applying for instance a carry-look-ahead addition to save on carry propagation delay.

For those skilled in the art, it should be clear that different CSA combination trees can be used and that different carry delay saving addition methods are available. Because consecutive residue numbers (and the carry numbers) are shifted two positions, each next number has less overlap with predecessors. This may be applied to limit the amount of circuitry.

Figure 8:
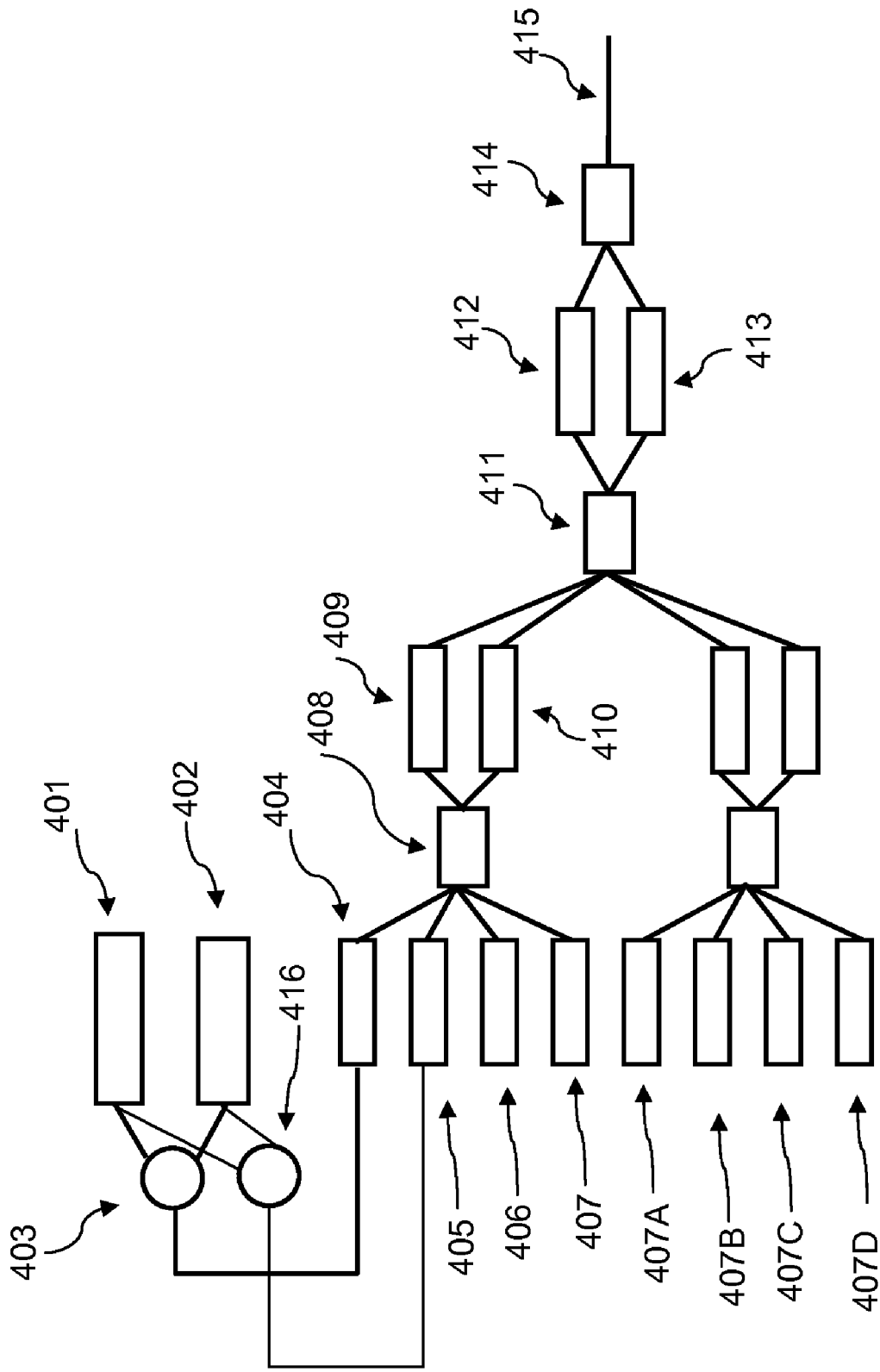
FIG. 8 is a diagram of a multiplier of an n-digit multiplicand with an 8 digit multiplier.

FIG. 8 shows a diagram for the multiplication of 2 8-digit ternary numbers with a constant multiplier, using the 'multiply and add' method. The multiplicand in 401 is [a7 a6 a5 a4 a3 a2 a1 a0] and the multiplier in 402 is [b1 b0]. The modulo-3 'multiply-and-add' residue function is 403 and its output is the residue result 404, keeping in mind that the operations are all executed at the same time. Outputs are drawn as single lines to limit confusion. Drawing of single lines might wrongly be interpreted as serial outputs, so a point has been made of highlighting the parallel nature of this realization.

Function 416 executes the carry portion of the 'multiply-and-add' function. The carry result of the 'multiply and add' is available as 405. A similar result from the next two multiplier digits [a7 a6 a5 a4 a3 a2 a1 a0]×[b3 b2 0 0] is available as the multi-digit numbers 406 (residue) and 407 (carry). A similar result from the next two multiplier digits (a7a6a5a4a3a2a1a0×b5b40000) is available as the multi-digit numbers 407A (residue) and 407B (carry). A similar result from the next two multiplier digits [a7 a6 a5 a4 a3 a2 a1 a0]×[b7 b6 0 0 0 0 0 0] is available as the multi-digit numbers 407C (residue) and 407D (carry). The 4 multi-digit numbers 404, 405, 406 and 407 can be added as ternary 'carry-save-add' by adder 408. The results are two multi-digit numbers representing the result residue 409 and the result carry 410. Parallel to this (at the same time) the other 4 multi-digit numbers can be 'carry-save-added'. The results can again be 'carry-save-added' by adder 411. Its results are the residue 412 and carry 413. These results have to be added with carry propagation for instance by a Carry-Look-Ahead adder 414. The total result of the multiplication is then available as a multi-digit ternary number 415.

It should be clear that the R and C functions for (b0=1, b1=2) and (b0=2,b1=1) are commuted versions of each other. This means that the R or C function used for b0=1 and b1=2 can also be used for b0=2 and b1=1 by switching the order of the inputs.

Multiplying Two Ternary Variables

Multiplying two numbers of which one is a constant and one is variable is often used in applications such as digital FIR filters. There is also a need for multiplying two variable numbers. There are different schemes to create n*n digit binary multipliers. The selected schemes are often a compromise between speed, number of functions and complexity or repeatability. Highly complex schemes, with many connections and non-repeatable placement of components are not very desirable for realization in integrated circuits. The same applies for solutions that have a high number of components, even if the overall speed is attractive.

A new method for multiplying two multi-digit ternary numbers is provided here. It uses the ternary gates as previously explained.

There are important differences between multiplying and adding two numbers in which both are variables instead of the one where one number is constant. Because the multiplier is now a variable the applied function to execute the 'multiply-and-add' method requires knowledge of the value of the multiplier which may change as the number changes.

Figure 9:
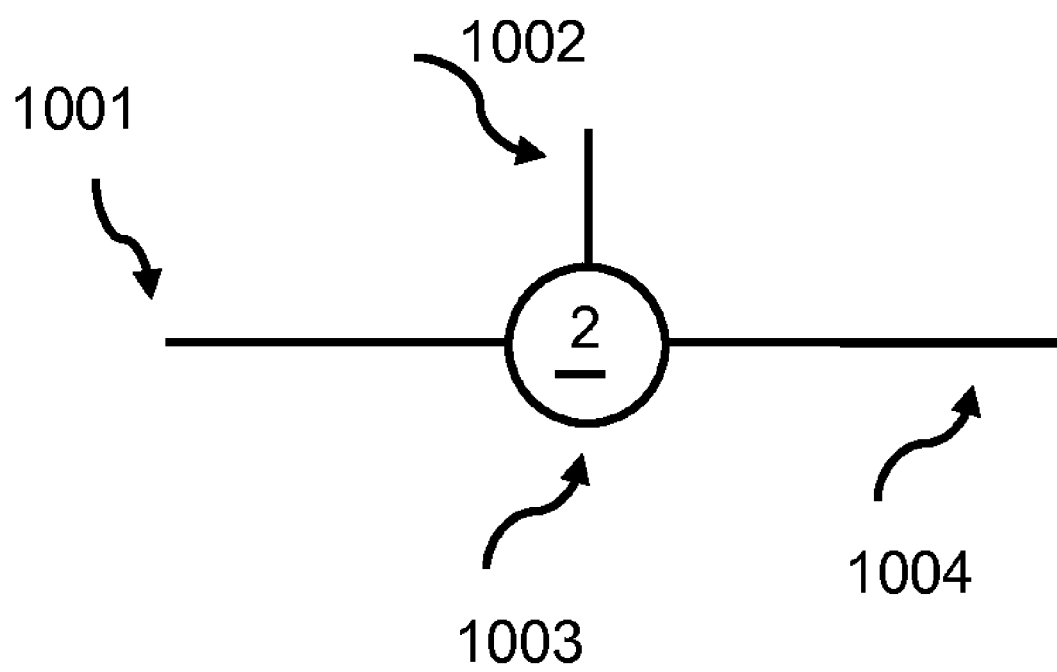
FIG. 9 is a diagram of a gate that is switched into conducting state by a control input in state 2.

One way to control this is with one or more ternary gates. An illustrative diagram is shown in FIG. 9. The gate 1003 is controlled by a ternary signal on control input 1002. The symbol of gate 1003 (a horizontal line with a number on top) means that it is conducting when control input 1002 has a signal in state 2. For all other signals, the gate is non-conducting. Conducting means that a signal on input 1001 can reach the output 1004 without significant attenuation. Non-conducting means that the signal on input 1001 cannot reach the output 1004.

In many cases, the state 0 is represented by 'absence of signal'. In the example that means that when control input 1002 is not in state 2, the gate is non-conducting and output 1004 has no signal and is in state 0.

In some cases, the state 0 may be represented by an active signal not equal to 'absence of signal'. So in that case, if gate 1003 is non-conducting, the output 1004 does not automatically have state 0. The gates are placed at the end of an active circuit, behind inverters, to prevent passing an unwanted signal. In particular when an inverter transforms state 0 into a non-zero state. They have to be conducting to pass an active signal to their outputs. In case of the state 0 being 'absence of signal', all gates in non-conducting condition should have an output with state 0.

The basic assumption in this novel method is that the circuit 'knows' the value of the multiplier and consequently 'knows' which of the required ternary 'multiply-and-add' functions as described before, to use. Assuming that one of the numbers is the multiplicand and the other is the multiplier one can use the multiplier digits to control which of the functions will become active by enabling a gate.

Figure 10:
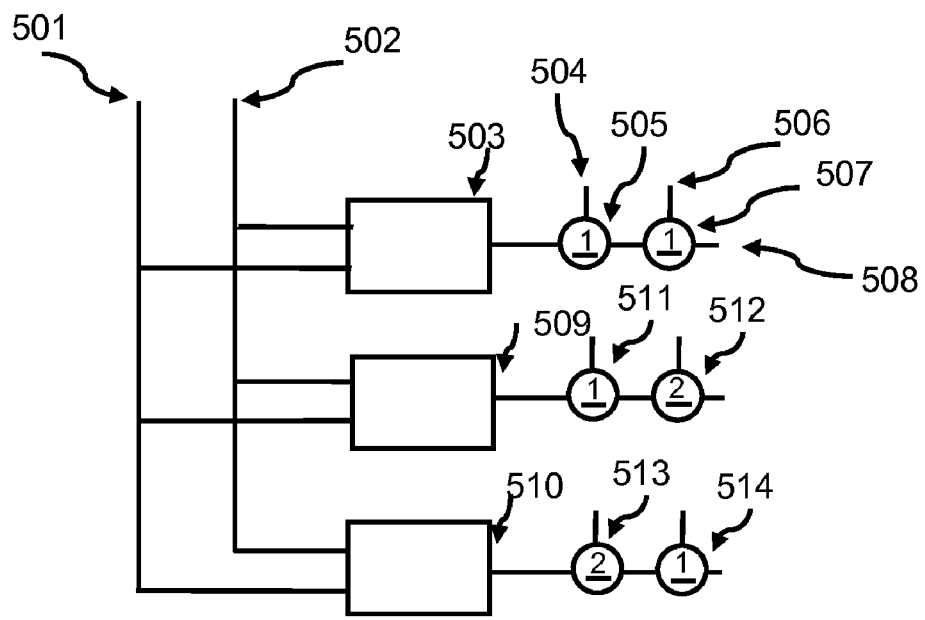
FIG. 10 is a diagram of a 3 function logic circuit, wherein the selection of the active function is determined by the conducting state of two gates.

This principle is demonstrated in FIG. 10. Two inputs, 501 and 502 provide a signal to three ternary functions 503, 509 and 510. Which function is active in generating an output depends on the status of the gates which control the availability of an output signal. The ternary function 503 is active when the gates 505 and 507 are in a conducting state. Gate 505 is conducting when its control input 504 is in state 1. Gate 507 is conducting when its control input 506 is in state 1.

Assume that input 504 is provided by signal b0 and that input 506 is provided by signal b1. The function 503 is provided by the truth table of R1 as described in a previous table. (See paragraph 166). Input 501 is provided by signal a0 and input 502 is provided by a1.

Consequently the output 508 is the modulo-3 residue result of (a0b0+a1b1) for b0=1 and b1=1.

The gates 511 and 512 are controlled by signals b0 and b1, respectively. When these gates are conducting (for b0=1 and b1=2), the device 509 realizing the function R2 is active, thus realizing (a0b0+a1b1) with b0=1 and b1=1. The same principle is shown for function R3 in device 510 for b0=2 and b1=1 controlling gates 513 and 514. The method can also be applied for (b0,b1)=(2,2). The same method can be applied for generating the carry digit.

When b0=0 then signal a1 'sees' an inverter b1. However it is probably simpler to translate this to: when b0=0 then a1 and b1 'see' a multiplier function. When b1=0 then a0 'sees' an inverter b0. It is simpler to translate this into: when b1=0 then a0 and b0 'see' a multiplier.

Figure 11:
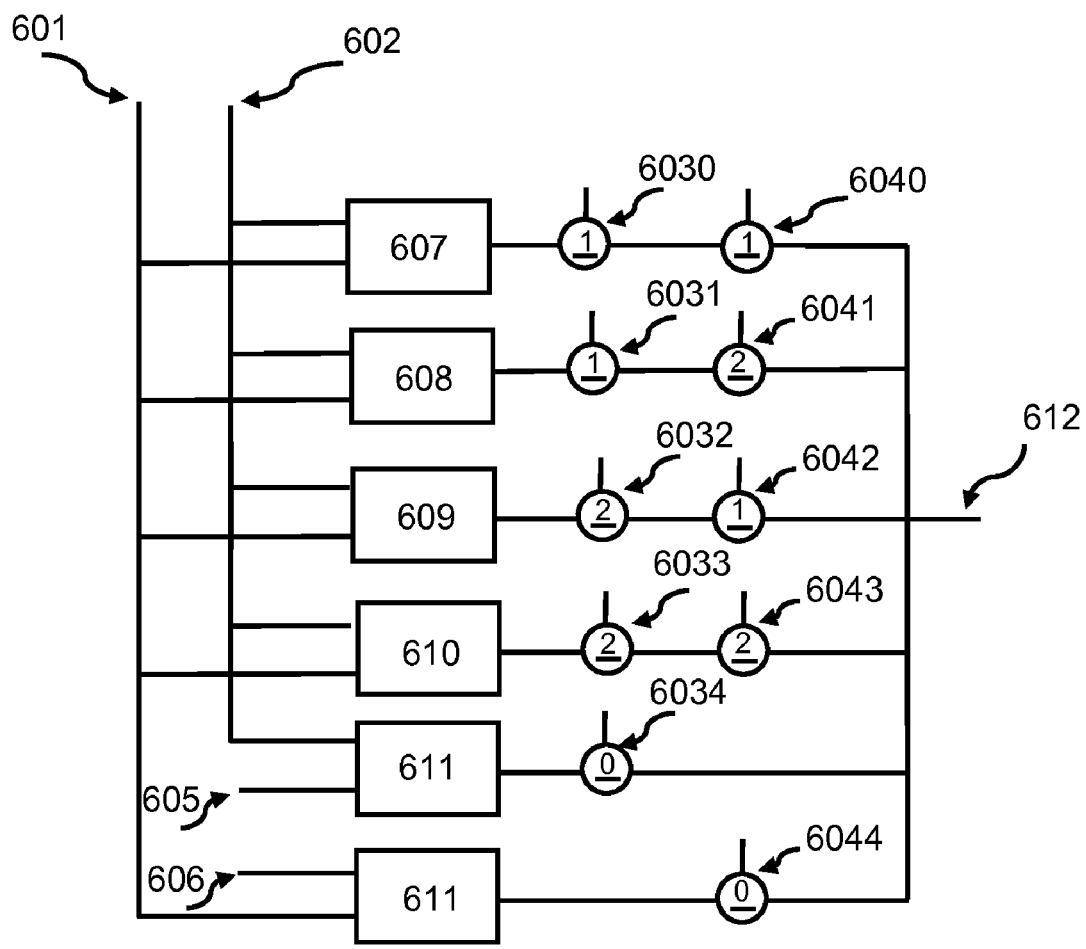
FIG. 11 is a diagram of a ternary multiply-and-add of a0b0+a1b1 wherein all single digit inputs are variables.

FIG. 11 shows the complete ternary 'multiply-and-add' residue configuration for the expression: a0b0+a1b1 where each digit is a variable. Input 601 provides signal a0. Input 602 provides signal a1. The gates 6030, 6031, 6032, 6033 and 6034 are each controlled by signal b0. The gates 6040, 6041, 6042, 6043 and 6044 are each controlled by signal b1. To generate the modulo-3 result the following functions are used: function 607 is ternary function R1; function 608 is ternary logic function R2; function 609 is ternary logic function R3 and function 610 is ternary logic function R4. The function 611 is ternary logic function res_m3. Input 605 provides signal b1 and input 606 provides signal b0. The function for (b0,b1)=(0,0) is omitted, assuming that 0 is represented by 'absence of signal'. If state 0 is represented by a signal not equal to 'absence' the function for (b0,b1)=(0,0) should be included.

To generate the ternary carry digit for (a0b0+a1b1), a copy of the circuit of FIG. 11 having the following functions is used: function 607 is ternary logic function C1; function 608 is ternary function C2; function 609 is ternary logic function C3 and function 610 is ternary logic function C4 as these function were defined in a previous page. The function 611 is ternary logic function car_m3.

Figure 12:
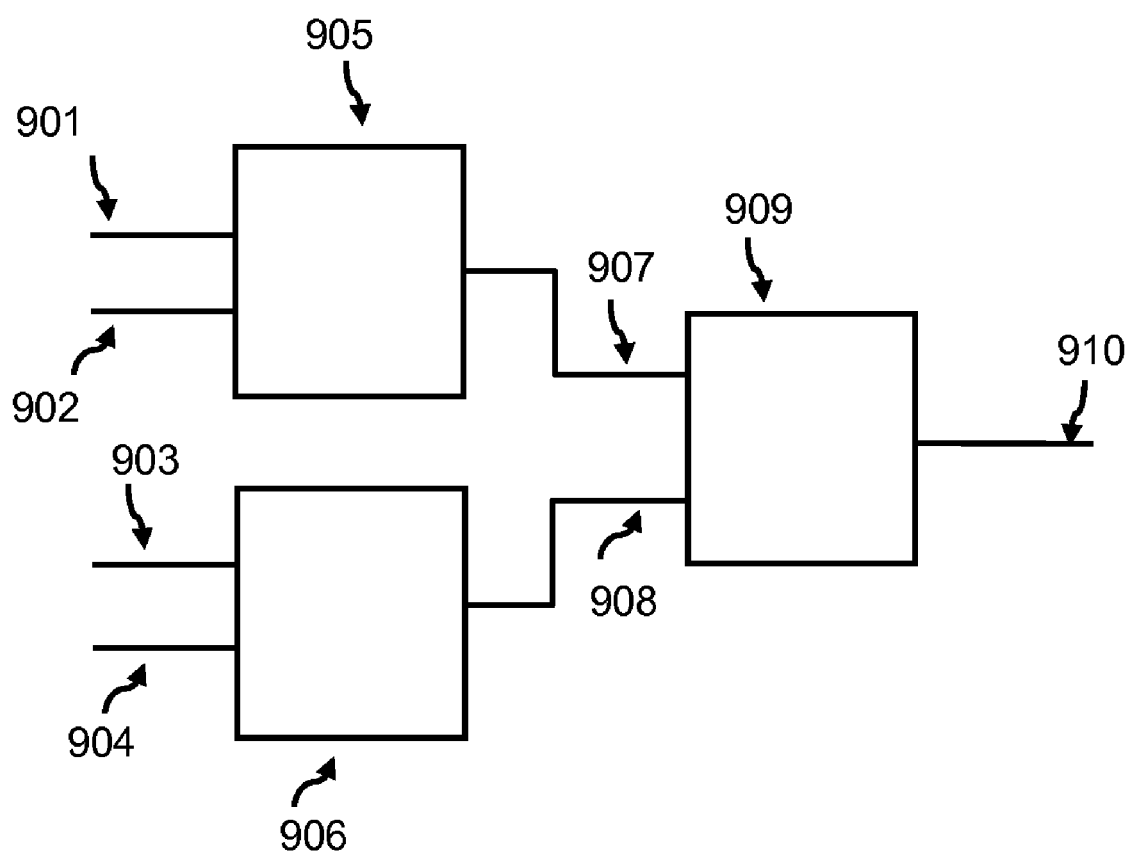
FIG. 12 is another multiplier and add circuit.

FIG. 12 shows a diagram for generating the sum of individual multiplication results (e.g. a0b0+a1b1), in accordance with another aspect of the present invention. Assume inputs 901 and 902 to provide signals a0 and b0 and function 905 to generate the modulo-n product residue which is available at output 907. Inputs 903 and 904 provide signals a1 and b1. Function 906 generates the modulo-n product residue which is available at output 908. Outputs 907 and 908 are inputs to the modulo-n adder 909 and the modulo-n residue of the addition of the products is available at output 910. The same structure, with the same inputs a0, b0, a1 and b1 has to be used to generate a carry result. In the ternary case function 905 and 906 have to be ternary function car_m3. The function 909 is the ternary addition and output 910 provides the carry. The result of this diagram is not complete. The result calculated by the circuit of figure has a carry digit 1 when either a0b0=4 or when a1b1=4 and a carry 2 when both a0b0 and a1b1 are 1. It omits the propagated carry generated by a0b0=1 and a1b1=2; a0b0=2 and a1b1=1; a0b0=2 and a1b1=2; a0b0=4 and a1b1=2 and a0b0=2 and a1b1=4.

One can say that the actual carry result may be 1 higher than expected in some cases other than a0b0=4 and a1b1=4. Corrective circuitry will be required to generate the correct carry value.

Figure 13:
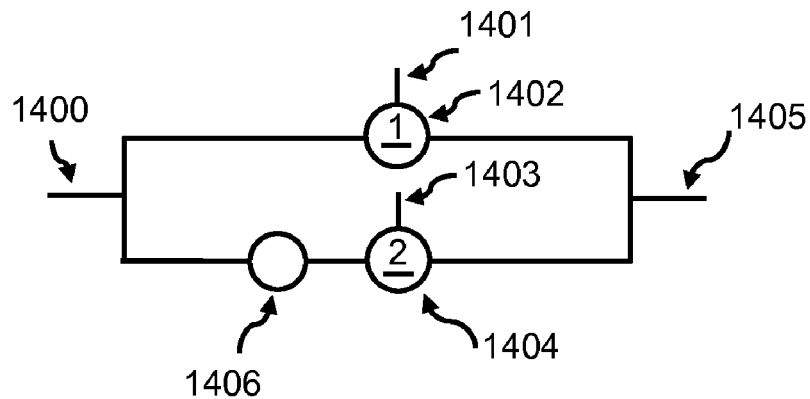
FIG. 13 is a diagram showing a realization of a ternary logic function by applying gates and inverters.

FIG. 13 shows the diagram of a circuit with gates and inverter that will realize the expression a0×b0 in ternary logic. It comprises two branches: one with gate 1402 and the second with gate 1404. Gate 1402 has as a control input 1401. The signal provided by input 1401 is ternary signal a0. The gate 1402 is conducting when a0=1. Gate 1404 has a control input 1403. The input 1403 provides also ternary signal a0. Gate 1404 is conducting when a0=2. The branch with gate 1404 also has an inverter 1406 which is inv=[0 2 1]. The input 1400 provides the signal b0 and the output signal will be provided at 1405. The circuit works as follows: when a0=1 the gate 1402 is conducting (and gate 1404 is not). The signal b0 is passed on directly to the output 1405, or signal b0 'sees' an identity inverter. When a0=2 the gate 1404 is conducting and signal b0 'sees' inverter [0 2 1]. When a0=0 neither gate 1402 nor 1404 is conducting and the output 1405 will have state 0. Consequently this circuit realizes the following truth table:

|   | 0 | 1 | 2 |
|---|---|---|---|
| 0 | 0 | 0 | 0 |
| 1 | 0 | 1 | 2 |
| 2 | 0 | 2 | 1 |

Figure 14:
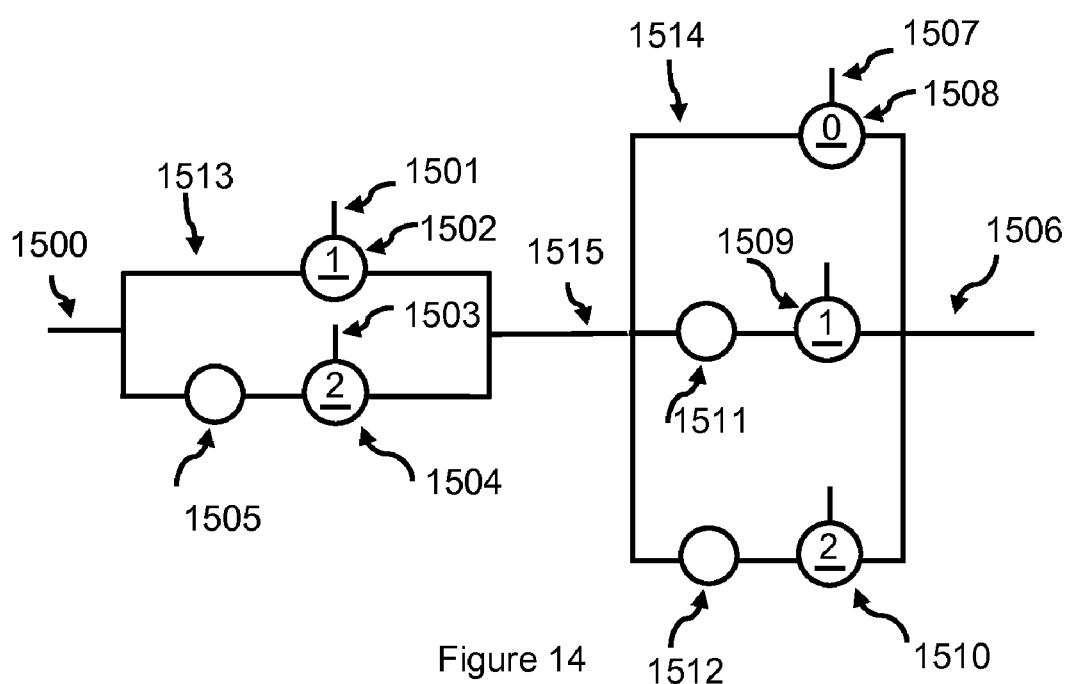
FIG. 14 is a diagram showing a realization of a ternary multiplier.

This is of course the truth table of the modulo-3 multiplication function. FIG. 14 shows the diagram of a circuit that will realize a0b0+a1b1. It comprises two parts: 1513 which will calculate a0×b0, assuming that input 1500 provides signal b0 and that the control inputs of gate 1502 and 1504 provide the signal a0. The output 1515 provides the signal a0×b0 which is also the input to second circuit 1514. Circuit 1514 has three branches: one branch with gate 1508 which is conducting when the signal provided by its control input has state 0; a second branch with gate 1509 which is conducting when its control input provides a signal with state 1; a third branch with gate 1510 which is conducting when the control input provides a signal with state 2. The control inputs of gates 1508, 1509 and 1510 all provide a1×b1 as its control signal. The signal a1×b1 can be generated by a circuit similar to that in FIG. 13. The second branch of circuit 1514 with gate 1509 has inverter 1511 [1 2 0] and the third branch with gate 1510 has inverter 1512 [2 1 0]. Circuit 1514 is thus a modulo-3 adder of a0b0 and a1b1. The total circuit of FIG. 15 calculates the residue of a0b0+a1b1. The execution of the addition has to wait until a1×b1 has been determined. One can make the circuit 1514 more 'predictive', meaning that the conducting path between input 1500 and output 1506 will be set as soon as signals a0, b0, a1 and b1 are available. This can be achieved by replacing the gates of circuit 1514 controlled by a1b1 by individual gates controlled by a1 and b1. As an illustrative example, the gate 1508 controlled by a1×b1 can be replaced by individual gates controlled by a1 and b1.

Figure 15:
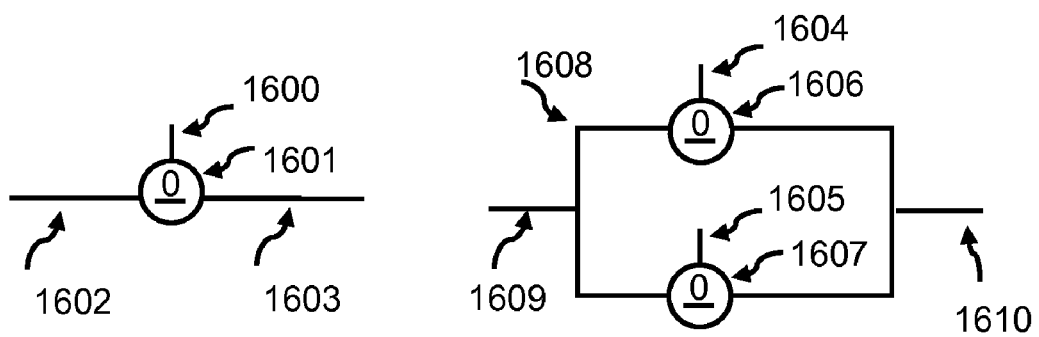
FIG. 15 is a diagram of a ternary logic devices realized by gates and inverters.

The operating condition for gate 1508 is that it is conducting for a1×b1=0. According to the truth table of a1×b1 the output of such a function is 0 for a1=0 and for b1=0. The equivalent circuits for this are shown in FIG. 15. The circuit with gate 1601 and control input 1600 which provides the signal a1b1 is conducting for a1b1=1. This is equivalent with circuit 1608 which has two branches: one with gate 1606 which is conducting when its control input 1604 provides a signal with state 0. The control signal is a1. The second branch has a gate 1607 with input 1605. The control signal provided by 1605 is signal b0. The gate 1607 is conducting for b1=0.

The next step is to realize the generation of the carry for a0b0+a1b1 wherein all the signals are variables. It would be attractive if the carry of the sum of products would be the same as the sum of the carries. This is not the case. Such a rule (in radix-3) would miss the generation of a carry by addition of residues 1 and 2 or 2 and 2. One way to solve this is to have a first circuit that generates a carry if either a0b0 or a1b1 is 4 and generates no carry if that is not the case. Added to that will be a corrective circuit that will add an extra carry when a0b0 has a residue 1 or 2 and a1b1 has a residue 1 or 2 and the sum a0b0+a1b1 is either 3 or 4.

Figure 16:
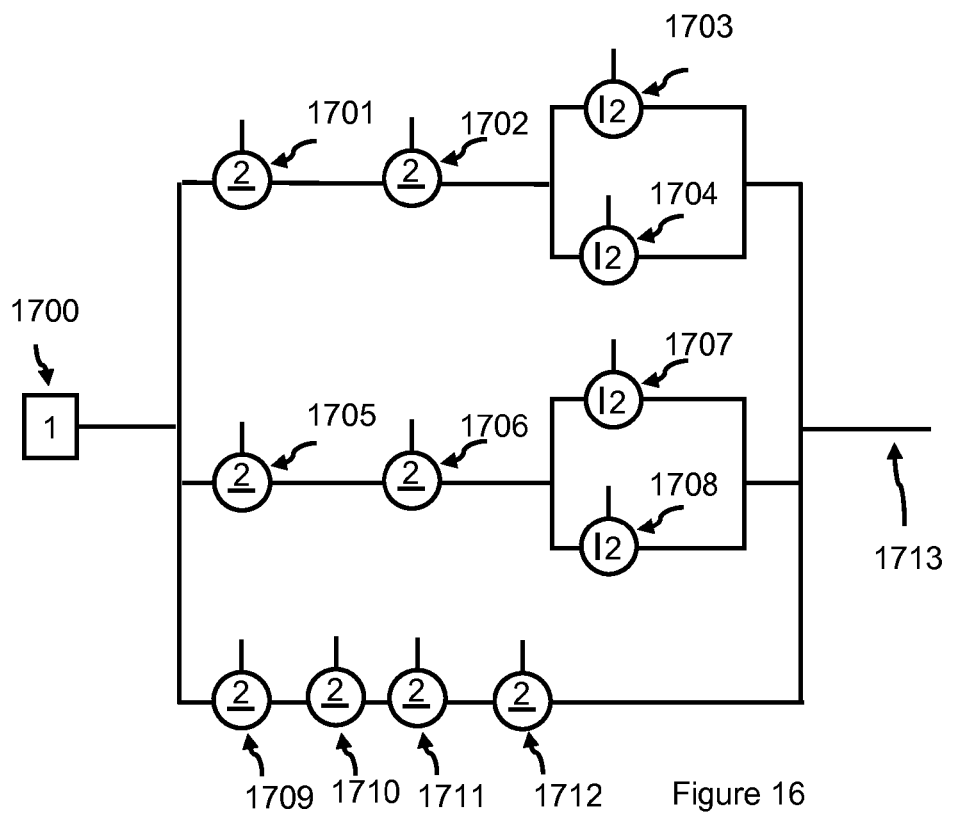
FIG. 16 is a diagram showing a realization of ternary logic functions by applying gates and inverters.

FIG. 16 shows a diagram of a circuit that generates a 1 when either a0b0 and/or a1b1 is 4. It uses a constant source 1700 that generates a signal equivalent with state 1. This is for convenience. Also inverters and a variable input could have been used. The circuit comprises three branches. The top branch has four gates: in serial gate 1701 and gate 1702 which both are conducting when their control inputs provide a signal with state 2 and serial to that gates 1703 and 1704 in parallel. Gate 1703 is conducting when control signal a1 has not value or state 2. Gate 1704 is conducting when control signal b1 has not value or state 2.

The control signal for gate 1701 is a0 and for gate 1702 it is b0. The second branch has four gates: in serial gate 1705 (controlled by a0) and gate 1706 (controlled by b0) which both are conducting when their control inputs provide a signal with state 2 and serial to those gates 1707 and 1708 in parallel. Gate 1707 is conducting for control signal a0 is not 2. Gate 1708 is conducting for control signal b0 is not 2. The control signal for gate 1705 is a1 and for gate 1706 it is b1.

The third branch has 4 serial gates 1709, 1710, 1711 and 1712 which all are conducting when the control signal is state 2. Gate 1709 has a0 as control signal, gate 1710 has b0 as control signal, gate 1711 has a1 as control signal and gate 1712 has b1 as control signal. The result is outputted to 1713.

Figure 17:
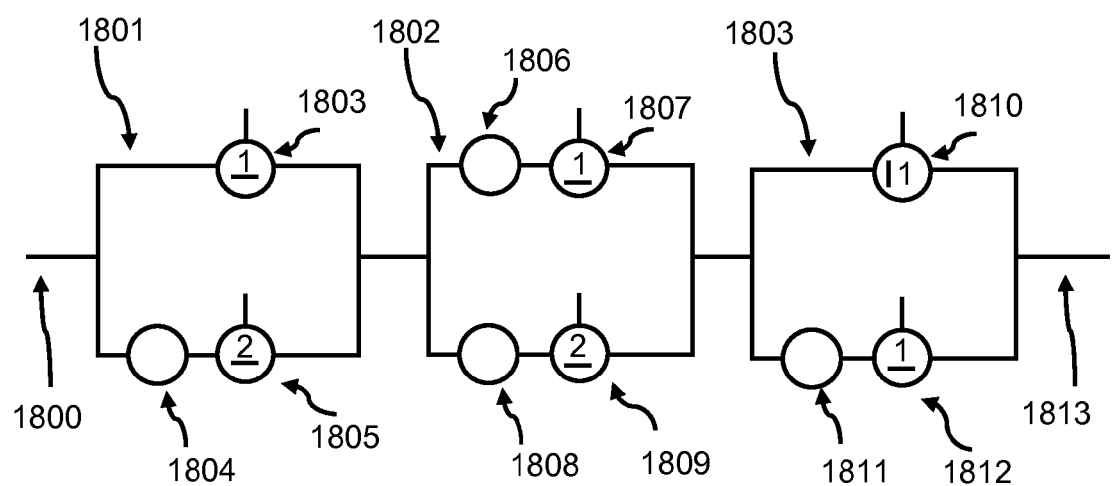
FIG. 17 is a diagram of a logic function wherein two separate inputs are modified by inverters before being processed by a 2-input/single output logic function.

FIG. 17 shows the diagram of generating the correct carry for a0b0+a1b1 with a0, b0, a1 and b1 all variables. The circuit comprises three functional units. Circuit 1801 generates the intermediate results for the first multiplication. The input on 1800 provides b0. The gates 1803 and 1805 provide a0 as control signal. Inverter 1804 is [0 2 2]. Consequently this circuit realizes the following truth table.

|   | 0 | 1 | 2 |
|---|---|---|---|
| 0 | 0 | 0 | 0 |
| 1 | 0 | 1 | 2 |
| 2 | 0 | 2 | 2 |

Circuit 1802 adds the result of the circuit 1801 with the result of a1b1. Gates 1807 and 1809 provide the result of (a1×b1)mod-3 as control signal. Inverter 1806 is [0 0 1] and inverter 1808 is [0 1 1]. The result is such that a 1 is generated when (a0×b0)+(a1×b1) is 3 or 4. Circuit 1803 corrects the output for circuit 1802 if one or both of the multiplications was [1 1] instead of [0 1] by adding an additional 1. The gates 1810 and 1812 have the output of the carry circuit of FIG. 16 as control signal. Inverter 1811 is [1 2 0] or adds a 1 to the incoming signal. The final carry value appears on output 1813.

The circuits in FIGS. 10 to 17 can be used to solve partial product sums where two ternary variables are being multiplied.

The 4-Value Case (Constant Multiplier)

The calculation of a0b0+a1b1 for radix-4 numbers may bring an additional carry digit, a second carry, as previously discussed. When designing for the worst case, care must be taken to address this issue. The highest value of a0b0=3×3=9. The same is true of course for a1b1. The sum of the two highest values is 18 or [1 0 2]. Not until a radix-23 system is reached will yet another carry digit be added to the sum. The following truth tables describe all residue functions, first carry function and second carry function to realize any a0b0+a1b1. When either b0=0 or b1=0, individual inverters can be used two multiply and no addition is required because the to be added value is 0. With 0 represented as 'absence of signal' the function for b0=0, b1=0 is trivial (not connected).

| b0 = 1, b1 = 1 | | a0 | | | b0 = 1, b1 = 2 | | a0 | | | b0 = 1, b1 = 3 | | a0 | | |
|---|---|---|---|---|---|---|---|---|---|---|---|---|---|---|
| R411 |   | 0 | 1 | 2 | 3 | R412 |   | 0 | 1 | 2 | 3 | R413 |   | 0 | 1 | 2 | 3 |
|   |   | 0 | 0 | 1 | 2 | 3 |   |   | 0 | 0 | 1 | 2 | 3 |   |   | 0 | 0 | 1 | 2 | 3 |
| a1 |   | 1 | 1 | 2 | 3 | 0 | a1 |   | 1 | 1 | 2 | 3 | 0 | 1 | a1 |   | 1 | 1 | 3 | 0 | 1 | 2 |
|   |   | 2 | 2 | 3 | 0 | 1 |   |   | 2 | 2 | 0 | 1 | 2 | 3 |   |   | 2 | 2 | 3 | 0 | 1 |
|   |   | 3 | 3 | 0 | 1 | 2 |   |   | 3 | 3 | 2 | 3 | 0 | 1 |   |   | 3 | 3 | 1 | 2 | 3 | 0 |

| b0 = 2, b1 = 1 | | a0 | | | b0 = 2, b1 = 2 | | a0 | | | b0 = 2, b1 = 3 | | a0 | | |
|---|---|---|---|---|---|---|---|---|---|---|---|---|---|---|
| R414 |   | 0 | 1 | 2 | 3 | R415 |   | 0 | 1 | 2 | 3 | R416 |   | 0 | 1 | 2 | 3 |
|   |   | 0 | 0 | 2 | 0 | 2 |   |   | 0 | 0 | 2 | 0 | 2 |   |   | 0 | 0 | 2 | 0 | 2 |
| a1 |   | 1 | 1 | 3 | 1 | 3 | a1 |   | 1 | 1 | 2 | 0 | 2 | 0 | a1 |   | 1 | 1 | 3 | 1 | 3 | 1 |
|   |   | 2 | 2 | 0 | 2 | 0 |   |   | 2 | 2 | 0 | 2 | 0 | 2 |   |   | 2 | 2 | 0 | 2 | 0 |
|   |   | 3 | 3 | 1 | 3 | 1 |   |   | 3 | 3 | 2 | 0 | 2 | 0 |   |   | 3 | 3 | 1 | 3 | 1 | 3 |

| b0 = 3, b1 = 1 | | a0 | | | b0 = 3, b1 = 2 | | a0 | | | b0 = 3, b1 = 3 | | a0 | | |
|---|---|---|---|---|---|---|---|---|---|---|---|---|---|---|
| R417 |   | 0 | 1 | 2 | 3 | R418 |   | 0 | 1 | 2 | 3 | R419 |   | 0 | 1 | 2 | 3 |
|   |   | 0 | 0 | 3 | 2 | 1 |   |   | 0 | 0 | 3 | 2 | 1 |   |   | 0 | 0 | 3 | 2 | 1 |
| a1 |   | 1 | 1 | 0 | 3 | 2 | a1 |   | 1 | 1 | 2 | 1 | 0 | 3 | a1 |   | 1 | 1 | 3 | 2 | 1 | 0 |
|   |   | 2 | 2 | 1 | 0 | 3 |   |   | 2 | 2 | 0 | 3 | 2 | 1 |   | 0 |   | 2 | 2 | 1 | 0 | 3 |
|   |   | 3 | 3 | 2 | 1 | 0 |   |   | 3 | 3 | 2 | 1 | 0 | 3 |   |   | 3 | 1 | 0 | 3 | 2 |

| b0 = 1, b1 = 1 | | a0 | | | b0 = 1, b1 = 2 | | a0 | | | b0 = 1, b1 = 3 | | a0 | | |
|---|---|---|---|---|---|---|---|---|---|---|---|---|---|---|
| C411 |   | 0 | 1 | 2 | 3 | C412 |   | 0 | 1 | 2 | 3 | C413 |   | 0 | 1 | 2 | 3 |
|   |   | 0 | 0 | 0 | 0 | 0 |   |   | 0 | 0 | 0 | 0 | 0 |   |   | 0 | 0 | 0 | 0 | 0 |
| a1 |   | 1 | 0 | 0 | 0 | 1 | a1 |   | 1 | 0 | 0 | 1 | 1 | a1 |   | 1 | 0 | 1 | 1 | 1 |
|   |   | 2 | 0 | 0 | 0 | 1 |   |   | 2 | 1 | 1 | 1 | 1 |   |   | 2 | 1 | 1 | 2 | 2 |

| b0 = 2, b1 = 1 | | a0 | | | b0 = 2, b1 = 2 | | a0 | | | b0 = 2, b1 = 3 | | a0 | | |
|---|---|---|---|---|---|---|---|---|---|---|---|---|---|---|
|   |   | 3 | 0 | 1 | 1 | 1 |   |   | 3 | 1 | 1 | 2 | 2 |   |   | 3 | 2 | 2 | 2 | 3 |
| C414 |   | 0 | 1 | 2 | 3 | C415 |   | 0 | 1 | 2 | 3 | C416 |   | 0 | 1 | 2 | 3 |
|   |   | 0 | 0 | 0 | 1 | 1 |   |   | 0 | 0 | 0 | 1 | 1 |   |   | 0 | 0 | 0 | 1 | 1 |
| a1 |   | 1 | 0 | 0 | 1 | 1 | a1 |   | 1 | 0 | 1 | 1 | 2 | a1 |   | 1 | 0 | 1 | 1 | 2 |
|   |   | 2 | 0 | 1 | 1 | 2 |   |   | 2 | 1 | 1 | 2 | 2 |   |   | 2 | 1 | 2 | 2 | 3 |
|   |   | 3 | 0 | 1 | 1 | 2 |   |   | 3 | 1 | 2 | 2 | 3 |   |   | 3 | 2 | 2 | 3 | 3 |

| b0 = 3, b1 = 1 | | a0 | | | b0 = 3, b1 = 2 | | a0 | | | b0 = 3, b1 = 3 | | a0 | | |
|---|---|---|---|---|---|---|---|---|---|---|---|---|---|---|
| C417 |   | 0 | 1 | 2 | 3 | C418 |   | 0 | 1 | 2 | 3 | C419 |   | 0 | 1 | 2 | 3 |
|   |   | 0 | 0 | 0 | 1 | 2 |   |   | 0 | 0 | 0 | 1 | 2 |   |   | 0 | 0 | 0 | 1 | 2 |
| a1 |   | 1 | 0 | 1 | 1 | 2 | a1 |   | 1 | 0 | 1 | 2 | 2 | a1 |   | 1 | 0 | 1 | 2 | 2 |
|   |   | 2 | 0 | 1 | 2 | 2 |   |   | 2 | 1 | 1 | 2 | 3 |   |   | 2 | 1 | 2 | 3 | 3 |
|   |   | 3 | 0 | 1 | 2 | 3 |   |   | 3 | 1 | 2 | 3 | 3 |   |   | 3 | 2 | 3 | 3 | 0 |

The only situation in 4-value logic where a second carry will appear in a0b0+a1b1 is when b0=3 and b3=3 and a0=3 and a1=3.

The truth table for this carry function is:

| B0 = 3, b1 = 3 | | a0 | | | |
|---|---|---|---|---|---|
| C421 |   | 0 | 1 | 2 | 3 |
|   | 0 | 0 | 0 | 0 | 0 |
| A1 | 1 | 0 | 0 | 0 | 0 |
|   | 2 | 0 | 0 | 0 | 0 |
|   | 3 | 0 | 0 | 0 | 1 |

Thus, when 4-value numbers are multiplied, a residue and first carry must be calculated, as in the ternary case. Additionally, to ensure a correct answer, a second carry must also by calculated. To calculate the residue, the first carry and the second carry in the above tables, a table is accessed by the value of b0 and b1, and then the result is obtained by applying the values a0 and a1 to the tables.

Multiplying with a Constant Multiplier in Radix-4.

It should be clear to those skilled in the art that executing the term (a0b0+a1b1) in radix-4 with 4-valued logic when the multipliers are constants can essentially apply the same process as for the radix-4 case. Looking at the results for a0b0+a1b1 it can be concluded that generating the 'multiply-and-add' result digit can be determined in a straight forward fashion. Because the multiplier is a constant number (which means in a0b0+a1b1 that b0 and b1 are constants) one can replace individual multipliers followed by a radix-4 adder with the appropriate function from 4-value function R141, . . . , R149. For instance the calculation of the radix-4 residue of (a0*2+a1*3) can be achieved by inputting a0 and a1 to the non-commutative 4-value function R416.

Figure 18:
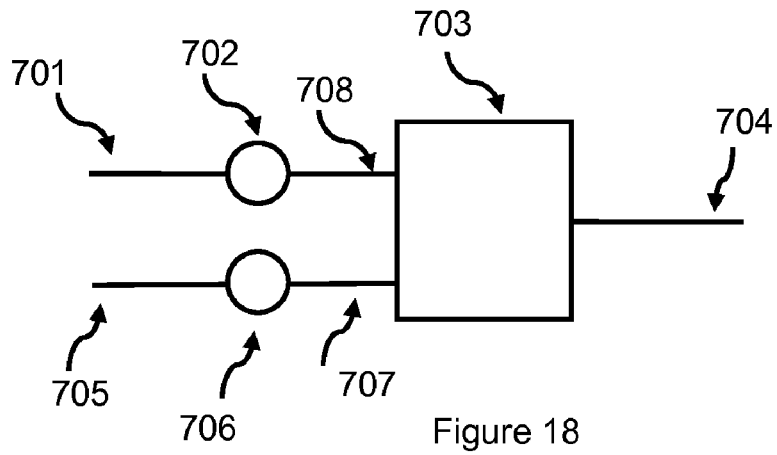
FIG. 18 is a diagram of a realization of the ternary expression a0×b0+a1×b1 realized by applying gates and inverters.

A slightly different approach can be applied in this and any radix-n multiplication by using the standard radix-n addition and n-valued inverters. One can limit the diversity of applied functions by multiplying the inputs by inserting the appropriate 4-value logic inverters. This is shown in FIG. 18. This approach uses more inverters, but less residue functions. Assume that FIG. 18 executes determining the radix-4 residue of (a0*2+a1*3).

Input 701 has a 4-value signal a0 and 'sees' an inverter 702 [0 2 0 2] which is identical to generating the radix-4 residue of a0*2 with a0=[0 1 2 3]. A similar approach applies to input 705 with a 4-value signal a1. The signal sees 706 which is inverter [0 3 2 1] when this inverter should execute determining the radix-4 residue of a1*3. The inverter outputs 707 and 708 are then inputted to 4-value logic function 703 which executes the modulo-4 addition function R141.

Unfortunately a similar "inverter" and then 'add' approach cannot be used for determining the relevant carry digits. The reason for that is that 'addition of carry digits' is not identical to the 'carry of additions' for a0b0+a1b1 in modulo-4 arithmetic. This means that either the relevant carry function will be used as defined in C141, ..., C149. Or that the carry digits have to be calculated by executing the full radix-4 addition.

For executing a0*2+a1*3, it is faster to apply 4-value logic function C146, which will generate the first carry digit. This 'multiply-and-add' example will always generate a 0 as its second carry digit, which is trivial in case 0 is represented by 'absence of signal'.

The 4-value carry and residue functions are not an easily modified version of each other. However it should be clear that the functions for (b0=1,b1=2) and (b0=2,b1=1) are commuted versions of each other by switching the order of the input (a0 becomes a1 and a1 becomes a0). The same applies for (b0=1, b1=3) and (b0=3, b1=0) and (b0=2, b1=3) and (b0=3, b1=2). One can apply the same function in two commuted situations by switching input signals. The total number of required residue and first carry functions can be reduced from 9 to 6 each.

In case one of the multipliers b0 or b1 is 0 in a0b0+a1b1 the composite term reduces to a0b0 or a1b1. For determining the residue radix-4 the single signal a0 or a1 then 'sees' a single inverter. When b=1 it 'sees' [0 1 2 3] or identity, when b=2 it 'sees' [0 2 02] and when b=3 it 'sees' [0 3 2 1]. For determining the carry after multiplications the signal a0 or a1 also 'see' inverters. For b=1 signal a 'sees' inverter [0 0 0 0] or the trivial case if 0 is 'absence of signal'. For b=2 it 'sees' carry inverter [0 0 1 1] and for b=3 it 'sees' [0 0 1 2].

By applying this method all relevant digits of a0b0+a1b1 can be generated in one cycle and it reduces the total number of circuits compared to applying multipliers and full adders. The completion of an n×m multiplication requires that all partial products will be added. In the radix-4 case a 'carry-save-add' method may be applied. In radix-4 5 digits can be added generating a single radix-4 residue digit and a carry digit. In the above multiplication method a third digit in the product-sum (a0b0+a1b1) will be created by a second carry which can only get a maximum value 1. This provides extra room for saving on CSA addition. Two complete results of a0b0+a1b1 and a2b2+a3b3 can be added in a single CS sweep, generating a 4-value multi-digit residue number and a 4-value multi-digit carry number.

As an illustration, the multiplication of an 8 digit 4-value number can be multiplied with an 8 digit 4-value constant using the here described method. This will generate (in one cycle) 4 results, each comprising 3 multi-digit numbers (the residue, the first carry and the second carry). The first CSA can reduce this to 2 multi-digits numbers comprising the residue and the carry. The 4 multi-digits can be reduced by a single CSA to two multi-digit numbers. The two numbers have to be added in a carry propagating manner, though time saving methods like carry-look-ahead can be applied. Assuming that each CSA level takes one cycle and the CLA taking perhaps 8 cycles, the total multiplication can then be executed in 18 cycles. For those familiar with the art it should be clear that the speed can be optimized by selecting different CSA combinations and carry limiting approaches.

Multiplying Two Variable Numbers in Radix-4

The advantage of multiplying with a constant number is that one knows in advance which functions have to be applied in the expression a0b0+a1b1. This is of course not the case when both a0 and b0 are variables. It should be clear to those skilled in the art that individual 4-value multipliers require multi-level execution as well as a significant number of circuits. Assuming that it is relatively easy to implement 4-value gates, the inventor has developed a new method to multiply-and-add 4 4-value single digits. Creating a0b0+a1b1 requires three different functions. First, the creation of the modulo-4 residue of a0b0+a1b1. Second, the creation of the first carry digit of a0b0+a1b1. Third, the second carry digit of a0b0+a1b1. In a0b0+a1b1 the terms a0, b0, a1 and b1 are all single digit value signals with value 0, 1, 2 or 3.

Figure 19:
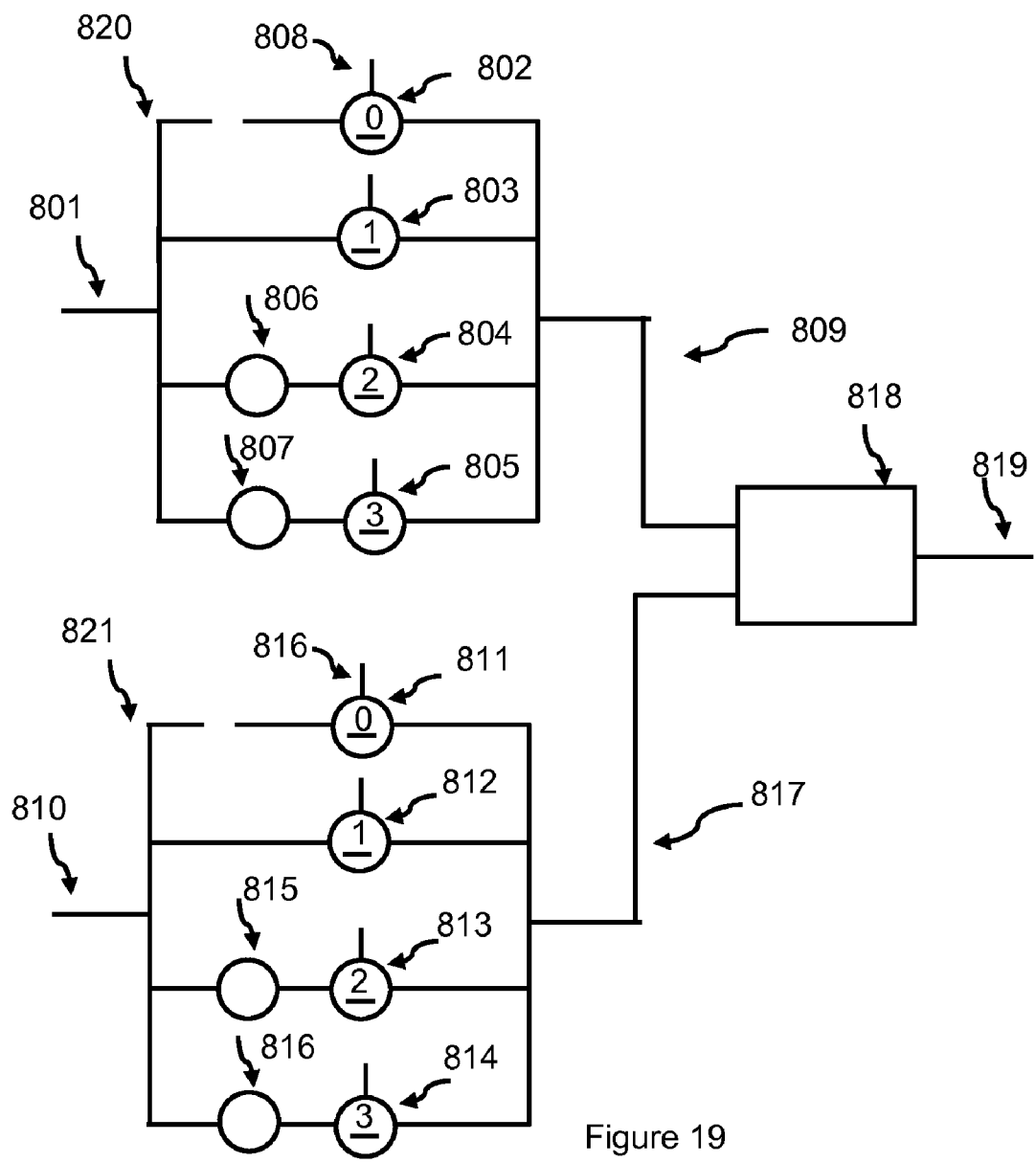
FIG. 19 is a diagram of a circuit that can generate a radix-4 residue of a0b0+a1b1.

The circuit that can be used to create the radix-4 residue of a0b0+a1b1 is shown in FIG. 19. The circuit has two multipliers 820 and 821, 4 inputs representing a0, b0, a1 and b1 and one output modulo-4(a0b0+a1b1).

Multiplier 820 has two inputs: 801 which will provide the signal representing a0 and 808. Input 808 is the control input to gate 802 as well as for gates 803, 804 and 805. Input 808 provides the signal representing b0. Gate 802 is conducting when b0=0, gate 803 is conducting when b0=1, gate 804 is conducting when b0=2 and gate 805 is conducting when b0=3. When gate 802 is conducting the signal 801 'sees' an interruption and the output 809 is 0 (when 0 is 'absence of signal'). This is equal to multiplying a0 by 0. Of course when 'absence of signal' represents state 0 the branch with gate 802 may be removed.

When gate 803 is conducting output 809 will assume the value of input 801. This is identical to multiplying a0 with 1.

When gate 804 is conducting the signal on 801 'sees' inverter 806. Inverter 806 is [0 2 0 2]. The signal on 809 is (a0*2)modulo-4.

When gate 805 is conducting the signal on 801 'sees' inverter 807. Inverter 807 is [0 3 2 1]. The signal on 809 is (a0*3)modulo-4.

The same applies to circuit 821 which calculates (a1b1) modulo-4.

Multiplier 821 has two inputs: 810 which will provide the signal representing a1 and 816. Input 816 is a control input to gate 812 and is also the control input for gates 813, 814 and 815. Input 816 will provide the signal representing b0. Gate 812 is conducting when b1=0, gate 813 is conducting when b1=1, gate 814 is conducting when b1=2 and gate 815 is conducting when b1=3. When gate 812 is conducting the signal 810 'sees' an interruption and the output 817 is 0 (when 0 is 'absence of signal'). This is equal to multiplying a1 by 0.

When gate 813 is conducting output 817 will assume the value of input 810. This is identical to multiplying a0 with 1.

When gate 814 is conducting the signal on 810 'sees' inverter 815. Inverter 815 is [0 2 0 2]. The signal on 817 is (a1*2)modulo-4.

When gate 815 is conducting the signal on 810 'sees' inverter 816. Inverter 816 is [0 3 2 1]. The signal on 817 is then (a1*3)modulo-4.

The signals on 809 and 817 are inputted to a function 818. This is a 4-value logic function representing modulo-4 addition. Its truth table is shown in the following table:

| mod4+ | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

The reason this circuit provides the correct answer is because (mod4(a)+mod4(b))=mod4(a+b).

Unfortunately the same is not the case for the carry digits. Or: the sum of the carry digits is not always the carry digits of the sum.

As shown previously in 4-value logic there are 9 different configurations for (b0,b1) wherein b0 nor b1 is 0. It seems that applying all carry functions with gates for calculating each individual carry digit requires too many circuits.

In an earlier application the inventor developed the concept of corrective circuitry as a 'repair'. That is: create a realizable circuit that almost correctly implements a logic function. Correct the final outcome by adding circuitry that adds the missing outcomes (or in some cases eliminates undesired outcomes).

The following table shows a sum of the carry digits of mod4(a0b0)+mod4(a1b1) under column S and how much adjustment is needed to create the correct carry of mod4 (a0b0+a1b1) under column M.

| a0b0 | A1b1 | S | M | aob0 | a1b1 | S | M | aob0 | a1b1 | S | M | aob0 | a1b1 | S | M |
|---|---|---|---|---|---|---|---|---|---|---|---|---|---|---|---|
| 0 | 0 | 0 | 0 | 1 | 0 | 0 | 0 | 2 | 0 | 0 | 0 | 3 | 0 | 0 | 0 |
| 0 | 1 | 0 | 0 | 1 | 1 | 0 | 0 | 2 | 1 | 0 | 0 | 3 | 1 | 0 | 1 |
| 0 | 2 | 0 | 0 | 1 | 2 | 0 | 0 | 2 | 2 | 0 | 1 | 3 | 2 | 0 | 1 |
| 0 | 3 | 0 | 0 | 1 | 3 | 0 | 1 | 2 | 3 | 0 | 1 | 3 | 3 | 0 | 1 |
| 0 | 4 | 1 | 0 | 1 | 4 | 1 | 0 | 2 | 4 | 1 | 0 | 3 | 4 | 1 | 0 |
| 0 | 6 | 1 | 0 | 1 | 6 | 1 | 0 | 2 | 6 | 1 | 1 | 3 | 6 | 1 | 1 |
| 0 | 9 | 2 | 0 | 1 | 9 | 2 | 0 | 2 | 9 | 2 | 0 | 3 | 9 | 2 | 1 |

| aob0 | a1b1 | S | M | aob0 | a1b1 | S | M | aob0 | a1b1 | S | M |
|---|---|---|---|---|---|---|---|---|---|---|---|
| 4 | 0 | 1 | 0 | 6 | 0 | 1 | 0 | 9 | 0 | 2 | 0 |
| 4 | 1 | 1 | 0 | 6 | 1 | 1 | 0 | 9 | 1 | 2 | 0 |
| 4 | 2 | 1 | 0 | 6 | 2 | 1 | 1 | 9 | 2 | 2 | 0 |
| 4 | 3 | 1 | 0 | 6 | 3 | 1 | 1 | 9 | 3 | 2 | 1 |
| 4 | 4 | 2 | 0 | 6 | 4 | 2 | 0 | 9 | 4 | 3 | 0 |
| 4 | 6 | 2 | 0 | 6 | 6 | 2 | 1 | 9 | 6 | 3 | 0 |
| 4 | 9 | 3 | 0 | 6 | 9 | 3 | 0 | 9 | 9 | 0 | 0 |

There are 13 problem cases which are underperforming and need to add 1 to obtain the correct end result.

The explanation for the 'under-performance' is that certain individual residues added together will generate an additional carry. The combinations of these residues are: (1+3); (3+1); (2+2); (2+3); (3+2) and (3+3). A way to correct the generation of the carry is to generate an extra carry (the value for M in the table) when the selected combinations of a0b0 and a1b1 occur. The truth table for that correcting function is the carry function for the 4-value addition, as shown in the following table.

| carp | 0 | 1 | 2 | 3 |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |

A diagram of a circuit that will generate the sum of the carry of a0b0+a1b1 is shown in FIG. 12. The circuit comprises three 4-value logic functions 905, 906 and 909. Functions 905 and 906 are identical and represent function car4.

| car4 | 0 | 1 | 2 | 3 |
|---|---|---|---|---|
| 0 | 0 | 0 | 0 | 0 |
| 1 | 0 | 0 | 0 | 0 |
| 2 | 0 | 0 | 1 | 1 |
| 3 | 0 | 0 | 1 | 2 |

The function 909 is the sum of the carry digits of a0b0 and of a1b1 and is the standard addition. This solution is strictly considering the truth tables of functions, not the realization. Output 910 will have as its signal the sum of the carries of a0b0 and a1b1.

As stated before, this will not be the same as the carry of the sum of a0b0 and a1b1. The correction will be achieved by generating the 'corrective' carries and adding these to the sum of the carries, which will be generated by inputting the residues of a0b0 and a1b1 to the function carp and adding this result to the 'sum of carries'.

A Complete 4×4 4-Value Digit Multiplier

For illustrative purposes a complete 4×4 4-value digit multiplier will be described. The key to this multiplier is the correct and fast execution of the partial products. A carry-save-add scheme is included to generate intermediate results. The final addition is completed by a time-saving carry-look-ahead (CLA) method.

The following table can be applied for reviewing the generations of the partial products.

|   | 1 | 2 | 3 | 4 | 5 | 6 | 7 |
|---|---|---|---|---|---|---|---|
| 1 |   |   |   | a3 | a2 | a1 | a0 |
| 2 |   |   |   | b3 | b2 | b1 | b0 |
| 3 |   |   |   | a3b0 | a2b0 | a1b0 | a0b0 |
| 4 |   |   | a3b1 | a2b1 | a1b1 | a0b1 |   |
| 5 |   | a3b2 | a2b2 | a1b2 | a0b2 |   |   |
| 6 | a3b3 | a2b3 | a1b3 | a0b3 |   |   |   |

It is assumed that the digits in A=[a3 a2 a1 a0] and B=[b3 b2 b1 b0] all can have one of 4 values (0, 1, 2 or 3). The number A in row 1 and number B in row 2 both are 4-value 4 digit numbers. The table shows the generation of all the partial products of the multiplication of A×B wherein A is the multiplicand and B is the multiplier.

Row 3 shows the partial products of A×b0, row 4 of A×b1, row 5 of A×b2, and row 6 of A×b3. The requirement to generate the complete product of A×B is to add in a correct fashion all the partial products.

The novel method invented, in accordance with one aspect of the present invention, allows the result of a term (a0b0+a1b1) to be generated in one cycle when B is a constant, including the radix-4 residue, the first carry and the second carry (when applicable). It is thus advantageous in speed as well as in total function count to have as many terms of the form (a0b0+a1b1) executed as possible. The way to achieve this is to add the terms of rows 3 and 4 and rows 5 and 6. Each set of rows has 3 overlapping terms forming 3 sets of the form (a0b0+a1b1) and 2 individual partial products. The individual partial products for rows 3 and 4 are the partial product in row 3 and column 7 and row 4 and column 3.

The results of summing row 3 and 4 are shown in the following table.

|  |  | a3b1 | a3b0 a2b1 | a2b0 a1b1 | a1b0 a0b1 | a0b0 |  |
|---|---|---|---|---|---|---|---|
| Residue |  | R (a3b1) | R (a3b0 + a2b1) | R (a2b0 + a1b1) | R (a1b0 + a0b1) | R (a0b0) |  |
| Carry1 | C (a3b1) | C (a3b0 + a2b1) | C (a2b0 + a1b1) | C (a1b0 + a0b1) | C (a0b0) |  |  |
| Carry2 | K (a3b0 + a2b1) | K (a2b0 + a1b1) | K (a1b0 + a0b1) |  |  |  |  |

The term R indicates a residue, the term C indicates the first carry, the term K indicates the second carry. In accordance with one aspect of the present invention, R, C and K are determined at the same time. As previously mentioned, the term K is not needed in the ternary case. Single terms like a3b1 cannot generate a second carry K. And only a second carry can be generated in (a0b0+a1b1) when both b0 and b1 are 3 (in the 4-value case to which this example applies).

The to be applied 4-value functions R and C also depend on the value of the factors b. Referring to the previously defined 4-value functions R411, ..., R419 and C411, ..., C419 it should be clear that the combination of b0 and b1 in the expression (a0b0+a1b1) determines the to be selected function of R and C.

When b0=0 and b1≠0 then the signal a1 'sees' a 4-value inverter b1r related to a radix-4 multiplier b1 and an inverter b1c related to the corresponding carry (there will not be a second carry). The same reasoning applies when b1=0 and b0≠0.

The same logic structure of adding rows 3 and 4 applies to the other combinations. The actual 4-value functions of course depend again on the values of factor b. There are 3 additional sum logic structures required, which will generate 4 sets of residues, carry1 and carry2.

The structure of the results is shown in the following dot diagram. Each dot means it can have a 4-value digit. An open dot means that the value is maximally 1 (in case of the 4-value carry2).

|  | a3 b3 | a2 b2 | a1 b1 | a0 b0 |
|---|---|---|---|---|
| r34 |  | ● | ● | ● | ● |
| c34 |  | ● | ● | ● |  |
| k34 | ○ | ○ |  |  |  |
| r56 | ● | ● | ● | ● |  |
| c56 | ● | ● | ● |  |  |
| k56 | ○ | ○ |  |  |  |

In order to create the final product of A×B all 6 rows of the partial products and carries have to be added. The sum will be the required result.

Addition of multi-digit numbers will create carries that may propagate through the calculation of the partial sums. A known scheme to delay the required calculation of propagating carries is the application of Carry-Save-Add (CSA) schemes.

The reason for CSA lies in the fact that addition of two digits (in any radix-n) can only generate at maximum a carry of value 1. For instance in binary or radix-2 the maximum value of a digit (in a 0 and 1 system) is 1. The sum of 1+1 has as residue 0 and as carry 1. The carry can also be 0, but never anything else. That means that after adding 1 and 1, one can add another 1, without adding to the carry. See the following table where 3 numbers a, b and c are added.

| A |  | 1 |
|---|---|---|
| B |  | 1 |
| partial sum residue |  | 0 |
| partial sum carry | 1 |  |
| C |  | 1 |
| final sum residue |  | 1 |
| final sum carry | 1 |  |

That means that one can add three binary multi-digit numbers, generating a residue multi-digit number and a carry multi-digit number, without carry propagation. In that way multi-digit carry propagating addition can be delayed until the final sum residue and carry are available and then execute a full carry propagation addition. The binary CSA approach allows a reduction from 3 to 2 numbers.

The same approach can be applied to radix-3 or ternary single digit numbers (either 0, 1 or 2).

| A |  | 2 |
|---|---|---|
| +b |  | 2 |
| partial sum1 residue |  | 1 |
| partial sum1 carry | 1 |  |
| +c |  | 2 |
| partial sum2 residue |  | 0 |
| partial sum2 carry | 2 |  |
| +d |  | 2 |
| partial sum2 residue |  | 2 |
| partial sum2 carry | 2 |  |

Again, each maximum value addition (2) can only add 1 to the carry. In that case 4 numbers can be added before the carry moves another position. According to the CSA approach a reduction of 4 to 2 numbers can be achieved applying a CSA scheme in ternary addition.

The same approach can be applied to radix-4 single digit addition (where the digit can have value 0, 1, 2 or 3).

| | | |
|---|---|---|
| A | | 3 |
| +b | | 3 |
| partial sum1 residue | | 2 |
| partial sum1 carry | 1 | |
| +c | | 3 |
| partial sum2 residue | | 1 |
| partial sum2 carry | 1 | |
| +d | | 3 |
| partial sum2 residue | | 0 |
| partial sum2 carry | 2 | |
| +e | | 3 |
| partial sum2 residue | | 3 |
| partial sum2 carry | 2 | |

In the radix-4 case a CSA scheme allows a 5 to 2 reduction.

It should be clear that by appropriately arranging the partial results of residues and carries of the partial products of the 4×4 multiplication one can save additional circuitry in applying the carry-save-addition.

The following is provided as an illustrative example only. First the results r34, c56 and k56 are arranged for a CSA that will take 2 cycles and will generate rr1 and cc1. Parallel to that the CSA for r56, c34 and k34 will be executed generating rr2 and cc2. These numbers will be added in a CSA generating rrr1 and ccc1 in 2 cycles.

| | a3 b3 | a2 b2 | a1 b1 | a0 b0 | | | | |
|---|---|---|---|---|---|---|---|---|
| r34 | | | | | ● | ● | ● | ● |
| r56 | | ● | ● | ● | ● | | | |
| k56 | ○ | ○ | | | | | | |
| rr1 | 0 | — | ● | — | ● | ● | — | — |
| cc1 | 0 | ● | 0 | ● | ● | 0 | 0 | 0 |
| c34 | | | | ● | ● | ● | ● | ● |
| k34 | | | ○ | ○ | | | | |
| c56 | | ● | ● | ● | ● | | | |
| rr2 | 0 | — | — | ● | ● | | — | 0 |
| cc2 | 0 | 0 | ● | ● | 0 | 0 | 0 | 0 |
| rr1 | 0 | — | ● | — | ● | ● | — | |
| cc1 | 0 | ● | 0 | ● | ● | 0 | 0 | 0 |
| rr2 | 0 | — | — | ● | ● | — | | 0 |
| cc2 | 0 | 0 | ● | ● | 0 | 0 | 0 | 0 |
| rrr1 | 0 | ● | ● | ● | ● | ● | ● | — |
| ccc1 | ● | ● | ● | ● | ● | ● | ● | 0 |

A zero (0) in the table means that it is known that a 0 will be generated. A horizontal line means the value of a previous calculation. One can arrange the CSA in such a way that as few as possible circuitry will be required. In the example 5 cycles are required to arrive from the partial 4×4 products results to two 8 digit 4-value numbers.

The sum of the two numbers rrr1 and ccc1 have to be fully added to create the final product of [a3 a2 a1 a0]×[b3 b2 b1 b0]. It is known that a full ripple adder of two 8-digit numbers may require 8 full additions. In the example the maximum number of additions is 7 as the last digit of rrr1 and ccc1 will not generate a carry.

Carry Look-Ahead Addition

The last step in completing the multiplication is the addition of the two multi-digit numbers created by the Carry-Save-Add operations. When the resulting numbers are more than 4 digits it is worthwhile to apply a carry-look-ahead or other methods to limit delays by carry propagation.

The carry-look-ahead method is a known method in binary technology. Its method is described in pages 84, 85, 86, 87, 88, 89, 90 and 91 of Computer Arithmetic, by Kai Hwang published by Wiley in 1979. The application of Carry-Look-Ahead in ternary logic is described in the article: "Conception d'un processeur DSP faible nergie en logique ternaire." Authors: O. Sentieys, E. Kinvi-Boh, and M. Aline. This article does not include the approach of applying an inverter to the modulo-3 adder to create the n-logic propagation function, of which the inventor believes to be the first one to invent this.

The carry-look-ahead unit in an adder applies two functions: the carry generation function G and the carry propagation function P. The function G determines if two corresponding digits in an addition will generate a carry. In binary logic this function is the AND function. In formula: $G(i)=a(i) \wedge b(i)$. Or the $i^{th}$ digits of the numbers a and b will generate a carry when both $a(i)$ and $b(i)$ or 1. The propagation function $P(i)$ tells if the generated residue of $a(i)$ and $b(i)$ combined with the incoming carry of the previous digits will generate a new carry. Or $P(i)=(a(i) \neq b(i))$. The carry at position i is then either formed by the carry generation or by the propagating function $P(i)$ combined with the incoming carry. The final sum is formed by $S(i)=P(i) \neq c(i-1)$.

The same reasoning can be applied to a 4-value logic. However the carry generating function G is formed by the function c4. Or $G(i)=a(i)$ c4 $b(i)$. The truth table of c4 is shown in the following table.

| c4 | 0 | 1 | 2 | 3 |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |

The meaning of the radix-4 carry propagating function is that a carry can be created by the residue combined with an incoming carry. The incoming carry is either 1 or 0. The only situation where an incoming carry=1 can contribute to a carry is when the residue is 3. The residue of adding two digits radix-4 is r4 of which the truth table is given in the following table.

| r4 | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

The truth table of the propagation function p4 is provided in the following truth table.

| p4 | 0 | 1 | 2 | 3 |
|---|---|---|---|---|
| 0 | 0 | 0 | 0 | 1 |
| 1 | 0 | 0 | 1 | 0 |
| 2 | 0 | 1 | 0 | 0 |
| 3 | 1 | 0 | 0 | 0 |

The function can be created as its own device. Its output can also be derived from function r4 wherein its output is inverted by the inverter Inv=[0 0 0 1]. If required the outputs of p4 and c4 can be conditioned for binary use. The generation of the carries can then be executed by standard binary carry-look-ahead units. The final sum digits S(i) can be created by the modulo-4 addition of the generated carries and the result of the individual modulo-4 additions.

For addition of numbers with more than 8 digits one can change to block-carry-look ahead (BCLA) units. This increases the number of cycles but reduces the size of the circuitry.

It should be clear to those skilled in the art that this approach works for any radix-n carry-look ahead method. By applying the inverter based method to CLA one slightly increases the number of cycles with 1, but it reduces the complexity of the circuitry.

A similar method of reducing a radix-n carry-look-ahead method to an existing binary method can be applied in so called pre-fix carry look ahead methods. One such method is known as the Brent-Kung method and can be applied to radix-n addition. See, IEEE Transactions on Computers, C-31 (March 1982), pages 260 to 264.

Mixed Logic: Binary and Multi-Value Logic on a Single Chip

New technologies such as SUS-LOC allow binary and non-binary logic to co-exist on a single CMOS chip. See, U.S. Pat. No. 6,133,754, which is hereby incorporated by reference. It is possible to implement non-binary logic on a chip for executing operations like multiplication or addition for instance in an FIR digital filter in standard CMOS. It is also conceivable that other processing of the signals can be done efficiently and preferably in binary logic. By creating in CMOS the required 'binary-to-multi-value' and 'multi-value-to-binary' converters, it is possible to create a highly efficient chip which looks binary to the outside world but executes in efficient multi-value logic. Part of the chip (using CMOS technology) would receive and process binary signals. A different part of the chip (also applying CMOS, but created by using different CMOS manufacturing processing steps) is able to translate the binary signal to a n-value signal which can be executed in n-valued logic. Such an n-valued logic circuit may for instance execute a 4-valued logic multiplier. Another functional part of the chip (also created applying CMOS technology) is able to translate an n-valued signal into a binary signal. And another part of the chip (also created by applying CMOS technology) is able to further process the received binary signal in binary logic and present a desired result in binary form to circuitry outside the mixed-logic chip.

Calculating (a0b0−a1b1) in n-Value Logic

Like calculating n-valued (a0b0+a1b1) with b0 and b1 two fixed n-valued numbers, one can also simplify the calculation of (a0b0−a1b1) in an n-valued fashion. It should be clear that further processing of the partial difference requires special attention and is different from adding the partial sums if a0b0 is less than a1b1.

The following truth tables can be applied in the ternary case for determining the single digit residue of a0b0-a1b1:

| a0-a1 | | a0 | | | a0-2a1 | | a0 | | | 2a0-a1 | | a0 | | | 2a0-2a1 | | a0 | | |
|---|---|---|---|---|---|---|---|---|---|---|---|---|---|---|---|---|---|---|---|
| R1 | | 0 | 1 | 2 | R2 | | 0 | 1 | 2 | R3 | | 0 | 1 | 2 | R4 | | 0 | 1 | 2 |
| a1 | 0 | 1 | 2 | 2 | a1 | 0 | 0 | 1 | 2 | a1 | 0 | 0 | 2 | 1 | a1 | 0 | 0 | 2 | 1 |
| | 1 | 2 | 0 | 1 | | 1 | 1 | 2 | 0 | | 1 | 2 | 1 | 0 | | 1 | 1 | 0 | 2 |
| | 2 | 1 | 2 | 0 | | 2 | 2 | 0 | 1 | | 2 | 1 | 0 | 2 | | 2 | 2 | 1 | 0 |

The following tables can be applied in the ternary case for determining the single digit borrow of a0b0-a1b1:

| a0-a1 | | a0 | | | a0-2a1 | | a0 | | | 2a0-a1 | | a0 | | | 2a0-2a1 | | a0 | | |
|---|---|---|---|---|---|---|---|---|---|---|---|---|---|---|---|---|---|---|---|
| C1 | | 0 | 1 | 2 | C2 | | 0 | 1 | 2 | C3 | | 0 | 1 | 2 | R4 | | 0 | 1 | 2 |
| a1 | 0 | 0 | 0 | 0 | a1 | 0 | 0 | 0 | 0 | a1 | 0 | 0 | 0 | 0 | a1 | 0 | 0 | 0 | 0 |
| | 1 | 1 | 0 | 0 | | 1 | 1 | 1 | 0 | | 1 | 1 | 0 | 0 | | 1 | 1 | 0 | 0 |
| | 2 | 1 | 1 | 0 | | 2 | 2 | 1 | 1 | | 2 | 1 | 0 | 0 | | 2 | 2 | 1 | 0 |

Similar truth tables can be created for the 4-value and n-value cases.

Application in n-Value FIR Filters

The following applications are concerned with digital filters. In the literature there exists some confusion about the use of the terms recursive and non-recursive filters for Infinite Impulse Response (IIR) and Finite Impulse Response (FIR) filters. Though it is possible to realize for instance a FIR filter in a recursive form, the common terminology FIR for non-recursive filters and IIR for recursive filters will be used.

The generic form of a Finite Impulse Response (or FIR) digital filter is given by the following formula:

$$y(n)=h1\cdot x(n)+h2\cdot x(n-1)+h3\cdot x(n-2)\ldots+hm\cdot x(n-m)$$

This formula says that the nth output of a signal filter that will process coded consecutive samples of a signal is the sum of m weighted samples of the input signal. The filter characteristic is determined by the value of the coefficients h1, h2, h3, . . . , hm.

Figure 20:
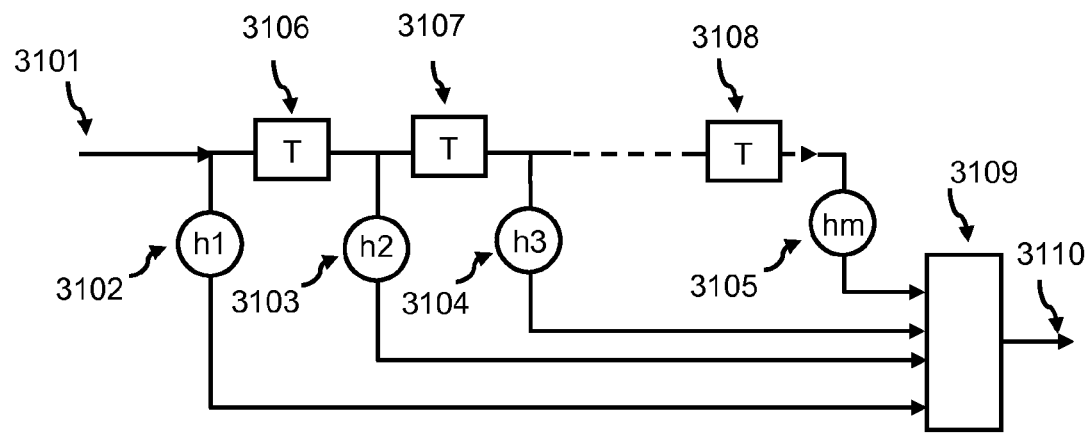
FIGS. 20, 20A and 20B illustrate various embodiments of multi-value digital filters.

FIG. 20 shows a diagram of a digital FIR-filter. At a moment n a digital sample of a signal x called x(n) is multiplied by a multiplier 3102 with a constant factor h1 and outputted to adder 3109 as h1*x(n) where it is summed with other samples. The sample x(n) is also moved into a register 3106, where it is held for one sample period T and will become x(n−1) in the next sample period.

The sample x(n−1) which entered the filter one sample period ago and was stored in register 3106 is inputted on multiplier 3103 and multiplied by a factor h2. The output h2*x(n−1) of 3103 is outputted to adder 3109 where it is summed with other samples. The sample x(n−1) is also moved to register 3107, where it is held for one sample period T and will become x(n−2) in the next sample period. The sample x(n−2), which entered the filter two sample periods ago and was stored in register 3107 is inputted on multiplier 3104 and multiplied by a constant factor h3. The output h3*x(n−2) of 3104 is outputted to adder 3109 where it is summed with other samples. The sample x(n−2) is also moved to a register, where it is held for one sample period T and will become x(n−3) in the next sample period. The process of multiplication, storing and inputting to the adder is repeated simultaneously for all m multipliers and (m−1) registers, including the final and m$^{th}$ multiplication of sample x(n−m) with constant hm in multiplier 3105. Its result hm*x(n−m) is outputted to adder 3109 where it is summed with the other samples. The sample x(n−m) will not further be stored. The here described process (including the final addition) takes place in one sample period T. The registers such as 3106, 3107 and 3108 have facilities to move content in and out at the same time, as is standard in shift registers. A signal is outputted on output 3110 every T period. The circuit of FIG. 20 is a digital FIR filter. According to one aspect of the invention, the multipliers can be realized in n-valued logic and perform radix-n multiplications. Consequently FIG. 20 can be the diagram of a realization of a ternary logic based FIR filter. According to another aspect of this invention, the circuit of which FIG. 20 is a diagram can be a 4-valued logic FIR filter. According to another aspect of this invention, the circuit, of which FIG. 20 is a diagram, can be an n-valued logic FIR filter.

Figure 20A:
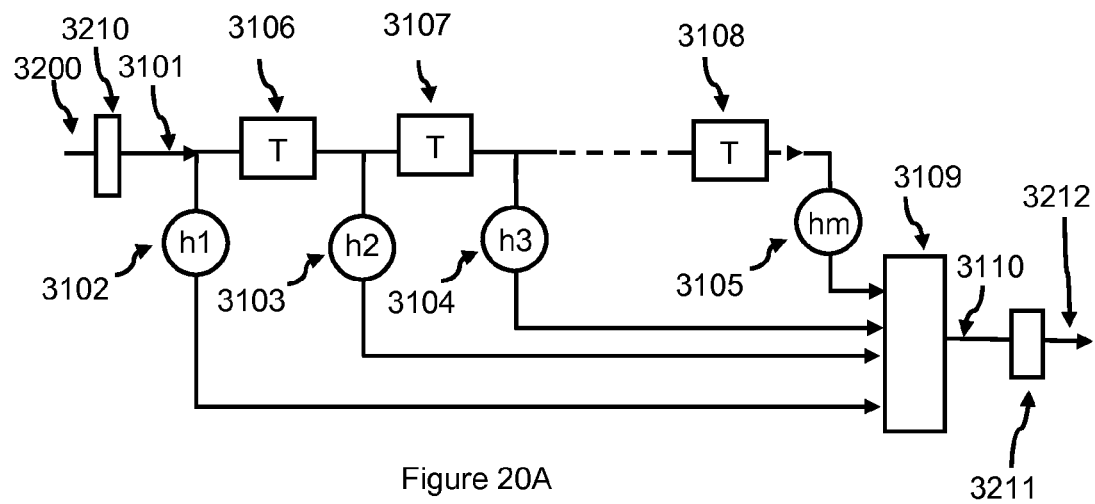
Figure 20B:
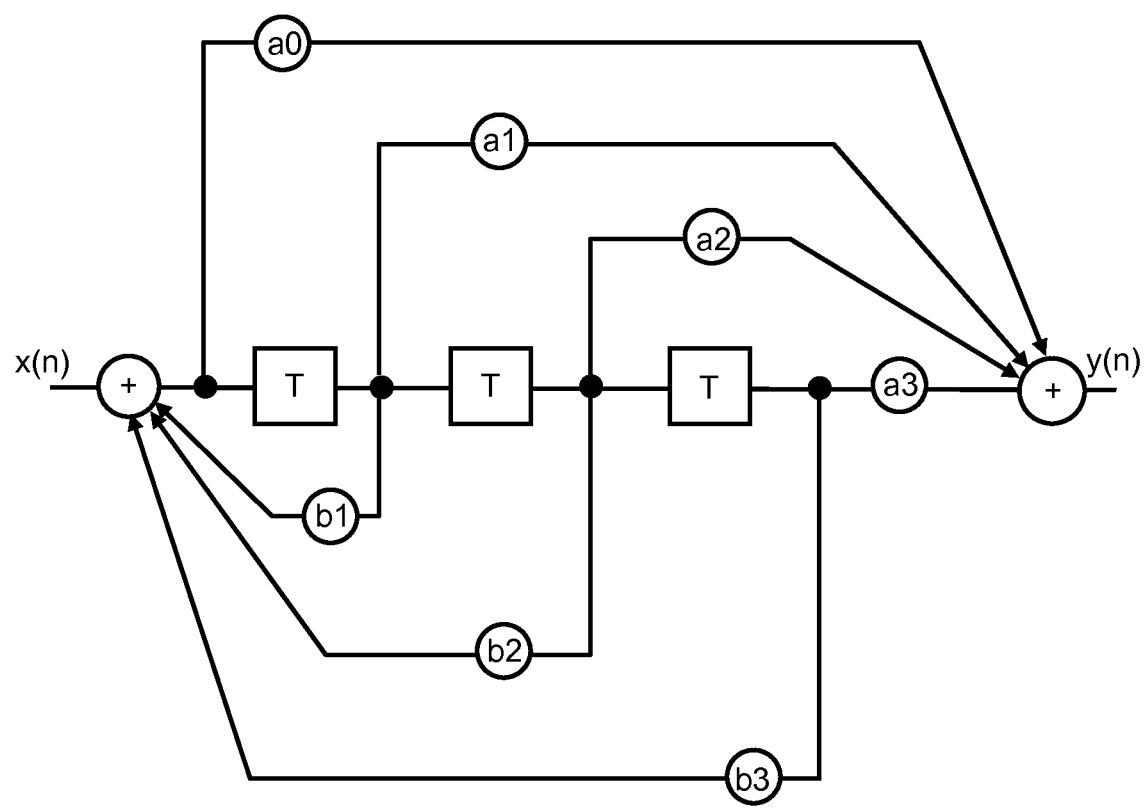

FIG. 20B shows an example of a filter with 3 delay elements (or a third order filter). The diagram of the filter shows the signal samples being multiplied by constants a0, a1, a2 and a3 and inputted into an adder that produces the filter output, as well as the delayed samples multiplied by constants b1, b2 and b3 and fed back to another adder at the input, where the feedback signals are accumulated with the new incoming sample. The processing elements of this filter are adders, multipliers and memory registers, which all can be realized in n-value logic. A ternary shift register is described in Sentieys et al: Conception d'un processeur DSP faible nergie en logique ternaire. Multiple valued latches and memory elements are also described in U.S. Pat. No. 6,133,754. Multi-valued latches and information retaining devices are also disclosed in Provisional Patent Application Nos. 60/575,948 filed Jun. 1, 2004 and 60/599,781 filed Aug. 7, 2004 by the inventor of the present application.

Consequently the circuit of which FIG. 20 is a diagram, can be an n-value logic based recursive or IIR filter, enabled by n-value multipliers, which are one aspect of the invention here disclosed.

As it is possible to realize binary as well as 4-value digital circuitry in CMOS on a single silicon semiconductor substrate, one can benefit from the improved performance of 4-value logic, while inputting and outputting signals in standard binary form.

Compressing Execution Cycles in n-Value Multiplications

Carry-save-addition or CSA allows the postponement of the actual addition of numbers with its carry propagating mechanism, by separating the generation of the residue and the carry. But even CSA requires the basic modulo-n and carry-n logic execution.

The only way to add numbers without any actual logic execution is by adding numbers that have no digits in overlapping positions. An easy example can be provided in decimal addition. For instance the addition of 800 with 12 can immediately generate 812 without the application of logic. The following table shows a 'dot-diagram' showing the position of digits. The symbol '•' represents a digit not equal to 0. The symbol 'o' represents an open position with no digit, or a digit that can be assumed to be 0.

The following table shows the 'dot-diagram' for 800+12:

| Number_1 | • | o | o |
| --- | --- | --- | --- |

The signal samples are coded as digital radix-n numbers. The multipliers execute radix-n multiplications, wherein the multiplier factor is also a radix-n number.

In general signal sample coding and multiplication are executed in binary mode. The presented novel method of n-value logic multiplication can save significantly in number of applied functions and execution cycles. A FIR filter application that uses 16×16 bits binary multiplication can be replaced by 8×8 4-value elements multiplication, saving in circuitry as well as in execution cycles. There are different configurations which can benefit from the method of this invention.

For illustrative purposes only one example of such a configuration has been provided in FIG. 20A. The circuit is a 4-value FIR filter with m 4-value multipliers according to the diagram of FIG. 20.

The original samples are binary coded and inputted on 3200. A coding device 3210 translates each 16 bits sample of signal x(n) into an 8 digit 4-value number. Consequently at each sample time an 8-digit 4-value sample is inputted on 3101 to the 4-value FIR filter. It should be clear that the samples inputted on 3200 can be of any radix p, though presently predominantly binary coded, and that coding device 3210 can be a radix-p to radix-4 coder.

At each sample time also an 4-value end result y(n) is outputted on 3110. The 4-value signal is translated into a binary signal by translating device 3211 and a binary number is outputted on 3212, where it is available for further binary processing or for reconstructing an analog signal. It should be clear that the samples outputted on 3212 can be of any radix p, though presently predominantly binary coded, and that the decoding device 3211 can be a radix-4 to radix-p decoder.

The generic formula for a digital filter is given in the literature as:

$$y(n) = \sum_{i=0}^{k} ai \cdot x(n-i) + \sum_{i=1}^{k} bi \cdot y(n-i)$$

By using previous values of the output signal y, this formula is recursive. It can be used to describe non-recursive filters (such as the FIR filter) when all terms bi=0. When bi≠0, the formula describes recursive filters, such as the IIR filter. There are different realizations of the filter described by this formula. FIG. 20A shows the realization of what is called in the literature as: the canonical realization. See for instance: Digital Signal Processing by Abraham Peled and Bede Liu, Wiley 1976, page 18, FIG. 1.5.

| Number_2 | ○ | • | • |
| Sum | • | • | • |

The following table shows the 'dot-diagram' for 801+11:

| Number_1 | • | ○ | • |
| Number_2 | ○ | • | • |
| Sum | • | • | • |

The execution of this addition requires execution of actual logic expressions. It should be clear that the number of actual logic executions can be limited if the number of overlapping digits in a summation are limited.

Assume, for illustrative purposes, that a multiplication of 4-value multi-digit numbers generates 11 partial products with overlapping digits. Carry-save addition in radix-4 allows for 5 additions generating individual residues and carries before the carry moves into a next position. In other words CSA can achieve a 5-to-2 reduction. CSA applied to 11 overlapping numbers requires minimally 8 cycles to generate 2 numbers.

Assume that it is possible to reduce the 11 overlapping 4-value numbers of the example to 6 numbers. The 6 numbers can be reduced to 2 4-value numbers by CSA in minimally 5 steps. Assume it takes 1 step to reduce the 11 overlapping numbers to 6 overlapping numbers. In that case there is a gain of 2 cycles.

This example is based on multiplication of two 8 digit 4-valued numbers. It may be assumed that the generation of the partial products-sum a0b0+a1b1 requires one cycle. The addition of the partial products plays a relatively important role in the overall calculations of the final product.

The reduction of the number of overlapping partial products can be achieved by calculating the sum of two partial products-sums of the form (a0b0+a1b1) before going into CSA execution. This is especially important when reduction of overlapping digits can limit the number of CSA cycles. As an illustrative example the 4-value case will be used to reduce the number of overlapping digits. Instead of 2 separate partial products-sums, just one partial products-sum will be created with the same number of digits.

The maximum value of a single product of 3×3 is 9 or [2 1] in radix-4. The maximum of a0b0+a1b1 is 9+9=18 or [1 0 2] in radix-4. Adding (a0b0+a1b1) with another term, let's say (a2b2+a3b3) has as maximum 18+18=36 or [2 1 0] in radix-4. The total number of digits in this sum, by creating the sum of the two partial products, compared to the number of digits in the addend and augends has not increased. While the number of multi-digit numbers has reduced from 2 to 1. The benefit of this reduction depends on the number of digits in the numbers that are multiplied.

A complete 4-value example will be shown next to demonstrate the principles here invented. It should be clear that these principles can be applied to any radix-n and to different numbers of partial products. For instance in the 4-value case one can add another term (a4b4+a5b5), without expanding the number of digits in the sum. This is because 36+18=56 or [3 1 2] in radix-4.

The essence of the method is to combine partial products before applying CSA or other addition.

As an example 2 4-value numbers will be multiplied by first generating the terms (a0b0+a1b1). The multipliers b0 and b1 may be constants or variables. In the next step 2 terms (a0b0+a1b1) (comprising 3 digits) will be combined to a single three digit term.

This process will be shown for the multiplication of an 8 digit 4-value number [a7 a6 a5 a4 a3 a2 a1 a0] with a 4-digit 4-value number [b3 b2 b1 b0].

|     | s10 | s9  | s8  | s7  | s6  | s5  | s4  | s3  | s2  | s1  | s0  |
| --- | --- | --- | --- | --- | --- | --- | --- | --- | --- | --- | --- |
|     |     |     |     | a7b0 | a6b0 | a5b0 | a4b0 | a3b0 | a2b0 | a1b0 | a0b0 |
|     |     |     | a7b1 | a6b1 | a5b1 | a4b1 | a3b1 | a2b1 | a1b1 | a0b1 |     |
|     |     | a7b2 | a6b2 | a5b2 | a4b2 | a3b2 | a2b2 | a1b2 | a0b2 |     |     |
|     | a7b0 | a6b3 | a5b3 | a4b3 | a3b3 | a2b3 | a1b3 | a0b3 |     |     |     |
| s0  |     |     |     |     |     |     |     |     |     | •   | •   |
| s1  |     |     |     |     |     |     |     |     | •   | •   | •   |
| s2  |     |     |     |     |     |     |     | •   | •   | •   |     |
| s3  |     |     |     |     |     |     | •   | •   | •   |     |     |
| s4  |     |     |     |     |     | •   | •   | •   |     |     |     |
| s5  |     |     |     |     | •   | •   | •   |     |     |     |     |
| s6  |     |     |     | •   | •   | •   |     |     |     |     |     |
| s7  |     |     | •   | •   | •   |     |     |     |     |     |     |
| s8  |     | •   | •   | •   |     |     |     |     |     |     |     |
| s9  | •   | •   | •   |     |     |     |     |     |     |     |     |
| s10 | •   | •   |     |     |     |     |     |     |     |     |     |

One should read the table as follows: the columns contain the terms that have to be added; the rows contain the digits representing the sum of the terms of the corresponding column. For example the column s0 contains the term a0b0. Because a0b0 is the partial product of two 4-value digits its value can be maximally 3×3=9 or [2 2] in radix-4. So it can maximally comprise 2 digits. The generic presentation of a digit as a dot is shown in the row s0, showing the 2 dots for a0b0.

Column s1 comprises a1b0 and a0b1. Its sum (a1b0+a0b1) comprises 3 digits (as it can be maximally 18 or [1 0 2] in radix-4) and is shown with its relative position to s0 in row s1 of the table. It is assumed that up to 4 terms in a column can be combined into a sum represented in a row by 3 digits. Column s10 comprises only term a7b0 and will be represented in row s10 by 2 dots.

The following table shows how the digits can be combined in a minimum number of overlapping 4-value numbers.

| | s10 | s9 | s8 | s7 | s6 | s5 | s4 | s3 | s2 | s1 | s0 |
|---|---|---|---|---|---|---|---|---|---|---|---|
| | | | | a7b0 | a6b0 | a5b0 | a4b0 | a3b0 | a2b0 | a1b0 | a0b0 |
| | | | a7b1 | a6b1 | a5b1 | a4b1 | a3b1 | a2b1 | a1b1 | a0b1 | |
| | | a7b2 | a6b2 | a5b2 | a4b2 | a3b2 | a2b2 | a1b2 | a0b2 | | |
| | a7b0 | a6b3 | a5b3 | a4b3 | a3b3 | a2b3 | a1b3 | a0b3 | | | |
| com1 | • | • | • | • | • | • | • | • | • | • | • |
| com2 | • | • | • | • | • | • | • | • | • | • | • |
| com3 | • | • | • | • | • | • | • | • | • | | |

The results are 3 4-value numbers. These can be added in 2 CSA steps, generating 2 4-value numbers (the residue and the carry) which have to be added in a carry propagating way.

The following table shows the result if only single terms (a0b0+a1b1) can be determined.

| | s10 | s9 | s8 | s7 | s6 | s5 | s4 | s3 | s2 | s1 | s0 |
|---|---|---|---|---|---|---|---|---|---|---|---|
| | | | | a7b0 | a6b0 | a5b0 | a4b0 | a3b0 | a2b0 | a1b0 | a0b0 |
| | | | a7b1 | a6b1 | a5b1 | a4b1 | a3b1 | a2b1 | a1b1 | a0b1 | |
| | | a7b2 | a6b2 | a5b2 | a4b2 | a3b2 | a2b2 | a1b2 | a0b2 | | |
| | a7b0 | a6b3 | a5b3 | a4b3 | a3b3 | a2b3 | a1b3 | a0b3 | | | |
| s0 | | | | | | | | | | • | • |
| s1 | | | | | | | | | • | • | • |
| s2a | | | | | | | | • | • | • | |
| s2b | | | | | | | | | • | • | |
| s3a | | | | | | | • | • | • | | |
| s3b | | | | | | | • | • | • | | |
| s4a | | | | | | • | • | • | | | |
| s4b | | | | | | • | • | • | | | |
| s5a | | | | | • | • | • | | | | |
| s5b | | | | | • | • | • | | | | |
| s6a | | | | • | • | • | | | | | |
| s6b | | | | • | • | • | | | | | |
| s7a | | | • | • | • | | | | | | |
| s7b | | | • | • | • | | | | | | |
| s8a | | • | • | • | | | | | | | |
| s8b | | | • | • | | | | | | | |
| s9 | • | • | • | | | | | | | | |
| s10 | • | • | | | | | | | | | |

Each set of 2 terms in a column generates a 3 digit sum. Columns like s3 comprise 4 terms. These will generate 2 3-digit sums, consequently they will have 2 rows (s3a and s3b) with 3 digit sums. Column s8 has 3 terms, which will generate 1 3 digit sum in s8a and the single term a5b3 of 2 digits in s8b.

The following table shows a possible reduction with a minimum number of overlapping 4-value numbers.

| s10 | s9 | s8 | s7 | s6 | s5 | s4 | s3 | s2 | s1 | s0 |
|-----|-----|-----|-----|-----|-----|-----|-----|-----|-----|-----|
|     |     |     | a7b0 | a6b0 | a5b0 | a4b0 | a3b0 | a2b0 | a1b0 | a0b0 |
|     |     | a7b1 | a6b1 | a5b1 | a4b1 | a3b1 | a2b1 | a1b1 | a0b1 |     |
|     | a7b2 | a6b2 | a5b2 | a4b2 | a3b2 | a2b2 | a1b2 | a0b2 |     |     |
| a7b0 | a6b3 | a5b3 | a4b3 | a3b3 | a2b3 | a1b3 | a0b3 |     |     |     |
| . | . | . | . | . | . | . | . | . | . | . |
| . | . | . | . | . | . | . | . |   |   |   |
|   |   | . | . | . | . | . | . |   |   |   |
|   |   |   | . | . | . | . |   |   |   |   |
| . | . | . | . | . | . |   |   |   |   |   |
|   | . | . | . | . | . |   |   |   |   |   |

A reduction to 6 numbers can be achieved. This can be reduced to 2 numbers by CSA in a minimum of 5 steps.
Generating the Sum of the Partial Product-Sums In accordance with another aspect of the present invention, the method can be even more effective if, once the partial product-sums of the form (a0b0+a1b1) are available, it is possible to rapidly generate the sum of 2 of the partial-sums. This means the result of the form {(a0b0+a1b1)+(a2b2+a3b3)}.

There are several ways to quickly create the sum of two 4-valued product-sum terms by using 4-valued switches or gates and inverters. Assume that the first product-sum has the three digits: r02, r01 and r00. These are arranged as the radix-4 number [r02 r01 r00]. The maximum value of this number is 18 or [1 0 2] in radix-4. The second product-sum is [r12 r11 r10] and its highest value is also [1 0 2]. The result of the sum of these two numbers is the three digit number [s2 s1 s0] with highest value 36 or [2 1 0] radix-4.

The addition of the two numbers can be displayed in the following table.

|   | r02 | r01 | r00 |
|---|-----|-----|-----|
|   | r12 | r11 | r10 |
|   | r2  | r1  | r0  |
|   | c2  | c1  |     |
|   | s2  | s1  | s0  |

As in all additions the steps comprise determining modulo-n sum residue and the carry.

One of the issues to address in the addition is to circumvent or at least limit the time lost due to the generation and propagation of the carries c1 and c2.

It is known that Carry-look-ahead in binary logic addition can limit logic cycles required for determining the propagated carry. The formulas provided in general for determining the carry in a three digit addition are:

$$c_1 = G_0 + c_0 \cdot P_0$$

$$c_2 = G_1 + G_0 \cdot P_1 + c_0 \cdot P_0 \cdot P_1$$

The term $c_0$ is the value of the incoming carry at position 0 and is in general 0.

The term G stands for Carry-Generation and is in the binary case the AND between the two to be added digits. The P stands for Carry-Propagation and is the value for the modulo-2 addition for which the addition of an incoming carry will generate a new carry.

For instance in the binary case addition of 0 and 1:0+1 will not generate a carry. However, if previous additions generate a carry then (0+1)+1 will of course generate a new carry.

The binary function '·' is the AND function and the '+' is the OR function.

In 4-value logic the function G is 'carry4+' for which the truth table is shown later. The 4-value logic function for P can be the function that is 1 when the sum of two digits modulo-4 is 3. Because when that is the case the addition of an incoming carry with 3 will then generate a new outgoing carry.

The 4-value propagation function P can be a 4-value function P that is 1 when the sum is 1. A truth table of function P is shown in the following truth table.

| P | 0 | 1 | 2 | 3 |
|---|---|---|---|---|
| 0 | 0 | 0 | 0 | 1 |
| 1 | 0 | 0 | 1 | 0 |
| 2 | 0 | 1 | 0 | 0 |
| 3 | 1 | 0 | 0 | 0 |

This function can be realized by having the output of the modulo-4 addition function being inverted by the 4-value inverter [0 0 0 1]. It can also be realized by applying a constant source and individually controlled switches or gates.
The First Sum Digit s0

The first result digit is s0 and is identical to the modulo-4 sum of r00 and r10. The truth table of the function is shown in the following table.

| mod4+ | 0 | 1 | 2 | 3 |
|-------|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

Figure 33:
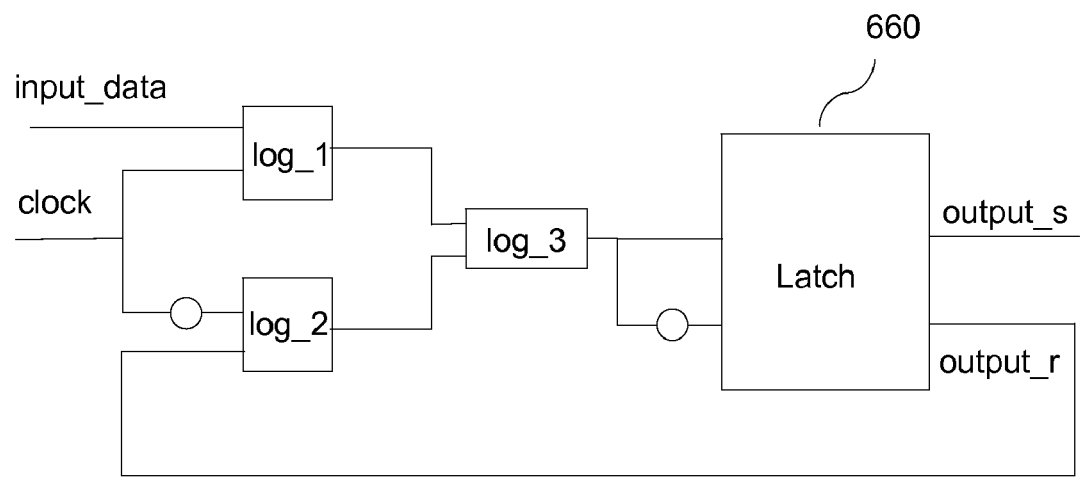

A diagram of the circuit 3300 realizing this function is shown in FIG. 33. The circuit has an input 3301 which will have signal r00 as its input. The output 3302 will have the signal for s0. The circuit has 4 branches. Each branch will be uniquely activated or made conducting by an individually controlled gate. Each of the gates 3304, 3305, 3306 and 3307 have the signal 3303 or r10 on its control input. Consequently gate 3304 is conducting when the signal on the control input is 0; gate 3305 is conducting when the control signal is 1, 3306 is conducting when the control signal is 2 and gate 3307 is conducting when the control signal r10 is 3. When the control input r10 is 0 the signal r00 on 3301 will see no inverter and will be passed on as is to output 3302. When the control input r10 is 1 the signal r00 on 3301 will see an inverter 3308 [1 2 3 0]. When the control input is 2 the signal r00 on 3301 will see inverter 3309 [2 3 0 1] and when the control input r10 is 3 the signal r00 will see inverter 3310 [3 0 1 2].

The Second Sum Digit s1

The second digit of the addition result, s1, is formed by the modulo-4 sum of r1 and c1. The digit r1 is again a modulo-4 sum residue, formed by the mod-4 sum of r01 and r11. The digit c1 is the carry of r00 and r10. A 'slow' way to determine s1 is to determine r1 and c1 and then add the two digits. A speedier and novel way to determine s1 is to determine r1 and c1, which can be done in parallel, and use the signal of the carry c1 to control two gates of which one is conducting if the other one is not-conducting.

The next table shows the truth table for determining the carry for the radix-4 addition.

| carry4+ | 0 | 1 | 2 | 3 |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |

The following table shows the truth table for the addition r01+r11+c1 for c1=1.

| mod4carry4+ | 0 | 1 | 2 | 3 |
|---|---|---|---|---|
| 0 | 1 | 2 | 3 | 0 |
| 1 | 2 | 3 | 0 | 1 |
| 2 | 3 | 0 | 1 | 2 |
| 3 | 0 | 1 | 2 | 3 |

Figure 34:
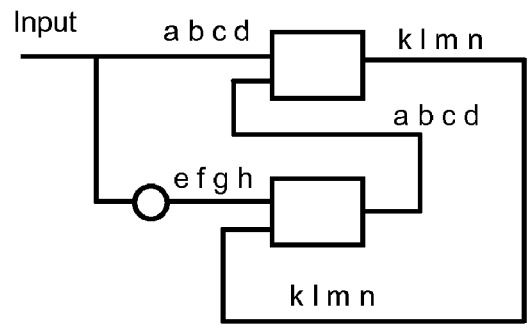

The circuit that can realize this function is a modified version of the modulo-4 addition function of FIG. 33 and is shown in FIG. 34. One can say that all columns of the truth table (and the inverters in the circuit are moved one position). The circuit 3400 in FIG. 34 executes the modulo-4 addition. The circuit 3410 executes the 4-value logic function mod4carry4+. The circuit 3410 can be considered a modified variant of 3400 wherein all gates are in the same position but all the inverters have moved up 1 position. In circuit 3410 inverter 3407*a* is identical to inverter 3407 [1 2 3 0] in circuit 3400; inverter 3408*a* in circuit 3410 is identical to inverter 3408 [2 3 0 1] in 3400; and inverter 3409*a* in circuit 3410 is identical to inverter 3409 [3 0 1 2] in circuit 3400.

Circuit 3410 will be activated when gate 3406 is conducting, which will take place when the signal on control input 3404*a* is 1. The signal on input 3401*a* is the output of the circuit in FIG. 35, which is the result of determining the carry of the addition of r00 and r10.

Circuit 3400 will be activated when gate 3405 is conducting, which will take place when the signal on control input 3404 is 0. The signal on input 3404 is the signal on output 3502 of the circuit in FIG. 35, which is the result of determining the carry of the addition of r00 and r10.

The signal on input 3401 is the signal representing r01 and the control inputs of the gates in circuits 3400 and 3410 all have the signal r11. The signal on output 3402 is then the result digit s1 of the addition of [r02 r01 r00] and [r12 r11 r10].

Figure 35:
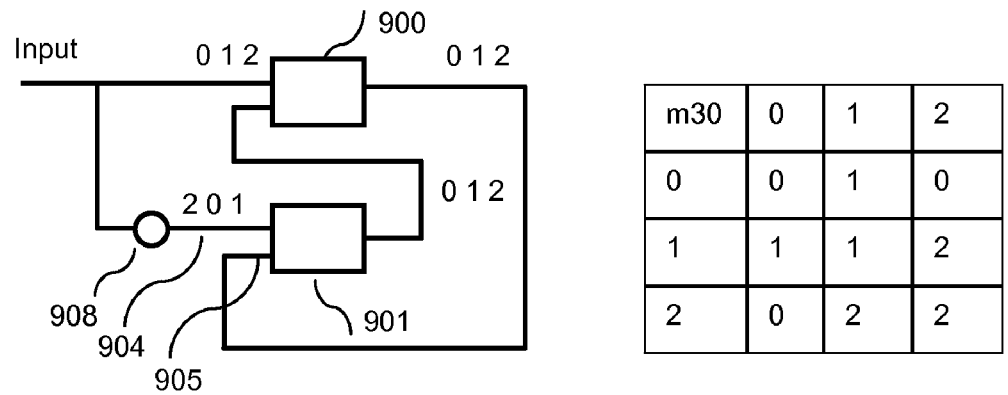

The 4-value carry function 'carry4+' is realized by the circuit 3500 in FIG. 35. The carry can only be 1 or 0. Assuming that 'absence of signal' represents the 0, only a source 1 need to be available to provide the correct state for the carry. The source 3501 in FIG. 3500 provides the constant source 1. The circuit 3500 has to pass the state 1 to output 3502 when a carry 1 is required. The gates in circuit 3500 have control inputs 3503, 3503*a* and 3503*b*, which all have signal r00 and control inputs 3504, 3504*a* and 3504*b* all have signal r10. According to the truth table of the 4-value function carry4+, a 1 has to be passed when: r00=3 and r10 is not 0; when r00 is not 0 and r10=3; when r00=2 and r10=2.

The Third Sum Digit s2

The third digit, s2, can be the result of different input situations:
- the modulo-4 addition of r02 and r12 with no carry result from the previous digit additions.
- the modulo-4 addition of r02 and r12 including a carry result 1 from the previous digit additions.

Because the result [s2 s1 s0] can be maximally [1 0 2]+[1 0 2]=[2 1 0], it is known accordingly that s2 can assume the values or states 0, 1 or 2 but never 3.

The carry from the previous addition is called c2.

The formula for the last digit is s2=(r02+r12)+c2. The carry c2 can be generated directly by the addition of (r01+r11) when the sum is 4 or greater, for which the function is given by 'carry4+'. The carry c2 can also be propagated by the result of (r01+r11) equal to 3 and having an incoming carry c1=1, as this will create a carry c2.

In formula s2={(r02+r12)+(c2=0)} or {(r02+r12)+(c2=1)} and c2={(r01+r11)=>4+(c1=0) or {(r01+r11)}=3+(c1=1)}.

The terms {(r02+r12)+c2} and {(r01+r11)+c1} can all be generated at virtually the same time by using individually controlled gates, which also receive their control signals at about the same time.

Figure 36:
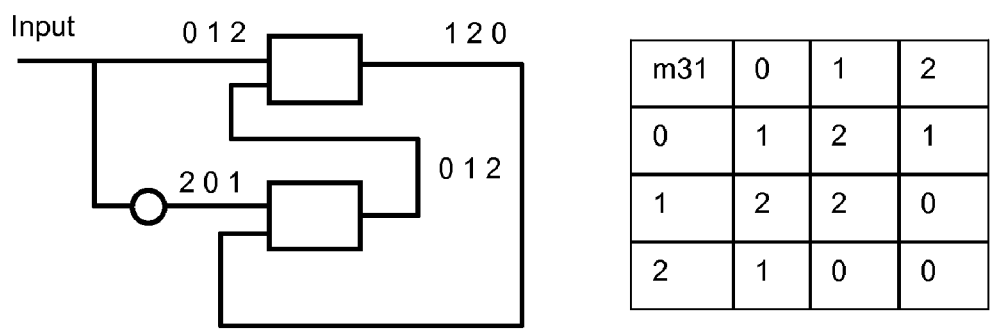

The expression s2={(r02+r12)+(c2=0)} or {(r02+r12)+(c2=1)} can be realized by the circuit of FIG. 36. This circuit is almost identical to the circuit of FIG. 34. However fewer inverters are required.

The input signal on 3601 is for instance r02. The gate 3605 has as control signal the signal c2 (which can be 0 or 1) on control input 3604. The control inputs 3603 and 3603*a* have the signal r12. Gate 3605 is conducting when c2=0. In that case signal r02 sees the identity inverter when r12=0 and the inverter [1 2 x x] when r12=1. The inverter positions for r12=2 or r12=3 are 'don't care' as r12 will never assume these states.

The gate 3606 has control input 3604*a* with c1 as its control signal. The gate 3606 is conducting when c2=1. The gates with control input 3603*a* have signal r12 as control signal. When c2=1 and r12=0 signal r02 sees inverter 3607*a* which is [1 2 x x] and when c2=1 and r12=1 signal r02 sees inverter 3608*a* which is [1 2 x x] also.

Figure 37:
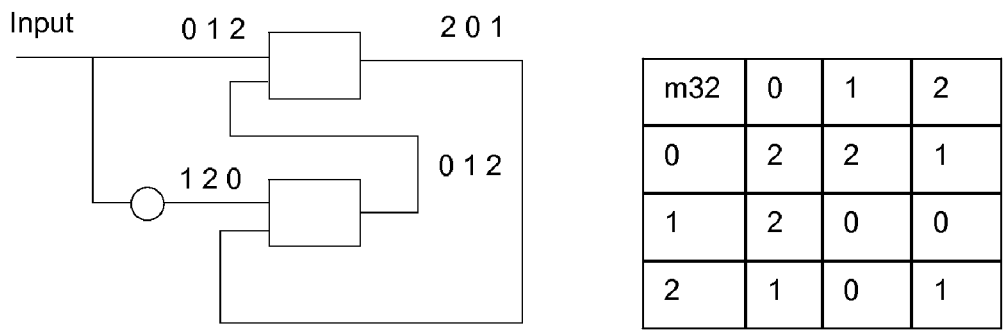

The result c2={(r01+r11)=>4+(c1=0)} or {(r01+r11)}=3+(c1=1)} can be generated in different ways. The circuit of 3700 in FIG. 37 is an illustrative example how c2 can be generated. The signal c1 is already generated in the circuit of FIG. 35 and c1 is available on output 3502. This signal will be the control input on inputs 3703 and 3703*a* of the respective gates 3706 and 3707. When gate 3706 is conducting for c1=0, the circuit will generate the carry c2 without the 'help' of an incoming carry c1. When gate 3707 is conducting for c1=1, a carry c2=1 will be generated for the cases wherein the sum of r01 and r11 is 3 and with the 'help' of incoming carry c1 a carry c2=1 will be generated. No inverters are needed as a constant source 1 at 3701 is used. The signal on control inputs 3704, 3704*a*, 3704*b*, 3704*c*, 3704*d*, 3704*e* and 3704*f* is r01 and on control inputs 3705, 3705*a*, 3705*b*, 3705*c*, 3705*d*, 3705*e* and 3705*f* is r11.

Consequently the signal c2 will be available on output 3702 and the generation of digit s3 is enabled.

It will be clear to those skilled in the art that the 4-value circuits here provided have significant opportunities for minimization of component count. The purpose of the illustrative example is to show that intermediate products-sums of a 4-value multi-digit multiplications can be rapidly accumulated, thus lowering the total number of cycles to generate the final product formed by the sum of the partial products.

It should be clear that the maximum value of addition of [1 0 2] and [1 0 2] is [2 1 0] and that one more products-sum with maximum value [1 0 2] may be added without expanding the total number of digits.

When the total number of overlapping products-sums in a multiplication is less than or equal to the maximum allowed number of numbers for a CSA execution, further reduction of individual terms may not be beneficial.

It should also be clear that higher radix-n multiplications offer potentially further benefits in accumulation of products-sums. For example in radix-5 multiplication, the maximum value for multiplying 2 radix-5 digits is 4×4=16 or [3 1] in radix-5. The addition of [3 1]+[3 1]=[1 1 2]. Another term [1 1 2] can be added without creating an additional digit. Radix-5 CSA allows for adding 6 multi-digit numbers to be reduced to two multi-digit 5-valued numbers in 5 cycles.

This method of reducing the number of products-sums is especially beneficial when the multiplier has significantly fewer digits than the multiplicand.

Preferred Embodiment for Gates and Inverters

As many apparently different embodiments of this invention may be made without departing from the spirit and scope thereof, it is to be understood that the invention is not limited to the specific embodiments thereof.

Figure 21:
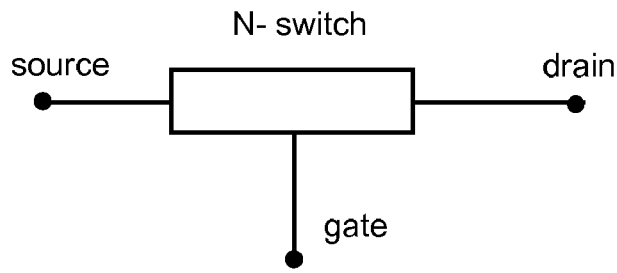
FIG. 21 is a diagram of an N-channel switch.
Figure 22:
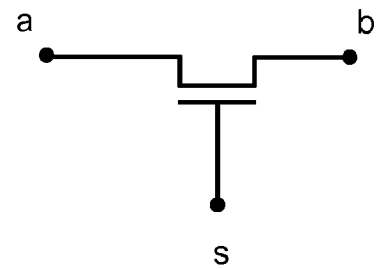
FIG. 22 is a diagram for an nMOS switch.
Figure 23:
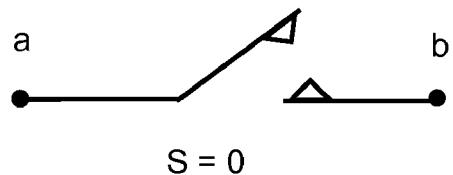
FIG. 23 shows the switching states for an nMOS switch.

Binary digital electronic gates are well known. Examples are MOS transistor switches. These switches, as described for instance in the textbook "Principles of CMOS VLSI Design: a Systems Perspective" by Neil Weste and Kamran Eshraghian, comprise a source and a drain as shown in FIG. 21. In case of the nMOS transistor switch of which a diagram is shown in FIG. 22, a conducting channel between the source and the drain is enabled when the gate has a 'high' voltage (S=1) imposed on it. When the gate voltage is low (S=0) there is no conducting channel between the source and the drain. A switching diagram is shown in FIG. 23. The actual level of the enabling voltage varies with several material properties. However in a binary logical sense one may say that this switch is conducting when the controlling signal is NOT LOW and the switch is non-conducting when the control signal is LOW.

Figure 24:
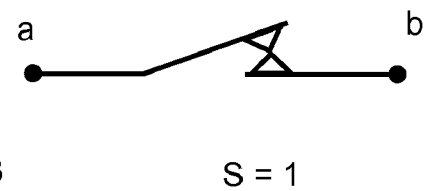
FIG. 24 is a diagram for a P-channel switch.
Figure 24:
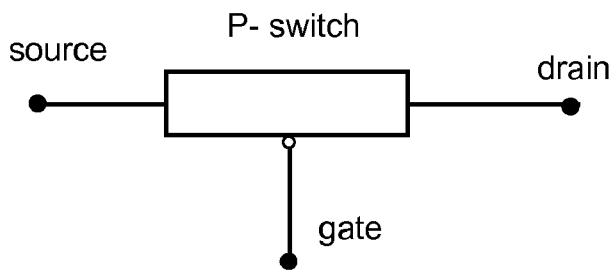
Figure 25:
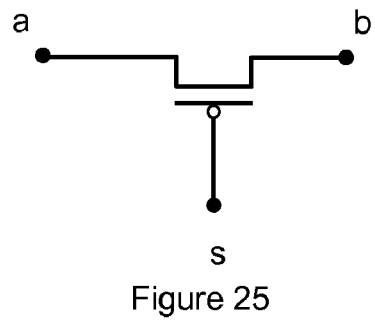
FIG. 25 is a diagram for a pMOS switch.
Figure 26:
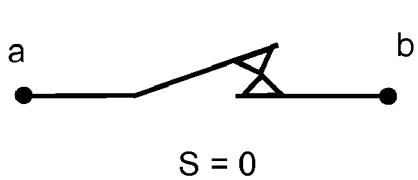
FIG. 26 shows the switching states for a pMOS switch.
Figure 26:
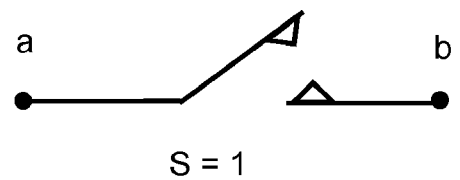

In the case of the pMOS transistor switch, as shown in FIG. 24, a conducting channel between the source and drain is enabled when the control signal on the gate is low (S=0). When the control signal is high (S=1) no conducting channel is enabled. FIG. 26 shows a diagram for the switching states. FIG. 25 shows the symbolic diagram for a pMOS transistor switch.

It is known from the literature and previously granted patents (see U.S. Pat. No. 6,133,754) that it is possible to realize ternary and n-value inverters, in that patent called one-place functions, in standard CMOS technology.

The requirement for applying a common technology for a switching gate for any n-value logic (with n an integer greater than 2) is that a gate is either conducting or non-conducting for a common state. All n-value logics with n greater than 2, have 3 states in common: 0, 1 and 2.

Because pMOS and nMOS transistor switches demonstrate the desired switching behavior at state 0 (or low), this state has been selected as the switching state for all other n-value logic gates. Availability of inverters makes it possible to transform any n-value state to 0. This makes the nMOS and pMOS switches universally adaptable for any n-value logic.

For practical purposes it should be noted that nMOS and pMOS switches operate at a certain threshold. It should also be noted that in its generic configuration the threshold level and the switched voltage are directly related. It may be that the physical voltage levels representing the states of n-value inverters do not coincide with the threshold level and or the maximum control levels of the nMOS and pMOS switches. Further more the maximum voltage levels of the switches from input-to-output have an upper limit, generally called the saturation level. For multi-value level switching purposes, the switches should be operated below saturation levels. And because of multi-value requirements switches should operate in a voltage range that is as close to a linear performance between input and output levels as possible.

Figure 27:
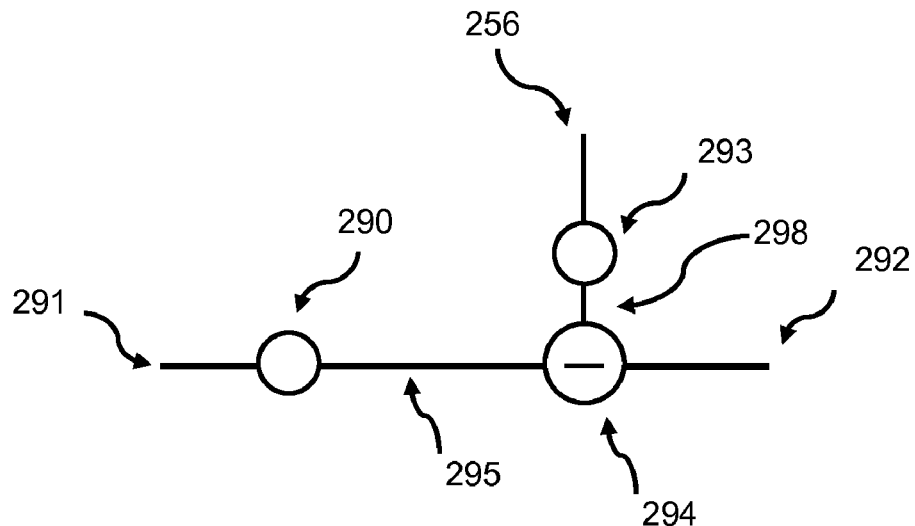
FIG. 27 is a diagram for a logic circuit realized from a gate and two inverters.

FIG. 27 shows a logical embodiment of a gate (294) with an inverter (293) in its control input (296) and an inverter (290) in its logic signal path starting at input 291 to output 292. While the logic state of the inputs 291 and 296 may be identical, the physical signals may have different values. Further more the logic states at 291 and 296 may be different. Assuming that gate 294 will be an on/off switch, controlled by an input 298 (being the output of an inverter), then the control signal at input 298 should be such that it acts as an individually enabling signal (independent from the input signal at 291) to the gate 294.

Individually (analog and linear) enabled switches in CMOS are well known. In order to apply these switches in the n-value case the level of the control input signal 296 has to be adapted to the on/off requirements of gate 294.

Figure 28:
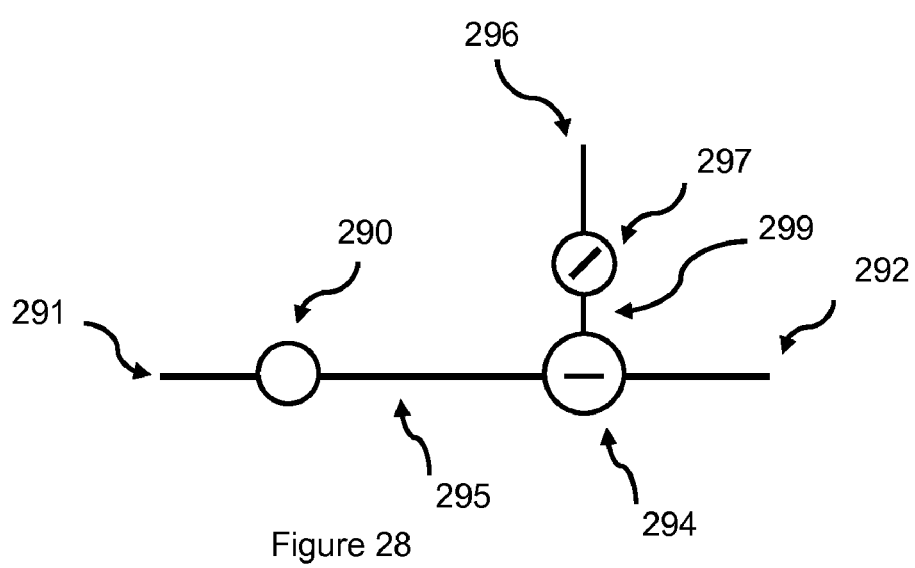
FIG. 28 is a diagram for a logic circuit in which the control signal is processed by a signal conditioner.

FIG. 28 shows a diagram of a circuit to achieve this by replacing the logic inverter 293 having an output 298 in FIG. 27 by the inverter 293 serially connected with a combined comparator/signal conditioning circuit 297 with an output 299.

The circuit 297 is such that its output 299 meets the requirements for an individually enabling on/off control for the gate 294.

Figure 29:
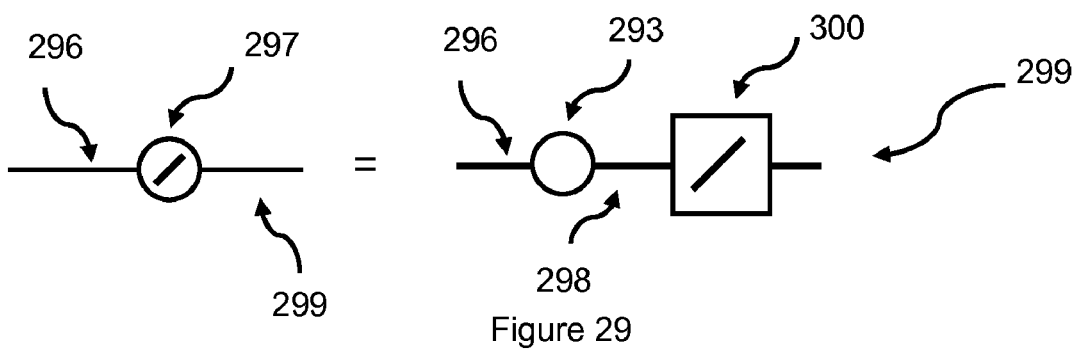
FIG. 29 is a diagram showing a signal conditioner for a gate control signal.

The circuit 297 in FIG. 28 is shown in detail in FIG. 29. It comprises the inverter 293 connected with a circuit 300 that performs two functions. First it performs a comparator function and determines if the signal at output 298 represents the state 0 of the inverter. The gate 294 in FIG. 26 is conducting when the control input state is 0. The circuit 300 will be created such that an output signal will be generated that will put the gate in a conducting mode. When the inverter 293 generates a logic state that will make the gate non-conducting, the circuit will correctly detect the state equivalent voltage and generate a signal that will make the gate 294 non-conducting, complying with the physical control requirements of the individually enable switch.

Because of the availability of n-value inverters, the embodiment of the gate control can be reduced to a standard analog individually enabled logic switch.

A similar problem can be faced by an n-value physical signal on the output 295 of inverter 290 in FIGS. 25 and 26. The gate 294 in FIG. 27 should be applied in a linear mode, such that input 291 and output 292 of the circuit are directly and linearly related. This requires a conditioning of the signal at output 295 in such a way that if at all only for the highest valid output signal of inverter 290 the gate goes into saturation. For all other signal values the gate should operate in a linear mode. For practical reasons there should be a sufficient difference in signal level between the saturation level and the second highest signal level representing a logic state.

Figure 30:
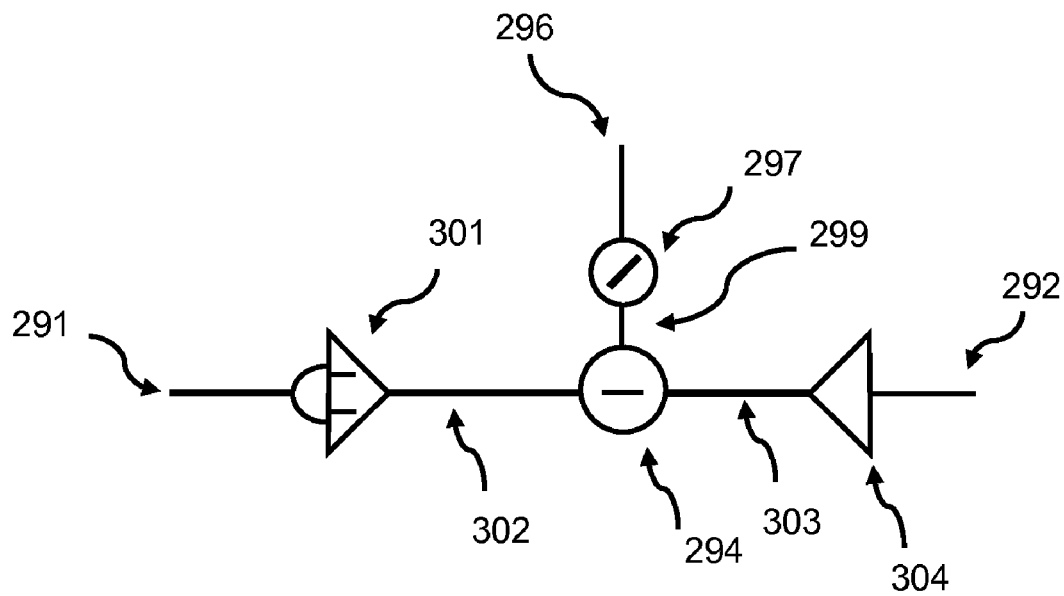
FIGS. 30 and 31 are diagrams of a logic circuit with signal conditioners.
Figure 31:
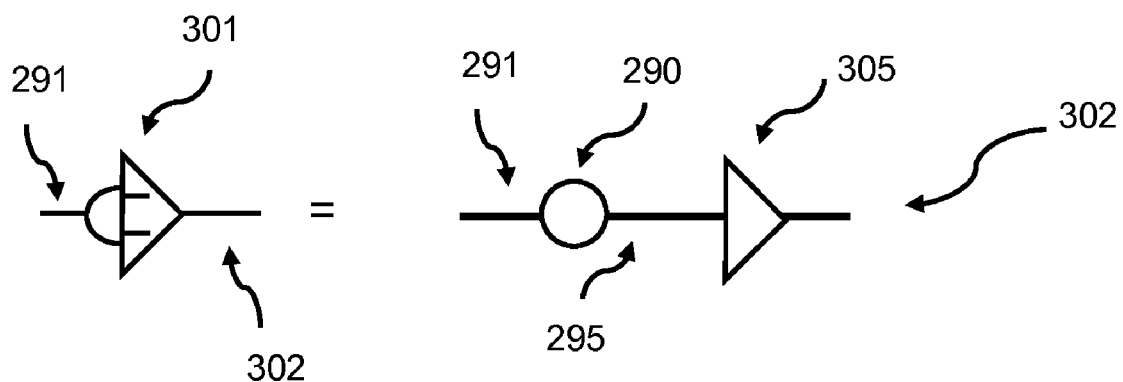

Further signal conditioning is shown in FIGS. 30 and 31. In order to create an input signal 302 to the gate 294 that will meet these requirements a circuit 305 will be connected to inverter 290 that will have as its input the inverter output 295 and an output 302. The combination of n-value inverter 290 with signal conditioning circuit 305 can then be replaced, as shown in FIGS. 28 and 29, by a circuit 301 with an input 291 and an output 302. This is for physical realization only. The logic functionality of device 305 is the same as inverter 290.

The output of the gate 294 in linear mode is 303, as shown in FIG. 30. To bring the signals back to the level for processing by n-value inverters a signal conditioner 304, functioning as the reverse of conditioner 301, will be applied. The input to the conditioner 304 is 303 and the output of signal conditioner 304 is 292, corresponding with the output 292 in FIG. 27.

A Matlab script that implements the multiplication process in accordance with one aspect of the present invention is provided below:

```
function y=mult3(a1,a0,b1,b0)
% multiply muliplicand [a1 a0] with multiplier [b1 b0]
% the translation matrix to identify rt(b1,b0)
% it is assumed that b0 and b1 are both not equal to 0
rt=[1 3;2 4];
ind=rt(b1,b0);
% go to origin 1
a0=a0+1;
a1=a1+1;
b0=b0+1;
b1=b1+1;
% the Residue matrix r in origin 0
r(1,:)=[0 1 2 1 2 0 2 0 1];
r(2,:)=[0 2 1 1 0 2 2 1 0];
r(3,:)=[0 1 2 2 0 1 1 2 0];
r(4,:)=[0 2 1 2 1 0 1 0 2];
% matrix origin 1 for a1b0+a1b0
mr2vec=r(ind,:)+1;
mr2=tot3(mr2vec);
% inverters for b=1 and for b=2
rev=[1 1 1;1 2 3;1 3 2];
mr1=rev(b1,:);
mr3=rev(b0,:);
res1=mr1(a1);
res2=mr2(a1,a0);
res3=mr3(a0);
residue=[0 res1-1 res2-1 res3-1]
% the Carry matrix c in origin 0
c(1,:)=[0 0 0 0 0 1 0 1 1];
c(2,:)=[0 0 1 0 1 1 0 1 2];
c(3,:)=[0 0 0 0 1 1 1 1 2];
c(4,:)=[0 0 1 0 1 2 1 2 2];
% change from vector to matrix origin 1 for a1b0+a1b0
mc2vec=c(ind,:)+1;
mc2=tot3(mc2vec);
% inverters for b=1 and for b=2
revc=[1 1 1;1 1 1;1 1 2];
mc1=revc(b1,:);
mc3=revc(b0,:);
ces1=mc1(a1);
ces2=mc2(a1,a0);
ces3=mc3(a0);
carry=[ces1-1 ces2-1 ces3-1 0]
```

Memory Elements

The memory elements of the multi-value digital filters can be implemented with the following memory elements. The memory elements can also be implemented with binary devices that are organized in such a way to process multi-value signals.

N-Value Static Memory Elements

In certain n-value logic applications, like the multi-coding method as described in this application, it may be elected to use a non-binary embodiment. In that case, it is sometimes required to have access to the previous state of the coding process. Prior art mentions different n-value dynamic memory technologies. In those cases the memory effect is dynamic and depends on a physical mechanism to retain the value of a logical state (in general an electronic charge).

In binary digital logic the fundamental logic circuit for memory purposes is called a latch. The latch depends on state feedback and locks or latches on the input state. The output state of a latch after stabilization always represents the input state. Latches can be expanded in such a way that they retain their value even in absence of a signal and only change value at the occurrence of an event such as a clock pulse. However, at the heart of all these memory circuits is the basic latch.

A ternary latch design is disclosed in U.S. Pat. No. 3,671, 764. For the memory elements described here with respect to ternary and n-value digital latches, several assumption have been made:

First, the ternary and n-value latch has potentially any n-value input value available, as well as any inverted form (through what is called in the previous provisional patent application: a universal n-value inverter).

Second, the latch will assume a stable output value that is directly related to its input.

Third, when the input to a latch is changed it may go through different intermediate states before the output latches to its final output value. The intermediate states are unstable and change to another state, even as the input is stable, until the final and desired state is reached.

Figure 32:
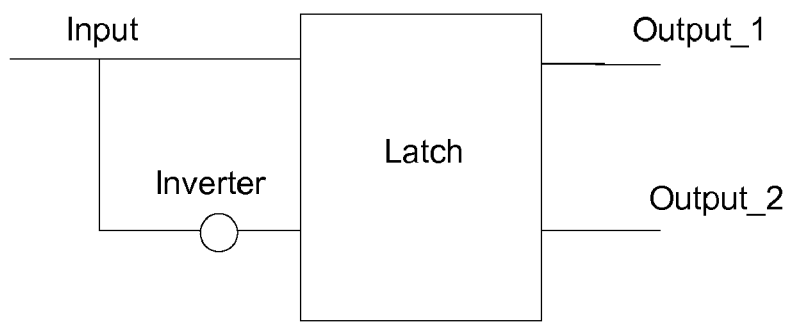

FIG. 32 shows a preferred configuration of an n-value digital latch in accordance with the present invention. There are two (related) inputs 650 and 651. The second input 651 is the inverse of the other input 650, and feedback from the output to the input. There are at least two outputs 652 and 653, again related to each other.

A possible configuration for an n-value memory device comprising n-value latches is shown in FIG. 33. The device comprises an n-value latch 660 on the right hand side. One of the relevant outputs (which depends on the structure of the latch and may include additional inverters), but in this case output_r, is fed back to the input of the memory device on the left side of the figure. This part contains switches that are controlled by a clock signal or an enabling signal. If the clock is low, the switch log__1 with input input_data is low (or zero) and the switch log__2 has as output the feedback value from the latch. If the clock signal is high, the situation reverses and the output of log__1 is that of input_data and of log__2 is zero. The output of log__3 is always the highest value of log__1 and log__2.

The device log__1, log__2 and log__3 are ternary logic devices that implement ternary logic functions. A preferred truth table for the device log__1 is:

| log__1 | 0 | 1 | 2 |
|---|---|---|---|
| 0 | 0 | 0 | x |
| 1 | 0 | 1 | x |
| 2 | 0 | 2 | x |

Where x indicates don't care.
The preferred truth table for this device log__2 is:

| log__2 | 0 | 1 | 2 |
|---|---|---|---|
| 0 | 0 | 0 | x |
| 1 | 0 | 1 | x |
| 2 | 0 | 2 | x |

The preferred truth table for the device log_3 is:

| log_3 | 0 | 1 | 2 |
|---|---|---|---|
| 0 | 0 | 1 | 2 |
| 1 | 1 | x | x |
| 2 | 2 | x | x |

The concept of logical input and output vector will be applied to describing the latches. An input vector is a one dimensional vector displaying the possible input values. The basic logical input vector for an n-value logic is [0 1 2 3 . . . (n−1)]. The vector represents all input status in consecutive order. By applying the universal inverter once, this vector changes into [(n−1) 0 1 2 3 . . . (n2)]. The output vector is the one dimensional vector displaying all the possible output states a device as the result of two input vectors in order of output.

The possible input vectors to a ternary logic device are [0 1 2], [2 0 1] and [1 2 0] if only universal inverters are used. In a latch, the output of a device must also be an input to the other device. The purpose is to create logical feedback in such a way that a stable situation is inescapable. The design process of the latch here described has a bit of trial-and-error method, but basically the following method will create at least one result per n-value latch.

First, to simplify the design, but not for reasons of logic, the n-value latch comprises two identical 2-input single output n-value devices with identical n-value truth tables. This is illustrated in FIG. 34.

Second, each of the devices referenced in the preceding paragraph has one external input and one input which is the output of the other device, as shown in FIG. 34.

Third, each of the devices has a finite switching or propagation time. This means that the external input value may change faster than the output.

Fourth, the truth tables of the devices may or may not be commutative. Further analysis demonstrates that the symmetry of possible input states renders commutative truth tables impossible for n-value latches with n being an even integer.

Fifth, the truth table can be created by assuming that the first or top device has two identical inputs, which defines the diagonal of the truth table.

Sixth, the second device has as one of its inputs the output of the first device.

Seventh, the output of the second device must generate the same values as the input to the first device.

Eighth, the input values to the inputs 904 and 905 of the second device 901 as shown in FIG. 34, may not be identical.

This approach works on the 3-value latch. FIG. 35 shows the configuration where the top device 900 has inputs [0 1 2] and [0 1 2] and generates the output [0 1 2]. Because [0 1 2] is one of the input vectors to the bottom device, the other input vector cannot be [0 1 2]. (Point 8 above). So the second external input vector can either be [2 0 1] or [1 2 0]. Together with [0 1 2] this has to generate again [0 1 2]. The selected input vector in FIG. 35 is [2 0 1], and is achieved by the use of a universal inverter [201] 908. Combined with the assumption of commutativity, there are now enough conditions to establish the truth table of the top and bottom devices, which is shown in FIG. 35 as table m30.

For demonstration purposes an analysis will be made of all possible states for this configuration. Referring to FIG. 34, suppose the top input to the top device is '0'. Automatically the top input to the bottom device is '2' (due to the universal inverter 908). It takes time for the devices to switch on the new inputs. Suppose the bottom input to the top device was '0'. The '0' and '0' generate a '0' according to truth table m30. The inputs to the bottom device are now '2' and '0' which again generate a '0'. Thus, the devices latch.

Suppose the top input to the top device is '0' but the bottom input was 1'. The inputs '0' and '1' generate a '1', which become the bottom input to the bottom device which has as top input '2'. The inputs '1' and '2' generate the output '2' which becomes the bottom input to the top device, with top input '0'. The inputs '0' and '2' generate as output a '0' which becomes the bottom input to the bottom device with top input '2'. The inputs '0' and '2' generate as output '0' which is the bottom input to the top device with top input '0'. The inputs '0' and '0' generate as output '0'. Once again, the devices latch.

Suppose the top input to the top device is '0' but the bottom input was '2'. The inputs '0' and '2' generate a '0', which become the bottom input to the bottom device which has as top input '2'. The inputs '2' and '0' generate the output '0' which becomes the bottom input to the top device, with top input '0'. The inputs '0' and '0' generate as output a '0' which becomes the bottom input to the bottom device with top input '2'. The inputs '0' and '2' generate as output '0' which is the bottom input to the top device with top input '0'. The inputs '0' and '0' generate as output '0'. The devices latch.

A similar analysis can be performed when the top input is 1 and the other input is 0, 1, or 2. Also, the analysis can be performed when the top input is 2 and the other input is a 0, 1, or 2. The analysis shows that the output achieves the correct and stable status required for proper latching performance.

Figure 38:
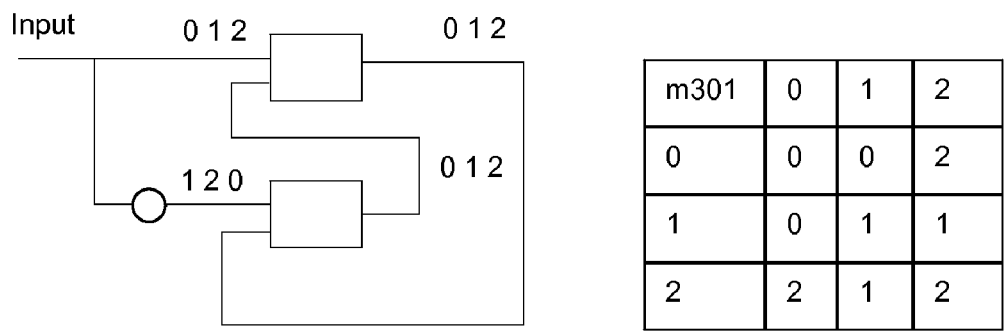

FIGS. 36, 37 and 38 show additional configurations for a ternary latch.

Figure 39:
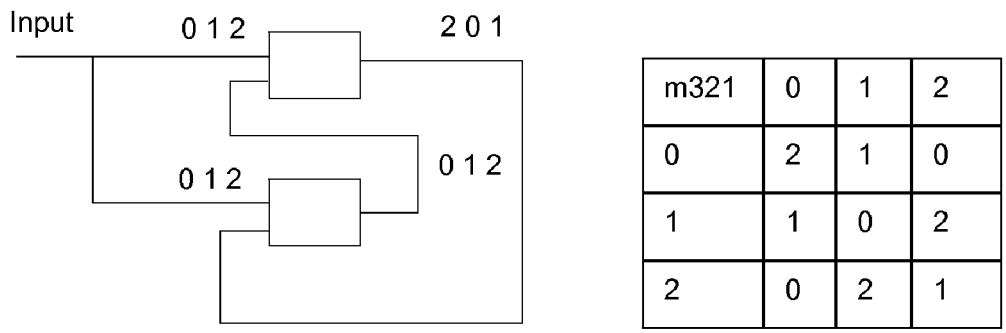

As an example, FIG. 39 shows a configuration that does not work as a latch, because it latches on unwanted states. Suppose the top input to the top device is '0' but the bottom input to the top device was '1'. The inputs '0' and '1' generate a '1', which becomes the bottom input to the bottom device which has as top input '0'. The inputs '0' and '1' generate the output '1' which becomes the bottom input to the top device, with top input still '0'. The inputs '0' and '1' generate as output a '1' which becomes the bottom input to the bottom device with top input '0'. Basically the devices have latched, but with the wrong output. As such this configuration is not usable.

Delays in propagation time will affect the behavior of the latches. One assumption is that the top device is faster than the bottom one. Another assumption is that the bottom device is faster than the top one. In the first assumption, the top device reaches its next state faster than the bottom device. In the second assumption, the reverse is true. However with just two devices, one device has to wait for the result of the other. Under either assumption, the latch can only be assumed to be stable once it has reached a final (wanted) state after a reasonable time, it does not switch (not even for a brief period) to another state.

Figures 40A, 40B:
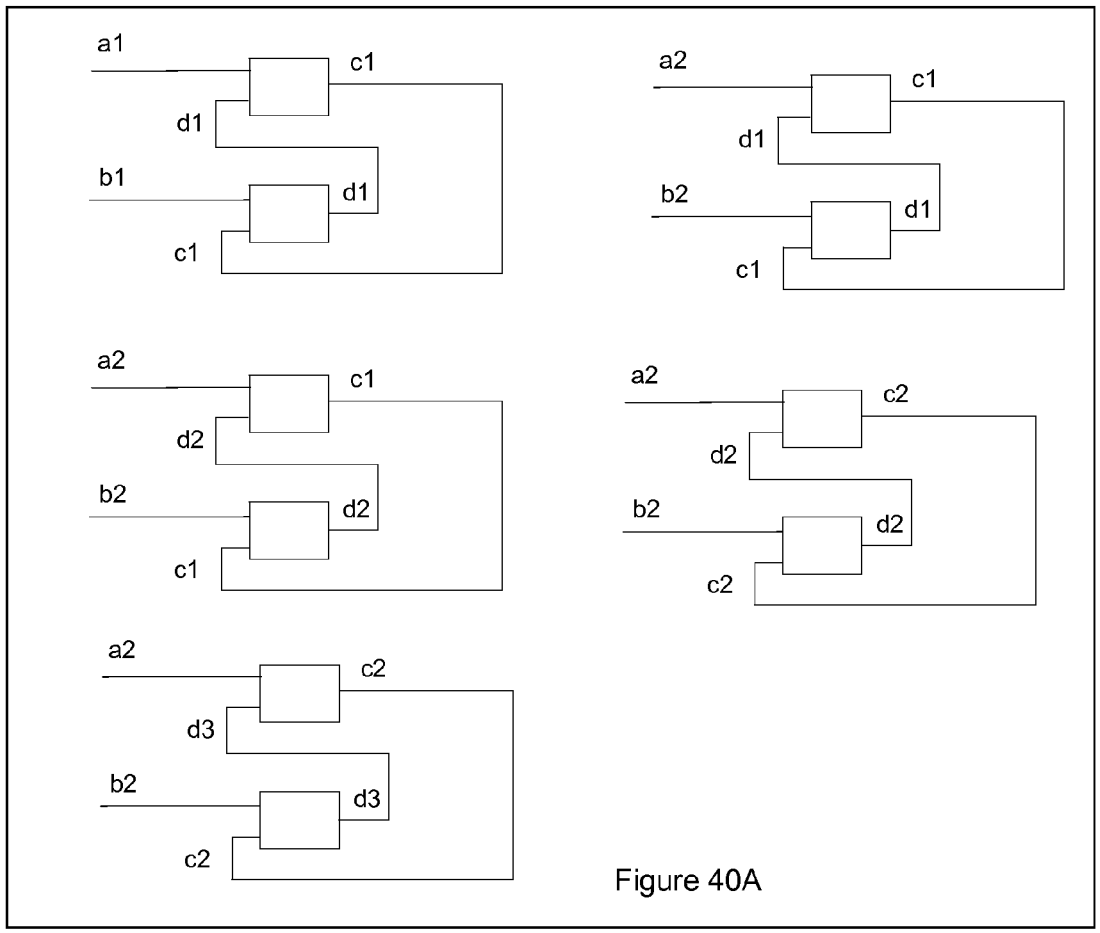

This 'delay' behavior is depicted in the diagrams of FIG. 40A. In this case, it is assumed that the bottom device switches faster than the top one. The initial state of the latch is stable with inputs a1 and b1 and outputs c1 and d1. Next the inputs are changed to a2 and b2, but the propagation delay keeps the outputs still on c1 and d1. Because the bottom device is faster, its output changes first (to d2). The top device is already switching as a consequence of a2 and will reach c2 after the bottom device has switched. The outputs c2 and d2 are now the new inputs to the devices which will switch almost at the same moment. The results are shown in the table of FIG. 40B. Though one device may switch faster, it cannot get 'ahead' of the other one as it has to apply its result to move on.

The same reasoning as above applies to higher value n-value latches. However for n is even there is an additional problem. For a latch is required to handle all possible input combinations and to make sure they all are leading to the right stable states. Because inputs are derived from each other by way of universal inversion in this application it is easy to compare all possible input vectors. One such combination is formed by the two input vectors [0 1 2 3] and [2 3 0 1]. The output has to be a possible input vector also. That means that the logical function for the devices cannot be commutative. The example input vectors have, for instance, the input combinations (0,2) and (2,0) which have to generate different outputs. Consequently the device cannot be commutative.

Figure 41:
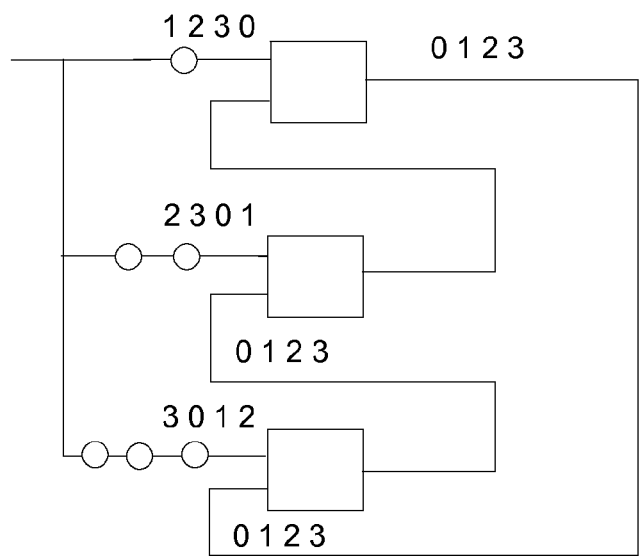

To assist in the design of the 4-value or quaternary latch the total configuration has been expanded with an additional device as shown in FIG. 41. Based on the previous rules and the condition of non-commutativity, a working latching 3-device quaternary configuration can be constructed. This configuration can then be reduced to a two device configuration as shown in FIG. 42.

Figure 42:
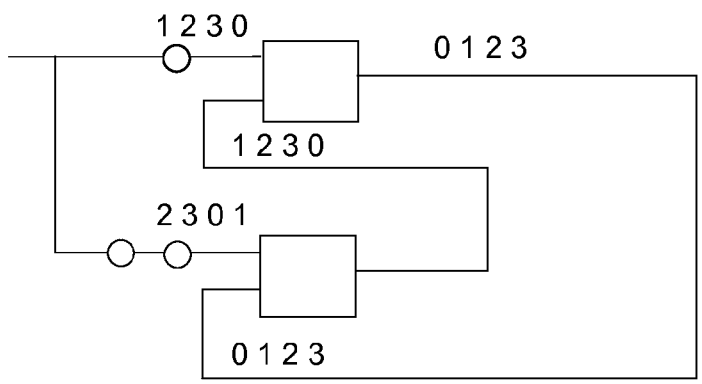
Figures 43, 44:
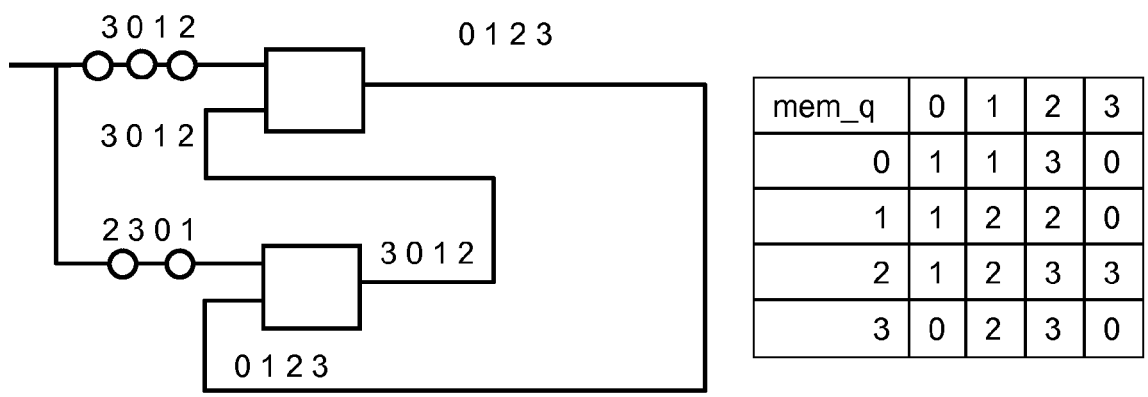

FIG. 43 contains a table that describes all possible input combinations and its consequences of the latch as shown in FIG. 42. It does not show the input combinations (0,0), (1,1), (2,2) and (3,3) because these are stable per definition. The table shows that no matter what the variable input (being the output of the other device) is, the devices all stabilize on the required states.

Figure 45:
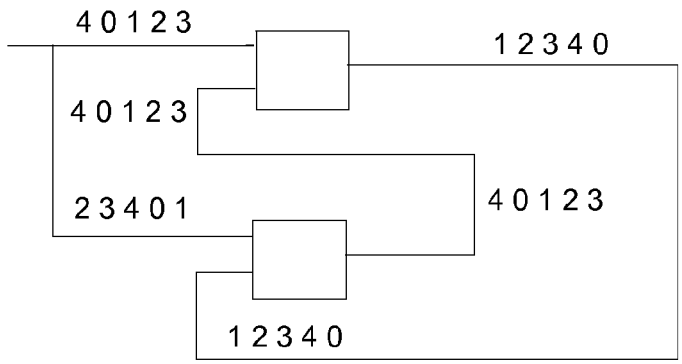

For illustration purposes another 4-value or quaternary latch is shown in FIG. 44. Assuming the existence of different propagation times (real or induced) it can be shown that both configurations of FIGS. 42 and 44 are stable. This approach can be extended for higher value n-value (n being odd or even) latches FIG. 45 shows a 5-value latch configuration, applying commutative 5-value logic devices.

Figure 46:
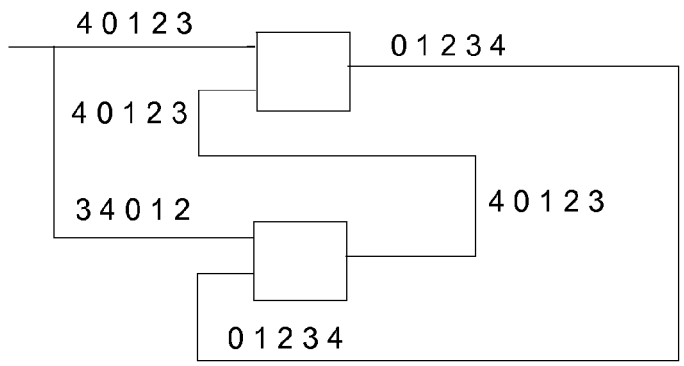
Figure 47:
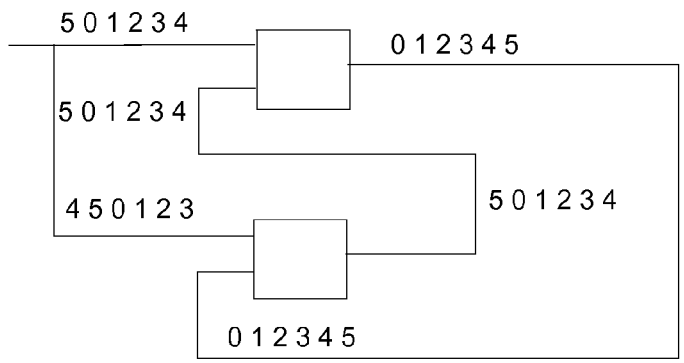

FIGS. 44, 46 and 47 show a more general approach to construct an n-value latch. The method is to start out with an n-value truth table and to first fill in the diagonal from upper left to bottom right starting with 1; each following diagonal position value is one higher than the previous one; the next to last value in the diagonal position is (n−1) and the last (bottom right) position has the value 0. Next positions to fill are the ones just one position in column coordinate under the previously filled. The value of that position should be one less than the one above it. The next step is to fill the rest of the columns with the value of the position on the diagonal. The generic n-value non-commutative truth table for latching devices (for n greater than 3) is shown in FIG. 48. The index of the truth table represented by the top row of the truth table represents the top input of the latch device. The index represented by the most right column of the truth table in FIG. 48 represents the bottom input of the latch device. This configuration applies to odd and even values of n greater than 3.

The feedback construction with two devices, with truth tables as just constructed and as applied in previous latches, will now form an n-value latch. The top or bottom devices in the n-value latch configuration may have a different propagation times. However the n-value latch is stable under either condition. It should be clear that there are different but related truth tables similar to the one in FIG. 48 that would fulfill the requirements of a 2 device latch. One such is where the repetitive values in the columns are diminished by one. Another variation (that applies to a limited number of configurations is the one where the truth table diagonal that represents the device output values with different inputs (in the figures the lower device) is moved to the right.

In some of the figures, the circles representing the inverters have been omitted to keep the figures less confusing. For those skilled in the art, it is easy to derive from the used input vector if and how many inverters should be applied.

Single Element (n-Value) Information Retaining Device

It is possible to create n-value, single element devices with feedback that will act as a ternary value information retaining device. This means that the output of such a device will assume a value uniquely related to the value of the input, enforced by feeding back the output of the device to one of the inputs.

The principle of such a device is shown in block diagram in FIG. 49. FIG. 50 shows a variant of this configuration by applying an inverter in the feedback path. This will change the ternary functions that will enable such a device, but does not materially change its principle.

Figure 51:
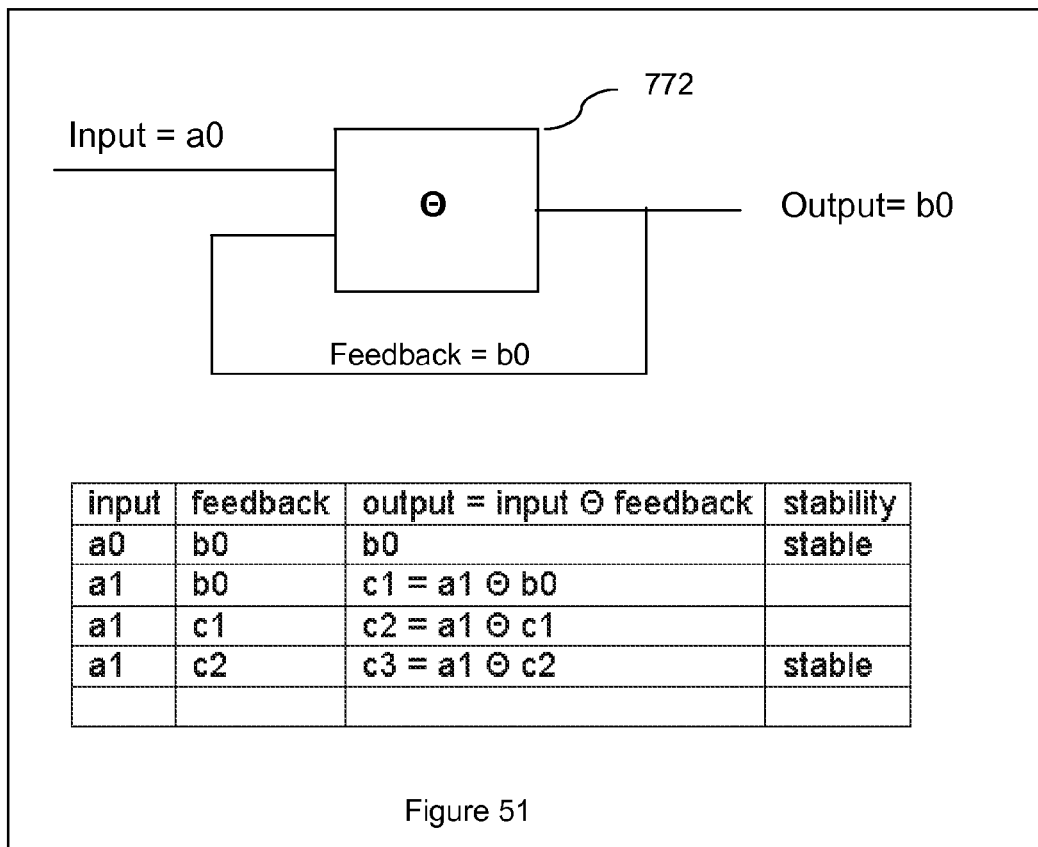

In FIG. 51 a stable situation is shown. The input is a0; the device executes an n-value logic function '$\Theta$' on a0 and the feedback signal b0 and generates an Output b0. Consequently the device is stable. The key assumption is that any physical device has a finite switching time, so any new input will 'see' the previous state through the feedback signal. Once feedback signal and output are identical the device has reached stability.

This invention relates to identifying the correct n-value logic functions that will:
   generate an output that can be uniquely related to a single value of possible inputs
   achieve stability
   does not depend on any previous state of the device
   achieves stability in a reasonable time
The majority of n-value functions do not comply with those requirements:
   they never achieve stability for all states
   they have no unique relationship between inputs and outputs; or n other words: different inputs may generate the same output
   their outputs depend on inputs as well as previous states Ternary Single Element Information Retaining Device There are several ternary logic functions that will perform the required functionality to realize the information retaining performance. It is easiest to limit the selection to commutative functions as this will prevent confusion on which input to use. However it should be clear to those skilled in the art that certain non-commutative functions will work as well. The method to determine the appropriate functions is then:
   a. create all ternary commutative logic functions
   b. determine all possible states of the device
   c. select those functions that will create stable end-states with the correct output
   d. if desired select only those functions that stabilize the device in a limited number of cycles.

Figure 52:
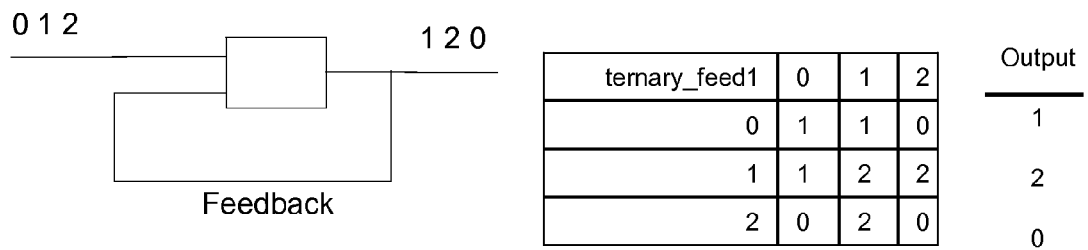
Figure 53:
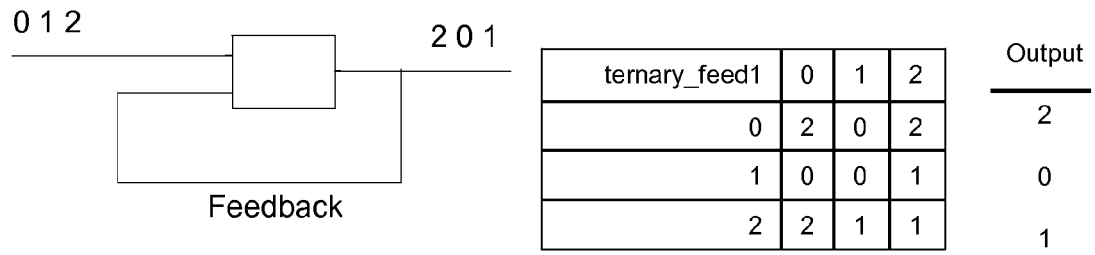

There are two commutative ternary functions that will enable this type of information retaining device. The two truth tables and the block diagrams are shown in FIGS. 52 and 53. The devices in these cases also function as an inverter. However by applying an inverter to the Output signal the value of the original ternary signal can be recovered.

There are close to 160 non-commutative ternary functions that will create stable ternary devices. The non-commutative function [0 1 2;2 1 0;0 0 2] will generate a non-inverted signal.

The 4-Value Single Element Information Retaining Device

The same reasoning applies to a 4-value single element information retaining device comprising one function with feedback. There are 8 different stable single element configurations with commutative 4-value functions.

Figure 54:
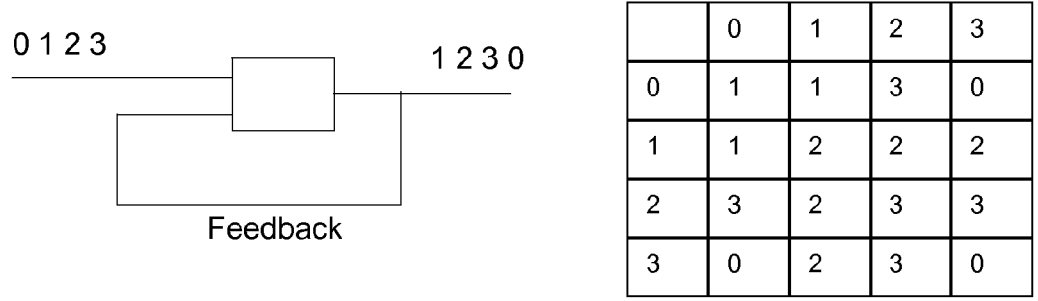
Figure 55:
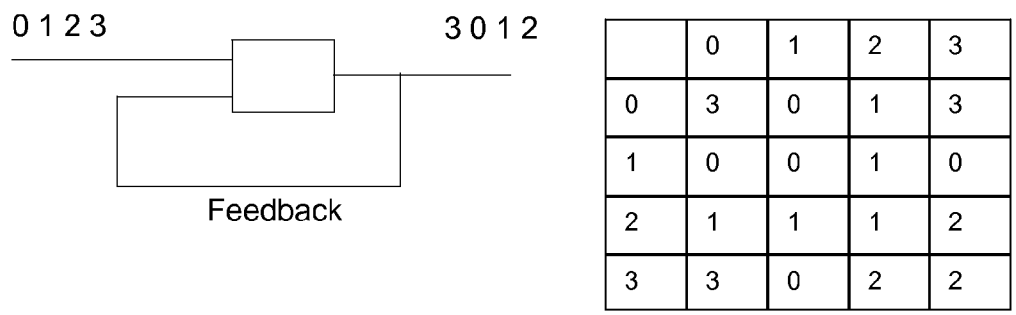

Two of them, with the related truth table are shown in FIGS. 54 and 55. In these cases the device also works as an inverting element. The correct input signal can be recovered from the output by applying a 4-value inverter. There are many more non-commutative configurations.

The 5-Value Single Element Information Retaining Device

The same reasoning applies to a 5-value single element information retaining device comprising one function with feedback. There are at least 120 different stable single element configurations with commutative 5-value functions.

Figure 56:
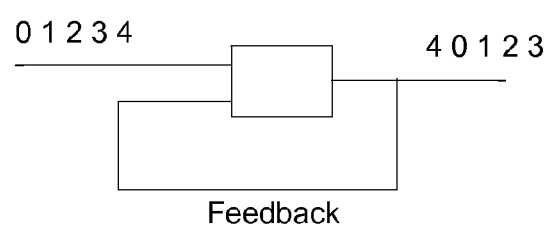

One of them, with the related truth table are shown in FIG. 56. In this case the device also works as an inverting element. The correct input signal can be recovered from the output by applying a 5-value inverter. This particular configuration has been selected because it stabilizes in 2 cycles.

There are many more non-commutative configurations.

The 6-Value Single Element Information Retaining Device

The same reasoning applies to a 6-value single element information retaining device comprising one function with feedback. At least 57 different stable single element configurations with commutative 6-value functions have been identified.

Figure 57:
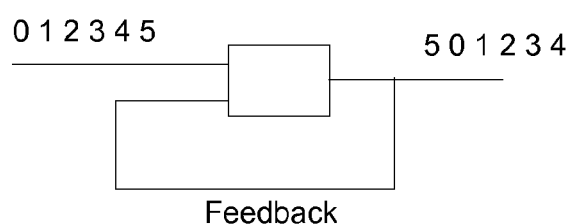

One of them, with the related truth table is shown in FIG. 57. In this case the device also works as an inverting element. The correct input signal can be recovered from the output by applying a 6-value inverter. This particular configuration has been selected because it stabilizes in 3 cycles.

There are many more non-commutative configurations.

The n-Value Single Element Information Retaining Device

It should be clear that the above method allows for the creation and design of any n-value single element information retaining comprising one n-value logic function with feedback. Determining the appropriate functions will take calculation and computer time. The results suggest ways to limit the total amount of calculations. For instance only use n-value commutative functions which have as diagonal: [(n−1) 0 1 2 . . . (n−3) (n−2)] and as directly neighboring diagonals above and under: [0 1 2 . . . (n−2)].

The n-Value Digital Memory Device with External Control

The two function n-value devices and the single function or element n-value information retaining devices described previously can be used as an essential part in externally controlled n-value digital memory devices.

Figure 58:
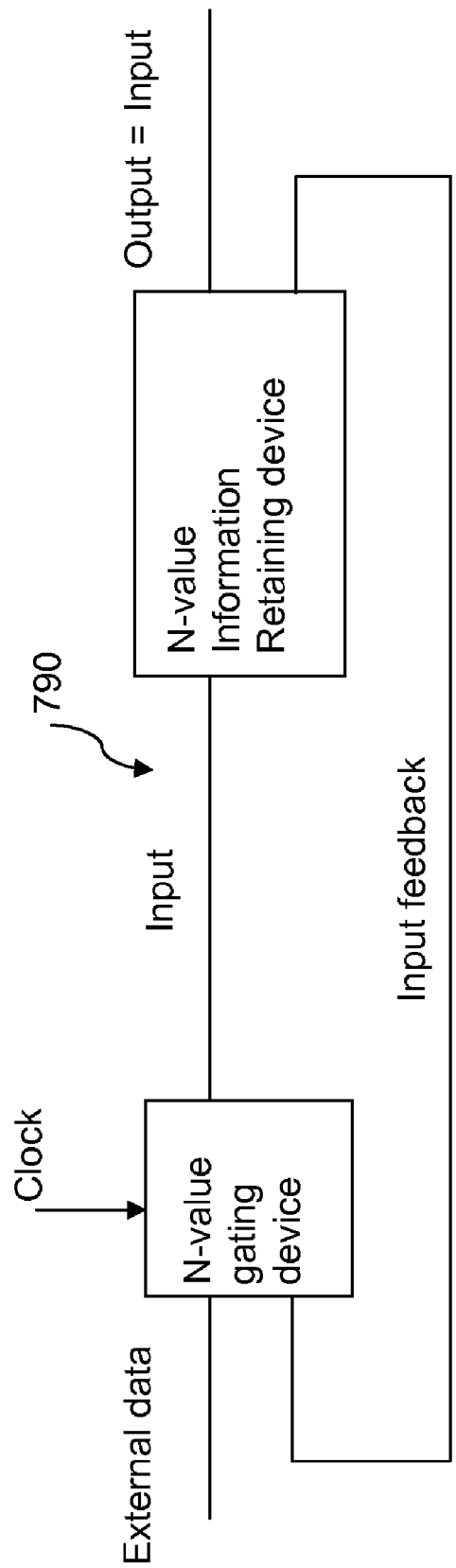

The output of an n-value two function device can be fed back into an n-value device that has as its inputs external data as well as a clock signal. The overall block diagram of such externally controlled n-value memory device is shown in FIG. 58. The n-value switching gates into this n-value gating device can be selected such that the device (if the clock-signal is not '0') lets the external data pass and blocks the feedback signal from the n-value information retaining device. As a consequence the state of the n-value information retaining device will adopt the value of the new data. If the clock signal is '0' the gating device will pass the feedback signal again into the information retaining device, thus keeping the state of this device unchanged. A block diagram of such a clock-controlled n-value gating device is shown in FIG. 59.

An n-Value Logic Based (n−1) State Digital Memory Device Applying an nth State to Control Such a Device It is possible to create a single n-value digital element with feedback that will show the following properties:
the element performs an n value digital logic function
it reaches stable, information retaining states, depending strictly on the current input for (n−1) states.
it has one input state, not being one of the n−1 stable information retaining states, which if applied will create the output as being the value of the preceding state. As such the device retains information about the previous input.

A Ternary Logic Based Binary Digital Memory Device Applying a 3rd State to Control Such a Device FIG. 60 shows three ternary logic functions that would apply to a binary digital memory device with a third value to control the device.

The three ternary functions L1, L2 and L3 all will act as a binary information retaining device. When the input signal to a device with Θ either one of ternary functions L1, L2 or L3 applied in a device as shown in FIG. 51 and input 0, or 1 will generate as output a 0 or a 1. If the input signal is changed to 2 the output will remain '0' or '1' as the preceding state was.

FIG. 61 shows a possible application in a binary memory device. It applies a gating device with function S1. If the control signal 'Signal' is equal to 2 the gating device will pass the value of DATA. If SIGNAL≠2 the output of the gating device is 2 and thus the signal INPUT to the information retaining device is 2, thus it will keep its previous output as its current output.

A 4-Value Logic Based Ternary Digital Memory Device Applying a 4th State to Control Such a Device The previous reasoning also applies for single 4-value logic functions, creating 3-value memory latch with a $4^{th}$ value for control. The four commutative 4-value functions that work this way are shown in FIG. 62.

There are more non-commutative functions that would work.

It is possible to provide a more generic form of commutative 4-value functions for this application. Its generic truth table is shown in FIG. 63.

The values of a, b and c in this truth table are one of {0, 1, 2, 3} and should be selected in such a way that they avoid 'self-referring' states that are unwanted or unstable. This can be done by way of a computer program, rejecting the not acceptable functions.

A 5-Value Logic Based 4-Value Digital Memory Device Applying a 5th State to Control Such a Device The previous reasoning also applies for single 5-value logic functions, creating 4-value memory device with a $5^{th}$ value for control. Two of the commutative 5-value functions that work this way are shown in FIG. 64.

A configuration with F2 would be preferred as it only requires 2 cycles to stabilize. A more generic commutative 5-value function is shown in FIG. 65, with {a,b,c,d,e} member of {0,1,2,3,4}. Applying the generic 5-value function can limit the number of calculations to determine the applicable commutative 5-value functions for this application.

A 6-Value Logic Based 5-Value Digital Memory Device Applying a 6th State to Control Such a Device The previous reasoning also applies for single 6-value logic functions, creating a 5-value memory device with a $6^{th}$ value for control. One of the commutative 6-value functions that work this way is shown in FIG. 65. This function lets the device achieve stability within 3 cycles. There are hundreds of commutative functions that will enable a 5-value memory device with a $6^{th}$ value for external control.

A 7-Value Logic Based 6-Value Digital Memory Device Applying a 7th State to Control Such a Device The previous reasoning also applies for single 7-value logic functions, creating 6-value memory latch with a $6^{th}$ value for control. One of the commutative 6-value functions that work this way is shown in FIG. 66. This function lets the device achieve stability within 3 cycles. There are hundreds of commutative functions that will enable a 6-value memory device with a $7^{th}$ value for external control.

An n-Value Logic Based (n−1)-Value Digital Memory Device Applying an nth State to Control Such a Device The previous reasoning and method can be applied to create single function n-value memory latches retaining (n−1) value digits and controlled by an nth value.

The multi-valued logic methods, apparatuses and logic tables of this invention may be implemented in, and accessed from, volatile and non-volatile memory elements, computer programs, dedicated or general microprocessors, electronic and optical or other devices. The multi-valued logic data related to the multi-valued logic functions of the invention may be accessed, implemented and processed as actual multi-valued state symbols and signals or may be represented in binary form. Application of Analog/Digital and Digital/Analog converters enables the processing of multi-valued symbols in binary form, while allowing the presentation of input and output signals as multi-valued symbols and signals.

Figure 67:
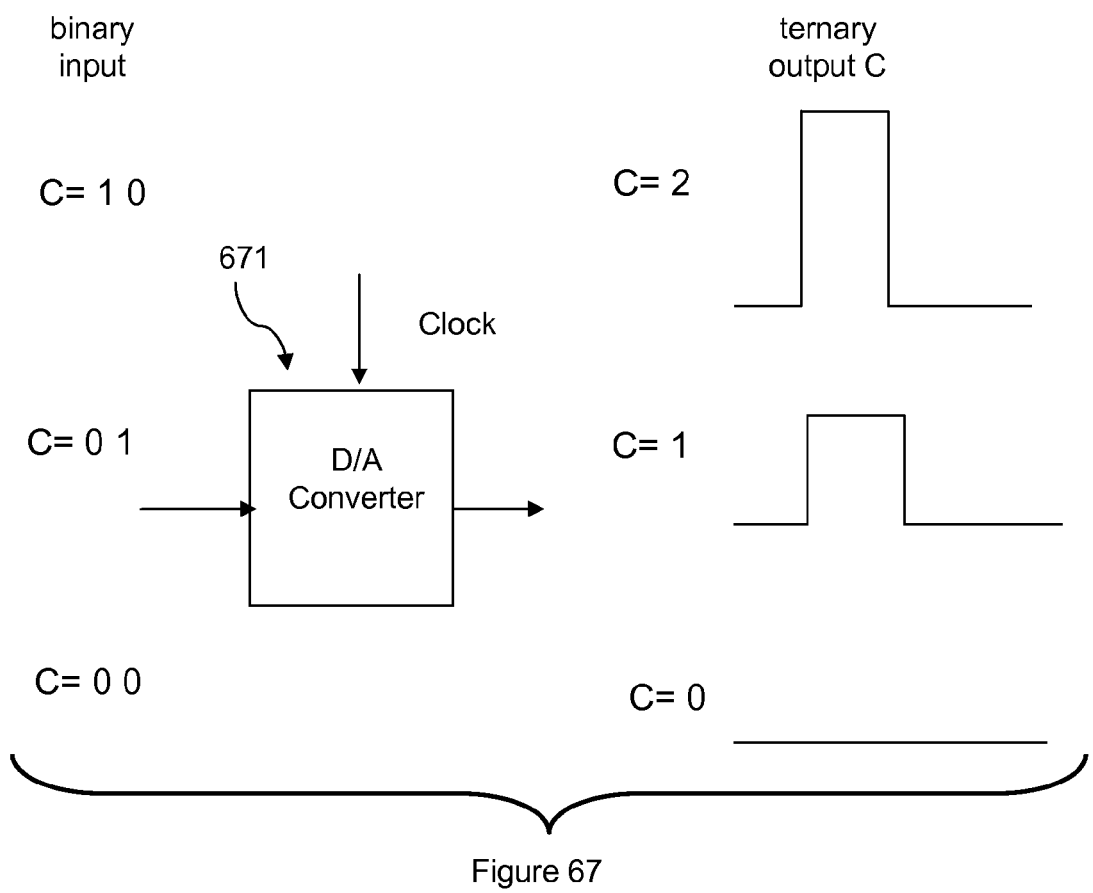
FIGS. 67 and 68 illustrate the use and creation of n-valued single signals.

A digital-to-analog converter, synchronized by an external clock, can generate the ternary or multi-value signal, as shown in FIG. 67. In FIG. 67, a binary input is provided to the D/A converter 671. The input signal can assume one of three binary values: 00 (or 0), 01 (or 1) and 10 (or 2). The D/A converter 671 converts the input signal to an analog signal, or a ternary signal, that can assume one of three values: 0, 1 and 2.

Figure 68:
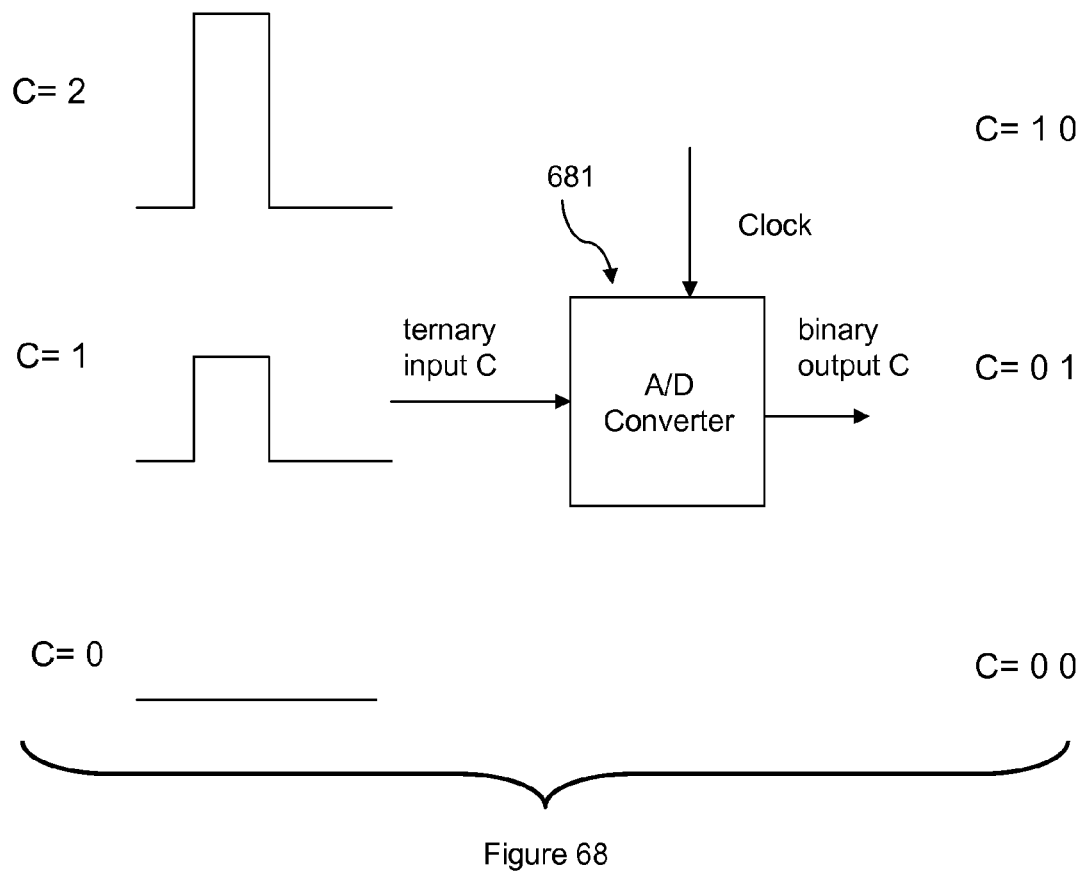

At the receiving side the incoming ternary or multi-value signal can be converted to binary representation by an analog-to-digital circuit, as shown in FIG. 68. In FIG. 68, the operation is the reverse as just described with respect to FIG. 67. The incoming analog or ternary signal can assume one of three values: 0, 1 and 2. The A/D converter 681, outputs one of three binary signals: 00 (or 0), 01 (or 1) and 10 (or 2).

The use of n-valued signals can be illustrated with a 3-value or ternary scrambling function or method and apparatus using a ternary logic device that implements one of a set of ternary logic functions. The ternary logic device has two inputs A and B and one output C. A, B and C each can have one out of three different values, for example, 0, 1 or 2. The general requirement for the values of A, B and C is that there are 3 distinct values that each A, B and C can assume and these values may symbolically be represented in a number of ways, such as by 0, 1, or 2 or by −, 0 and +.

Figure 69:
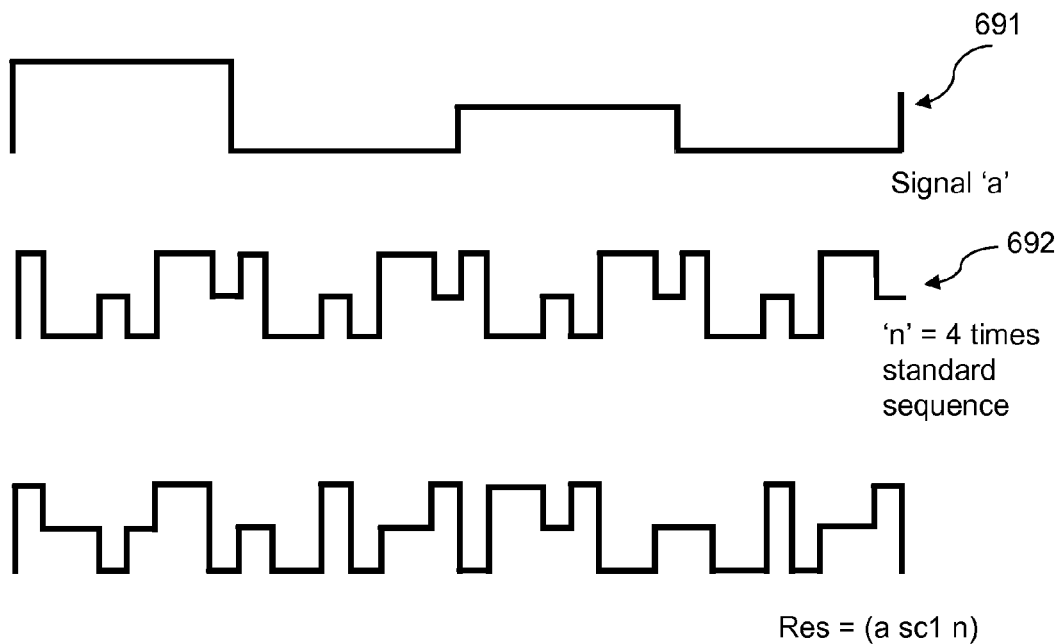
FIG. 69 illustrates the use of n-level signals.

FIG. 69 illustrates the use of a single multi-level signal to represent an n-valued signal. Referring to FIG. 69, the ternary digital signal at line 691 is to be scrambled with a known sequence to create a ternary spread spectrum signal by an n-valued logic device. The signal sequence is [2 0 1 0], and is provided to one input of the logic device. The known, pre-determined sequence that is applied to the other input of the logic device is illustrated on line 692. That sequence is [2 0 0 1 0 2 2 1]. The known, pre-determined sequence has a higher clock frequency than the signal to be scrambled. In the case of FIG. 69, the frequency of the known, pre-determined signal is eight times faster than the frequency of the signal to be scrambled. A 4-valued logic table 694 is applied in the example illustrated in FIG. 69 to scramble the signal. Thus, the logic device that the signal at line 691 and the signal at line 692 are applied to, implements a logic function defined by the logic table 693.

The following patent applications, including the specifications, claims and drawings, are hereby incorporated by reference herein, as if they were fully set forth herein: (1) U.S. Provisional Patent Application No. 60/575,948, filed on Jun. 1, 2004, entitled MULTI-VALUE CODING OF SEQUENCES AND MULTI-VALUE MEMORY DEVICES; (2) United States Non-Provisional patent application Ser. No. 10/935,960, filed on Sep. 8, 2004, now U.S. Pat. No. 7,643,632, entitled TERNARY AND MULTI-VALUE DIGITAL SCRAMBLERS, DESCRAMBLERS AND SEQUENCE GENERATORS; (3) U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS; (4) United States Non-Provisional patent application Ser. No. 10/936,181, filed Sep. 8, 2004, entitled TERNARY AND HIGHER MULTI-VALUE SCRAMBLERS/DESCRAMBLERS, now U.S. Pat. No. 7,002,490; (5) United States Non-Provisional patent application Ser. No. 10/912,954, filed Aug. 6, 2004, entitled TERNARY AND HIGHER MULTI-VALUE SCRAMBLERS/DESCRAMBLERS now U.S. Pat. No. 7,505,589; (6) U.S. Provisional Patent Application No. 60/501,335, filed Sep. 9, 2003, entitled TERNARY (3-VALUE) AND HIGHER VALUE DIGITAL SCRAMBLERS/DESCRAMBLERS IN DIGITAL COMMUNICATIONS; (7) U.S. patent application Ser. No. 11/000,218, filed Nov. 30, 2004, entitled SINGLE AND COMPOSITE BINARY AND MULTI-VALUED LOGIC FUNCTIONS FROM GATES AND INVERTERS now U.S. Pat. No. 7,218,144; and (8) U.S. Provisional Patent Application No. 60/599,781, filed Aug. 7, 2004, entitled MULTI-VALUED DIGITAL INFORMATION RETAINING ELEMENTS AND MEMORY DEVICES.

The invention claimed is:

1. An apparatus for multiplying a multiplicand having at least a first and a second radix-n digit with n being an integer greater than 2, the first radix-n digit being represented by a first signal and the second radix-n digit being represented by a second signal, with a multiplier having at least a first and a second radix-n digit with n being an integer greater than 2, comprising:
 a device implementing a first n-valued logic table having a first input enabled to receive the first signal, a second input enabled to receive the second signal and an output enabled to provide a signal representing a residue of a sum of a first product of the first digit of the multiplicand and the second digit of the multiplier and a second product of the second digit of the multiplicand and the first digit of the multiplier, wherein:
 a residue of the first product and a residue of the second product have identical radix-n positions; and
 no signal representing the residue of the first product is generated to determine the residue of the sum.

2. The apparatus as claimed in claim 1, further comprising:
 a device implementing a second n-valued logic table having a first input enabled to receive the first signal, a second input enabled to receive the second signal and an output enabled to provide a signal representing a carry of the sum of the first product and the second product, wherein no signal representing a carry of the first product is generated to determine the carry of the sum.

3. The apparatus as claimed in claim 2, further comprising:
 a device implementing a third n-valued logic table having a first input enabled to receive the first signal and a second input enabled to receive the second signal and an output enabled to provide a signal representing a second carry of the sum of the first product and the second product.

4. The apparatus as claimed in claim 1, wherein the first and the second digit of the multiplier are constants and the first n-valued logic table is a modulo-n addition table modified in accordance with the first and second digit of the multiplier.

5. The apparatus as claimed in claim 1, wherein the apparatus is part of a digital filter.

6. The apparatus as claimed in claim 1, wherein the first signal is a single signal able to assume one of n states.

7. The apparatus as claimed in claim 1, wherein the first signal is a plurality of binary signals.

8. A calculating machine to generate an output n-state digit from a calculation of an n-state addition of a first n-state digit modified by a first n-state multiplier and a second n-state digit modified by a second n-state multiplier, each n-state digit having one of n states with n>2, comprising:
- a first input of a first circuit enabled to receive a signal representing the first n-state digit;
- a second input of the first circuit enabled to receive a signal representing the second n-state digit;
- an output of the first circuit enabled to provide a signal representing the output n-state digit, wherein the first circuit implements a single non-commutative n-state truth table that is a truth table of the n-state addition modified in accordance with an n-state inverter representing the first n-state multiplier and modified with an n-state inverter representing the second n-state multiplier; and
- a second circuit with first and second inputs to receive the signal representing the first n-state digit and the signal representing the second n-state digit respectively and with an output to provide a signal representing a carry digit wherein the second circuit implements a single non-commutative truth table.

9. The calculating machine of claim 8, wherein the first circuit is a memory device.

10. The calculating machine of claim 8, wherein the calculating machine is part of a digital filter.

11. The calculating machine of claim 8, wherein the calculating machine is a processor.

12. The calculating machine of claim 8, wherein an n-state digit is represented by a plurality of binary signals.

13. An apparatus to perform a fast machine calculation, comprising:
- a device implementing a single non-commutative n-state truth table with n>2, including a first input to receive a first signal representing a first n-state symbol, a second input to receive a second signal representing a second n-state symbol; and
- an output of the device to provide a signal representing an n-state symbol that is a carry of an addition of the first n-state symbol modified in accordance with a first n-state inverter and the second n-state symbol modified in accordance with a second n-state inverter.

14. The apparatus of claim 13, wherein n>3.

15. The apparatus of claim 13, further comprising:
- a second device implementing a second single non-commutative n-state truth table with n>2, including a first input to receive the first signal representing the first n-state symbol, a second input to receive the second signal representing the second n-state symbol; and
- an output of the second device to provide a signal representing an n-state symbol that is a residue of an addition of the first n-state symbol modified in accordance with the first n-state inverter and the second n-state symbol modified in accordance with the second n-state inverter.

16. The apparatus of claim 13, wherein the device is a memory device.

17. The apparatus of claim 13, wherein the apparatus is part of a digital filter.

18. The apparatus of claim 13, wherein the apparatus determines a partial product of a radix-n multiplication.

19. The apparatus of claim 13, wherein an n-state symbol is represented by a plurality of binary signals.

20. The apparatus of claim 13, wherein the apparatus is a machine multiplier of a variable number containing a plurality of n-state digits with a constant number containing a plurality of n-state digits.

* * * * *